US012672189B2

(12) United States Patent
Shrestha et al.

(10) Patent No.: US 12,672,189 B2
(45) Date of Patent: Jun. 30, 2026

(54) SYSTEM AND METHOD FOR OPERATION OF ENHANCED MACHINE TYPE COMMUNICATION (eMTC) AND NARROW BAND INTERNET-OF-THINGS (NB-IoT) USER EQUIPMENTS (UEs) WHEN CONNECTED TO 5G CORE NETWORK (5GCN)

(71) Applicant: Apple Inc., Cupertino, CA (US)

(72) Inventors: Bharat Shrestha, Hillsboro, OR (US); Yi Guo, Shanghai (CN); Seau S. Lim, Swindon (GB); Marta Martinez Tarradell, Hillsboro, OR (US); Puneet Jain, Hillsboro, OR (US); Meghashree Dattatri Kedalagudde, Portland, OR (US)

(73) Assignee: Apple Inc., Cupertino, CA (US)

( * ) Notice: Subject to any disclaimer, the term of this patent is extended or adjusted under 35 U.S.C. 154(b) by 319 days.

(21) Appl. No.: 17/415,054

(22) PCT Filed: Jan. 24, 2020

(86) PCT No.: PCT/US2020/014994
§ 371 (c)(1),
(2) Date: Jun. 17, 2021

(87) PCT Pub. No.: WO2020/154622
PCT Pub. Date: Jul. 30, 2020

(65) Prior Publication Data
US 2022/0078872 A1 Mar. 10, 2022

Related U.S. Application Data

(60) Provisional application No. 62/796,487, filed on Jan. 24, 2019.

(51) Int. Cl.
*H04W 76/19* (2018.01)
*H04W 68/00* (2009.01)
(Continued)

(52) U.S. Cl.
CPC ......... *H04W 76/19* (2018.02); *H04W 68/005* (2013.01); *H04W 76/20* (2018.02); *H04W 76/30* (2018.02)

(58) Field of Classification Search
None
See application file for complete search history.

(56) References Cited

U.S. PATENT DOCUMENTS 9,014,703 B1 4/2015 Edara
11,115,887 B2 * 9/2021 Zhang ............... H04W 36/0069
(Continued)

FOREIGN PATENT DOCUMENTS

CN 102067692 A 5/2011
CN 108156645 A 6/2018
(Continued)

OTHER PUBLICATIONS

International Search Report and Written Opinion directed to related International Application No. PCT/US2020/014994, mailed on May 13, 2020, 9 pages.
(Continued)

*Primary Examiner* — Mariela Vidal Carpio
(74) *Attorney, Agent, or Firm* — Sterne, Kessler, Goldstein & Fox P.L.L.C.

(57) ABSTRACT

Some embodiments of this disclosure include systems, apparatuses, methods, and computer-readable media for use in a wireless network for operating eMTC (enhanced Machine Type Communication) user equipment (UE) and/or NB-IoT UEs when connected to a 5G Core Network (5GCN). For example, some embodiments are directed to a user equip-
(Continued)

1200

1202 — Receiving from NAS (Non-Access Stratum layer) an indication to use a 5GC (5G Core network) for a cell 1204 — Sending a RRC connection request in response to the indication to use the 5GCN ment (UE). The UE includes processor circuitry and radio front circuitry. The processor circuitry can be configured to receive, using the radio front end circuitry and from a Non-Access Stratum layer (NAS) of a cell, an indication to use a 5G Core Network (5GCN) for the cell. The processor circuitry can be further configured to transmit, using the radio front end, a Radio Resource Control (RRC) connection request in response to the indication to use the 5GCN.

16 Claims, 12 Drawing Sheets

(51) Int. Cl.
H04W 76/20          (2018.01)
H04W 76/30          (2018.01)

(56) References Cited

U.S. PATENT DOCUMENTS

| | | | | |
|---|---|---|---|---|
| 11,558,811 | B2 * | 1/2023 | Kim | H04W 72/04 |
| 11,678,304 | B2 * | 6/2023 | Dhanda | H04W 72/04 |
| | | | | 370/329 |
| 2009/0325608 | A1 | 12/2009 | Cheng et al. | |
| 2010/0135215 | A1 * | 6/2010 | Tang | H04W 72/53 |
| | | | | 370/328 |
| 2013/0331054 | A1 | 12/2013 | Kodali | |
| 2018/0227978 | A1 | 8/2018 | Keller et al. | |
| 2019/0230621 | A1 * | 7/2019 | Dai | H04W 76/11 |
| 2019/0289650 | A1 * | 9/2019 | Yoo | H04W 76/22 |
| 2019/0297550 | A1 * | 9/2019 | Zhang | H04W 36/0069 |
| 2019/0306913 | A1 * | 10/2019 | Kim | H04W 4/70 |
| 2020/0068500 | A1 * | 2/2020 | Liu | H04W 52/36 |
| 2020/0084711 | A1 | 3/2020 | Liu et al. | |
| 2020/0359260 | A1 * | 11/2020 | Gao | H04W 74/0833 |
| 2020/0396728 | A1 * | 12/2020 | Zhu | H04W 72/23 |
| 2021/0044964 | A1 * | 2/2021 | Lindheimer | H04W 72/04 |
| 2021/0204206 | A1 * | 7/2021 | Kim | H04W 88/10 |
| 2021/0212145 | A1 * | 7/2021 | Ohlsson | H04W 12/03 |
| 2021/0235503 | A1 * | 7/2021 | Irukulapati | H04L 1/08 |
| 2021/0289560 | A1 * | 9/2021 | Xu | H04W 24/08 |
| 2022/0007276 | A1 * | 1/2022 | Breuer | H04W 48/18 |
| 2022/0116189 | A1 * | 4/2022 | Maleki | H04W 52/0235 |
| 2022/0150768 | A1 * | 5/2022 | Rugeland | H04W 68/005 |
| 2022/0201662 | A1 * | 6/2022 | Feltrin | H04W 72/23 |
| 2022/0256587 | A1 * | 8/2022 | Fujishiro | H04W 72/23 |

FOREIGN PATENT DOCUMENTS

| | | | |
|---|---|---|---|
| CN | 108307424 | A | 7/2018 |
| CN | 109246719 | A | 1/2019 |
| CN | 109246792 | A | 1/2019 |
| TW | 201830925 | A | 8/2018 |
| WO | WO 2009/158626 | A1 | 12/2009 |
| WO | WO 2018085187 | A1 | 5/2018 |

OTHER PUBLICATIONS

SA WG2 Meeting #129bis, "Completion of Study on Cellular IoT support and evolution for the 5G System," S2-1813400, Nov. 26-30, 2018; 2 pages.

3GPP TR 23.724, "Study on Cellular IoT support and evolution for the 5G System," Dec. 2018; 276 pages.

First Chinese Office Action and Search Report directed to related Chinese Application No. 202080010431.X, with English-language machine translation attached, mailed Jan. 16, 2024; 16 pages.

3GPP TS 36.304 V15.1.0; 3rd Generation Partnership Project; Technical Specification Group Radio Access Network; Evolved Universal Terrestrial Radio Access (EUTRA); User Equipment (UE) procedures in idle mode (Release 15), Sep. 2018; 55 pages.

* cited by examiner

200

R/F2/E/LCID/R/R/eLCID sub-header

600

700

1200

1202 — Receiving from NAS (Non-Access Stratum layer) an indication to use a 5GC (5G Core network) for a cell 1204 — Sending a RRC connection request in response to the indication to use the 5GCN

SYSTEM AND METHOD FOR OPERATION OF ENHANCED MACHINE TYPE COMMUNICATION (eMTC) AND NARROW BAND INTERNET-OF-THINGS (NB-IoT) USER EQUIPMENTS (UEs) WHEN CONNECTED TO 5G CORE NETWORK (5GCN)

CROSS REFERENCE TO RELATED APPLICATIONS

This application is a U.S. National Phase of International Application No. PCT/US2020/014994, filed Jan. 24, 2020, which claims the benefit under 35 U.S.C. § 119(e) of U.S. Provisional Application No. 62/796,487, filed Jan. 24, 2019, which are hereby incorporated by reference in their entireties.

BACKGROUND

Various embodiments generally may relate to the field of wireless communications.

SUMMARY

Some embodiments of this disclosure include systems, apparatuses, methods, and computer-readable media for use in a wireless network for operating eMTC (enhanced Machine Type Communication) user equipment (UE) and/or narrow band Internet-of-Things (NB-IoT) UEs when connected to a 5G Core Network (5GCN).

Some embodiments are directed to a user equipment (UE). The UE includes processor circuitry and radio front circuitry. The processor circuitry can be configured to receive, using the radio front end circuitry and from a Non-Access Stratum layer (NAS) of a cell, an indication to use a 5G Core Network (5GCN) for the cell. The processor circuitry can be further configured to transmit, using the radio front end, a Radio Resource Control (RRC) connection request in response to the indication to use the 5GCN.

Some embodiments are directed to a method. The method includes receiving, by a user equipment (UE) and from a Non-Access Stratum layer (NAS) of a cell, an indication to use a 5G Core Network (5GCN) for the cell. The method further includes transmitting, to a Radio Access Network (RAN) of the cell, a Radio Resource Control (RRC) connection request in response to the indication to use the 5GCN.

Some embodiments are directed to a user equipment (UE). The UE includes a memory that stores instructions and a processor. The processor, upon executing the instructions, is configured to receive, from a Non-Access Stratum layer (NAS) of a cell, an indication to use a 5G Core Network (5GCN) for the cell. The processor is further configured to transmit, to a Radio Access Network (RAN) of the cell, a Radio Resource Control (RRC) connection request in response to the indication to use the 5GCN.

BRIEF DESCRIPTION OF THE DRAWINGS/FIGURES

Figure 1:
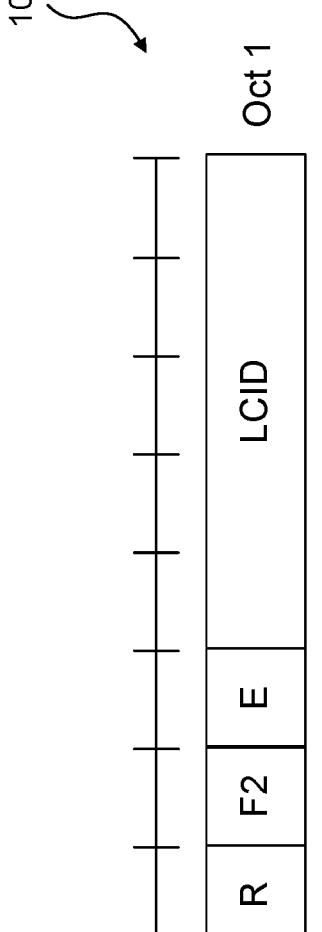
FIG. 1 depicts an example of a MAC control element (CE) including a subheader logical channel ID (LCID), in accordance with some embodiments.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Rel-15 (release 15 of 3GPP) eMTC (enhanced Machine Type Communication) and narrow band Internet-of-Things (NB-IoT) UEs do not support connectivity to 5GCN (5G Core Network). In SA2 meeting #129bis, study on Cellular IoT support and evolution for the 5G System was completed (details can be found in TR 23.724). RAN2 and RAN3 are expected to develop support of 5GCN connectivity for Rel-16 eMTC and NB-IoT UEs.

SA2 also sent LS S2-1813400 to RAN, informing the following key RAN impacts resulting from the study:

Support of extended DRX in CM-IDLE

Support of extended DRX in CM-CONNECTED with RRC_INACTIVE (support of sleep cycles up to the NAS and SMS retransmission timers)

Support of EDT for Data over NAS and user-plane transmission

Support of Inter-UE QoS for data over NAS (resource prioritization between different NB-IoT UEs)

Support of restriction of use of Enhanced Coverage

Delivery of Expected UE Behavior information to the RAN

Additional information in SIB to indicate supported CIoT features; indication of CIoT features supported by the UE in RRC In this disclosure, various RRC signaling procedures are described to support the above mentioned features for Rel-16 eMTC and NB-IoT UEs when connected to 5GCN.

Currently 5GCN does not support any user plane (UP) IoT optimization similar to what EPC (LTE) supports for UP IoT EPS optimization. UP IoT 5GS optimization refers to a new solution for UP IoT optimization defined for 5GCN. This disclosure, and methods and apparatuses implementing aspects of it, are applicable to all UEs supporting coverage enhancement (CE) operation (i.e. including normal LTE UEs operating in bandwidth reduced mode).

Exemplary Embodiment #1 Connection Establishment to RAN (Radio Access Network) Supporting Connectivity to 5GCN RRC Connection Request In embodiments, when a UE wants to send RRC connection request in a cell where it is monitoring paging using 5G-S-TMSI, eMTC UE can re-use the rrcConnectionRequest-r15.

For NB-IoT (Narrowband Internet-of-Things) UE, new radio resource connect (RRC) message information element (IE)s (e.g., RRCConnectionRequest-NB-r16-IEs) can be defined using a new UL CCCH message class extension. In another option, the critical extension of the existing RRC-ConnectionRequest-NB message is used.

In another option, a spare bit in the RRCConnectionRequest-NB-r13-IEs is used as an indication that the service request is for 5GCN and the 40 bit string of S-TMSI in the IE InitialUE-Identity corresponds to the ng-5G-S-TMSI-Part1.

Example of Critical Extension of RRCConnectionRequest-NB.

| RRCConnectionRequest-NB message |
|---|

```
-- ASN1START
RRCConnectionRequest-NB ::=          SEQUENCE {
    criticalExtensions                      CHOICE {
        rrcConnectionRequest-r13                RRCConnectionRequest-NB-r13-IEs,
        criticalExtensionsFuture                SEQUENCE {} RRCConnectionRequest-NB-r16-IEs
    }
}
RRCConnectionRequest-NB-r13-IEs ::=          SEQUENCE {
    ue-Identity-r13                             InitialUE-Identity,
    establishmentCause-r13                      EstablishmentCause-NB-r13,
    multiToneSupport-r13                        ENUMERATED {true}              OPTIONAL,
    multiCarrierSupport-r13                     ENUMERATED {true}              OPTIONAL,
    earlyContentionResolution-r14               BOOLEAN,
    cqi-NPDCCH-r14                              CQI-NPDCCH-NB-r14,
    spare                                       BIT STRING (SIZE (17))
}
RRCConnectionRequest-NB-r16-IEs ::=          SEQUENCE {
    ue-Identity-r16                             InitialUE-Identity-5GC,
    establishmentCause-r16                      EstablishmentCause-NB-r13,
    multiToneSupport-r16                        ENUMERATED {true}              OPTIONAL,
    multiCarrierSupport-r16                     ENUMERATED {true}              OPTIONAL,
    earlyContentionResolution-r16               BOOLEAN,
    cqi-NPDCCH-r16                              CQI-NPDCCH-NB-r14,
    spare                                       BIT STRING (SIZE (17))
}
-- ASN1STOP
```

Or, an example of RRCConnectionRequest-NB-r13-IEs extension where InitialUE-Identity corresponds to InitialUE-Identity-5GC if connectTo5GC-r16 set to "1".

| RRCConnectionRequest-NB message |
|---|

```
-- ASN1START
RRCConnectionRequest-NB ::=          SEQUENCE {
    criticalExtensions                      CHOICE {
        rrcConnectionRequest-r13                RRCConnectionRequest-NB-r13-IEs,
        criticalExtensionsFuture                SEQUENCE{ }
    }
}
RRCConnectionRequest-NB-r13-IEs ::=          SEQUENCE {
    ue-Identity-r13                             InitialUE-Identity,
    establishmentCause-r13                      EstablishmentCause-NB-r13,
```

-continued

| RRCConnectionRequest-NB message | | |
|---|---|---|
| multiToneSupport-r13 | ENUMERATED {true} | OPTIONAL, |
| multiCarrierSupport-r13 | ENUMERATED {true} | OPTIONAL, |
| earlyContentionResolution-r14 | BOOLEAN, | |
| cqi-NPDCCH-r14 | CQI-NPDCCH-r14, | |
| connectTo5GC-r16 | ENUMERATED {true} | OPTIONAL, |
| spare | BIT STRING (SIZE (~~17~~ 16)) | |
| } | | |
| -- ASN1STOP | | |

RRC Connection Re-Establishment

In embodiments, if NB-IoT UE supports RRC connection re-establishment when the AS security has not been enabled, UE includes the InitialUE-Identity-5GC ID in RRCConnectionReestablishmentRequest-NB. In one option, the 40 bit string of S-TMSI in the IE ReestabUE-Identity-CP-NB-r14 corresponds to the ng-5G-S-TMSI-Part1. The RAN can blindly detect whether or not S_TMSI corresponds to the ng-5G-S-TMSI-Part1. A spare bit inRRCConnectionReestablishmentRequest-NB-r14-IEs can be used to indicate S_TMSI corresponds to the ng-5G-S-TMSI-Part1.

Similarly, for NAS security, NAS-MAC and NAS COUNT have to be sent to 5GCN. For this purpose, RAN can introduce new IE to include NAS-MAC and NAS-COUNT in N2 signaling to send them to AMF.

In another option, the RRCConnectionReestablishmentRequest can be critically extended as shown below.

```
RRCConnectionReestablishmentRequest-NB ::= SEQUENCE {
        criticalExtensions                   CHOICE {
              rrcConnectionReestablishmentRequest-r13
                                             RRCConnectionReestablishmentRequest-NB-r13-IEs,
              later                          CHOICE {
                    rrcConnectionReestablishmentRequest-r14
                                             RRCConnectionReestablishmentRequest-NB-r14-IEs,
                    criticalExtensionsFuture    SEQUENCE {} RRCConnectionReestablishmentRequest-NB-
r16-IEs
              }
        }
}
RRCConnectionReestablishmentRequest-NB-r16-IEs ::= SEQUENCE {
        ue-Identity-r16                      ReestabUE-Identity-CP-NB-r16,
        reestablishmentCause-r16             ReestablishmentCause-NB-r13,
        cqi-NPDCCH-r16                       CQI-NPDCCH-Short-NB-r14,
        earlyContentionResolution-r16        BOOLEAN,
        spare                                BIT STRING (SIZE (1))
}
ReestabUE-Identity-CP-NB-r16 ::=          SEQUENCE {
        ng-5G-S-TMSI-Part1-16                BIT STRING (SIZE (40)),
        ul-NAS-MAC-r16                       BIT STRING (SIZE (16)),
        ul-NAS-Count-r16                     BIT STRING (SIZE (5))
}
```

In embodiments, the remaining 8 bits of ng-5G-S-TMSI may be sent in RRCConnectionReestablishmentComplete-NB message.

```
                   RRCConnectionReestablishmentComplete-NB message

--ASN1START
RRCConnectionReestablishmentComplete-NB ::= SEQUENCE {
        rrc-TransactionIdentifier                    RRC-TransactionIdentifier,
        criticalExtensions                           CHOICE {
              rrcConnectionReestablishmentComplete-r13     RRCConnectionReestablishmentComplete-NB-r13-
IEs,
              criticalExtensionsFuture                     SEQUENCE { }
        }
}
RRCConnectionReestablishmentComplete-NB-r13-IEs ::= SEQUENCE {
        lateNonCriticalExtension             OCTET STRING                      OPTIONAL,
        nonCriticalExtension                 RRCConnectionReestablishmentComplete-NB-v1470-IEs
        OPTIONAL
}
RRCConnectionReestablishmentComplete-NB-v1470-IEs ::= SEQUENCE {
        measResultServCell-r14               MeasResultServCell-NB-r14        OPTIONAL,
        nonCriticalExtension                 SEQUENCE { } RRCConnectionReestablishmentComplete-NB-
v16xy-IEs                 OPTIONAL
}
```

-continued

| RRCConnectionReestablishmentComplete-NB message |
|---|

```
RRCConnectionReestablishmentComplete-NB-v16xy-IEs ::= SEQUENCE {
    ng-5G-S-TMSI-Part2-r16              BIT STRING (SIZE (8))    OPTIONAL,
    nonCriticalExtension                SEQUENCE { }             OPTIONAL
}
-- ASN1STOP
```

UP CIoT 5GS Optimization

When UE is using UP CIoT 5GS optimization, eMTC or NB-IoT UE may reuse the RRCConnectionResumeRequest-r13-IEs where resumeID-r13 is the new ID provided by the RAN corresponding to the 5GCN during suspend procedure. The RAN blindly tries to find out whether the resumeID-r13 corresponds to EPC or 5GCN (or UE was suspended when connected to EPC or 5GC). In another option, 1 spare bit may be used to indicate that the ResumeIdentity-r13 for NB-IoT and resumeID-r13 or truncatedResumeID-r13 for eMTC corresponds to 5GCN. Similarly, 1 spare bit in ResumeCause (rna-Update) for eMTC and in EstablishmentCause-NB-r13 for NB-IoT may be used for resume cause for RNA update, if any new RAN-based notification area is defined for UP CIoT 5GS optimization.

For example, the spare bit connectTo5GC-r16 may be set to "1" to indicate that the ResumeIdentity-r13 corresponds to 5GCN.

| RRCConnectionResumeRequest-NB message |
|---|

```
-- ASN1START
RRCConnectionResumeRequest-NB ::=      SEQUENCE {
    criticalExtensions                         CHOICE {
        rrcConnectionResumeRequest-r13             RRCConnectionResumeRequest-NB-r13-IEs,
        criticalExtensionsFuture                   SEQUENCE { }
    }
}
RRCConnectionResumeRequest-NB-r13-IEs ::=   SEQUENCE {
    resumeID-r13                               ResumeIdentity-r13,
    shortResumeMAC-I-r13                       ShortMAC-I,
    resumeCause-r13                            EstablishmentCause-NB-r13,
    earlyContentionResolution-r14             BOOLEAN,
    cqi-NPDCCH-r14                            CQI-NPDCCH-NB-r14,
    connectTo5GC-r16                         ENUMERATED {true}        OPTIONAL,
    spare                                     BIT STRING (SIZE (4 3))
}
-- ASN1STOP
-- ASN1START
EstablishmentCause-NB-r13 ::=           ENUMERATED {
                                               mt-Access, mo-Signalling, mo-Data, mo-ExceptionData,
                                               delayTolerantAccess-v1330, spare3 rna-Update, spare2,
spare1}
-- ASN1STOP
```

In another option, a new UL CCCH message class extension is defined to send the RRC connection resume request message where the resume ID corresponds to the 5GCN for both eMTC and NB-IoT.

Example of new UL CCCH message class extension for eMTC UE.

UL-CCCH-Message

The UL-CCCH-Message class is the set of RRC messages that may be sent from the UE to the E-UTRAN on the uplink CCCH logical channel.

```
- - ASN1START
UL-CCCH-Message : : = SEQUENCE {
    message                                UL-CCCH-MessageType
}
UL-CCCH-MessageType : : = CHOICE {
    c1                                     CHOICE {
        rrcConnectionReestablishmentRequest        RRCConnectionReestablishmentRequest,
        rrcConnectionRequest                       RRCConnectionRequest
    },
    messageClassExtension                  CHOICE {
        c2                                         CHOICE {
rrcConnectionResumeRequest-r13                 RRCConnectionResumeRequest-r13
        },
        messageClassExtensionFuture-r13 CHOICE {
```

-continued

```
    c3                                      CHOICE {
        rrcEarlyDataRequest-r15                 RRCEarlyDataRequest-r15,
        spare3 NULL rrcConnectionResumeRequest-r16      RRCConnectionResumeRequest-r16,
        spare2 NULL, spare1                     NULL
        },
        messageClassExtensionFuture-r15         SEQUENCE { }
    }
  }
}
- - ASN1STOP
```

| RRCConnectionResumeRequest message |
|---|

```
--ASN1START
RRCConnectionResumeRequest-r16 ::=   SEQUENCE {
        criticalExtensions                      CHOICE {
            rrcConnectionResumeRequest-r16          RRCConnectionResumeRequest-r16-IEs,
            criticalExtensionsFuture                SEQUENCE { }
        }
}
RRCConnectionResumeRequest-r16-IEs ::=          SEQUENCE {
        resumeIdentity-r16                      CHOICE {
        resumeID-r16                                ResumeIdentity-r13,
        truncatedResumeID-r16                       BIT STRING (SIZE (24))
        },
        shortResumeMAC-I-r16                        BIT STRING (SIZE (16)),
        resumeCause-r16                             ResumeCause-r16,
        spare                                       BIT STRING (SIZE (1))
}
ResumeCause-r16 ::=                 ENUMERATED {
                                            emergency, highPriorityAccess, mt-Access, mo-Signalling,
                                            mo-Data, rna-Update, mo-VoiceCall-v1280, spare1}

}
-- ASN1STOP
```

Similarly for eMTC UE, a spare bit in RRCConnection-ResumeRequest-5GC-r15-IEs may be used to indicate that fullI-RNTI-r15 corresponds to resumeID-r13 or shortI-RNTI-r15 corresponds to truncatedResumeID-r13 for 5GCN.

```
RRCConnectionResumeRequest-5GC-r15-IEs ::=      SEQUENCE {
        resumeIdentity-r15                      CHOICE {
            fullI-RNTI-r15                          I-RNTI-r15,
            shortI-RNTI-r15                         ShortI-RNTI-r15
        },
        shortResumeMAC-I-r15                        BIT STRING (SIZE (16)) ,
        resumeCause-r15                             ResumeCause-r15,
        resumeFromSuspend-r16                       ENUMERATED {true}          OPTIONAL
        spare                                       BIT STRING (SIZE (1))
    }
```

Similarly for eMTC UE, a spare bit in RRCConnection-ResumeRequest-r13-IEs may be used to indicate that resumeIdentity corresponds 5GCN.

```
RRCConnectionResumeRequest-r13-IEs ::=      SEQUENCE {
        resumeIdentity-r13                      CHOICE {
            resumeID-r13                            ResumeIdentity-r13,
            truncatedResumeID-r13                   BIT STRING (SIZE (24))
        },
        shortResumeMAC-I-r13                        BIT STRING (SIZE (16)),
        resumeCause-r13                             ResumeCause,
        connectTo5GC-r16                            ENUMERATED {true}       OPTIONAL,
        spare                                       BIT STRING (SIZE (1))
    }
```

In another option, RRCConnectionResumeRequest-NB for NB-IoT may be critically extended such that Resume-Identity-r13 corresponds to 5GCN.

| RRCConnectionResumeRequest-NB message |
|---|

```
-- ASN1START
RRCConnectionResumeRequest-NB ::=      SEQUENCE {
        criticalExtensions                      CHOICE {
            rrcConnectionResumeRequest-r13          RRCConnectionResumeRequest-NB-r13-IEs,
            criticalExtensionsFuture                SEQUENCE { } RRCConnectionResumeRequest-NB-r16-
IEs
        }
}
RRCConnectionResumeRequest-NB-r16-IEs ::=       SEQUENCE {
        resumeID-r16                            ResumeIdentity-r13,
        shortResumeMAC-I-r16                    ShortMAC-I,
        resumeCause-r16                         EstablishmentCause-NB-r13,
        earlyContentionResolution-r16           BOOLEAN,
        cqi-NPDCCH-r16                          CQI-NPDCCH-NB-r14,
        spare                                   BIT STRING (SIZE (4))
}
-- ASN1STOP
-- ASN1START
EstablishmentCause-NB-r13 ::=           ENUMERATED {
                                            mt-Access, mo-Signalling, mo-Data, mo-ExceptionData,
                                            delayTolerantAccess-v1330, spare3 rna-Update, spare2,
spare1}
-- ASN1STOP
```

When UE is using UP CIoT 5GS optimization, RAN always provides NCC in the suspend (or release) message and eMTC or NB-IoT UE may reuse the only AS security activating procedure defined for RRC INACTIVE or same whole procedure as resuming the RRC connection from RRC_INACTIVE. In another option, the AS security activating procedure is same as the Rel-15 EDT or the resumption procedure is same as resuming Rel-15 EDT.

RRC Connection Setup Complete Message eMTC UE may re-use the existing the RRCConnectionSetupComplete message such that the indicated UE capability for the features (ce-ModeB-r13, up-CIoT-EPS-Optimisation-r13, cp-CIoT-EPS-Optimisation-r13) corresponds to the same or similar feature supported by 5GCN if the RRC connection establishment or resume request message in Msg3 indicated the 5GCN. The attachWithoutPDN-Connectivity may be reported during registration process to 5GCN or also in the RRCConnectionSetupComplete message. New IEs may be introduced to carry the UE capabilities from RAN to AMF in N2 signaling.

In another option, the RRCConnectionSetupComplete message may be extended to indicate the capabilities to 5GCN separately.

```
RRCConnectionSetupComplete-v1530-IEs ::= SEQUENCE
        logMeasAvailableBT-r15              ENUMERATED {true}               OPTIONAL,
        logMeasAvailableWLAN-r15            ENUMERATED {true}               OPTIONAL,
        idleMeasAvailable-r15               ENUMERATED {true}               OPTIONAL,
        flightPathInfoAvailable-r15         ENUMERATED {true}               OPTIONAL,
        connectTo5GC-r15                        ENUMERATED {true}               OPTIONAL,
        registeredAMF-r15                       RegisteredAMF-r15               OPTIONAL,
        s-NSSAI-list-r15                    SEQUENCE (SIZE (1..maxNrofS-NSSAI-r15)) OF S-NSSAI-r15
OPTIONAL,
        ng-5G-S-TMSI-Bits-r15                   CHOICE {
            ng-5G-S-TMSI-r15                        NG-5G-S-TMSI-r15,
            ng-5G-S-TMSI-Part2-r15                  BIT STRING (SIZE (8))
        }                                                                   OPTIONAL,
        nonCriticalExtension                SEQUENCE { } RRCConnectionSetupComplete-v16xy-IEs
                OPTIONAL
}

RRCConnectionSetupComplete-v16xy-IEs ::= SEQUENCE {
        ce-ModeB-r16                        ENUMERATED {supported}          OPTIONAL,
        up-CIoT-5GS-Optimisation-r16        ENUMERATED {true}               OPTIONAL,
        cp-CIoT-5GS-Optimisation-r16        ENUMERATED {true}               OPTIONAL,
        gummei-Type-v16xy                   ENUMERATED {mappedFrom5G}       OPTIONAL,
        guami-Type-v16xy                        ENUMERATED {native, mapped}     OPTIONAL,
        nonCriticalExtension                SEQUENCE { }                    OPTIONAL
}
```

13

14

Furthermore, RRC_INACTIVE feature may be optional for eMTC UE or NB-IoT UE. The UE may report the capability using UE-EUTRA-Capability IE or UE-Capability-NB IE to RAN during initial connection establishment.

In another option, UE may report the capability in 5 RRCConnectionSetupComplete message during RRC connection establishment or registration process as shown below. The rrc-Inactive-r16 in RRCConnectionSetupComplete message may be taken as UE's preference to move to RRC INACTIVE state when UE is using CP IoT 5GS optimization or UP IoT 5GS optimization or not using any optimization.

```
RRCConnectionSetupComplete-v16xy-IEs ::= SEQUENCE {
    rrc-Inactive-r16                    ENUMERATED {supported}        OPTIONAL,
    nonCriticalExtension                SEQUENCE { }                  OPTIONAL
}
```

For NB-IoT UEs, the RRCConnectionSetupComplete-NB message may be extended. In one option, the up-CIoT-EPS-Optimisation-r13 capability (or attachWithoutPDN-Connectivity-r13) field may be reused for 5GCN since RRC message in Msg3 indicates the service request was for 5GCN.

RRCConnectionSetupComplete-NB message

```
- - ASN1START
RRCConnectionSetupComplete-NB : : =              SEQUENCE {
    rrc-TransactionIdentifier                        RRC-TransactionIdentifier,
    criticalExtentsions                              CHOICE{
        rrcConnectionsSetupComplete-r13                  RRCConnectionSetupComplete-NB-r13-IEs,
        criticalExtenstionsFuture                        SEQUENCE { }
    }
}
RRCConnectionsSetupComplete-NB-r13-IEs : : = SEQUENCE {
    selectedPLMN-Identity-r13                        INTEGER (1..maxPLMN-r11),
    s-TMSI-r13                                       S-TMSI                      OPTIONAL,
    registeredMME-r13                                RegisteredMME               OPTIONAL,
    dedicatedInfoNAS-r13                             DedicatedInfoNAS,
    attachWithoutPDN-Connectivity-r13                ENUMERATED {true}           OPTIONAL,
    up-CIoT-EPS-Optimisation-r13                     ENUMERATED {true}           OPTIONAL,
    lateNonCriticalExtension                         OCTET STRING                OPTIONAL,
    nonCriticalExtension                             RRCConnectionsSetupComplete-NB-v1430-IEs    OPTIONAL
}
RRCConnectionSetupComplete-NB-v1430-IEs : : =    SEQUENCE {
    gummei-Type-r14                                  ENUMERATED { mapped}        OPTIONAL,
    dcn-ID-r14                                       INTEGER (0..65535)          OPTIONAL,
    nonCriticalExtension                             RRCConnectionSetupComplete-NB-v1470-IEs    OPTIONAL
}
RRCConnectionSetupComplete-NB-v1470-IEs : : =    SEQUENCE {
    measResultServCell-r14                           MeasResultServCell-NB-r14   OPTIONAL,
    nonCriticalExtension                             RRCConnectionSetupComplete-NB-v16xy-
IEs                OPTIONAL
}
RRCConnectionSetupComplete-NB-v16xy-IEs    : : = SEQUENCE {
    up-CIoT-5GS-Optimisation-r16                     ENUMERATED {true}             OPTIONAL,
    s-NSSAI-list-r16                                 SEQUENCE (SIZE (1..maxNrofS-NSSAI-r15)) OF S-NSSAI-r15
    registeredAMF-r16                                RegisteredAMF-r16             OPTIONAL,
    ng-5G-S-TMSI-Bits-r16                            CHOICE {
        ng-5G-S-TMSI-r16                                 NG-5G-S-TMSI-r15,
        ng-5G-S-TMSI-Part2-r16                           BIT STRING (SIZE (8))
    }
    gummei-Type-v16xy                                ENUMERATED {mappedFrom5G}     OPTIONAL,
    guami-Type-v16xy                                 ENUMERATED {native, mapped}   OPTIONAL,
    rrc-Inactive-r16                             ENUMERATED {supported}       OPTIONAL,
    nonCriticalExtension                             SEQUENCE { }                  OPTIONAL
}
RegisteredAMF-r16 : : =                          SEQUENCE {
    plmn-Identity-r16                                PLMN-Identity                 OPTIONAL,
    amf-Identifier-r16                               AMF-Identifier-r15
}
- - ASN1STOP
```

Exemplary Embodiment #2 Support Indication and Enhance Coverage Restriction in RAN with Connectivity to 5GCN For eMTC UE, cellAccessRelatedInfo-5GC-r15 in SIB1 may be re-used as the indication for supporting connectivity to 5GCN. Existing mechanism such as cellSelectionInfoCE, PRACH configuration and RSRP-based access barring mechanism may be used for the enhanced coverage restriction by RAN.

Similar to EPC, 5GC (AMF) also stores the UE's usage setting (data or voice). Based on UE's usage setting, 5GCN sends indication to RAN via N2 signaling that CE mode B is restricted or not for the UE. Similarly, 5GCN may indicate whether use of coverage enhancement is restricted nor not to RAN via N2 signaling.

In addition, SIB2 indicates whether or not CP or UP 5GS optimization is supported when connected to 5GCN. It also indicates whether CP-EDT and/or UP-EDT is supported when connected to 5GCN.

| SystemInformationBlockType2 information element |
|---|

```
- - ASN1START
SystemInformationBlockType2 : : =          SEQUENCE {
    ac-BarringInfo                             SEQUENCE {
        ac-BarringForEmergency                     BOOLEAN,
        ac-BarringForMO-Signalling                 AC-BarringConfig          OPTIONAL,    - - Need
OP
        ac-BarringForMo-Data                       AC-BarringConfig          OPTIONAL,    - - Need
OP
    }                                                                        OPTIONAL,    - - Need
OP
    radioResourceConfigCommon                  RadioResourceConfigCommonSIB,
    ue-TimersAndConstants                      UE-TimersAndConstants,
    freqInfo                                   SEQUENCE {
        ul-CarrierFreq                             ARFCN-ValueEUTRA          OPTIONAL,    - - Need
OP
        ul-Bandwidth                               ENUMERATED {n6, n15, n25, n50, n75, n100}
                                                                             OPTIONAL,    - - Need
OP
        additionalSpectrumEmission                 AdditionalSpectrumEmission
    },
    mbsfn-SubframeConfigList                    MBSFN-SubframeConfigList      OPTIONAL,    - - Need
OR
    timeAlignmentTimerCommon                    TimeAlignmentTimer,
    . . . ,
    lateNonCriticalExtension         OCTET STRING (CONTAINING SystemInformationBlockType2-v8h0-
IEs)              OPTIONAL,
    [[    ssac-BarringForMMTEL-Voice-r9         AC-BarringConfig             OPTIONAL,    - - Need
OP
          ssac-BarringForMMTEL-Video-r9         AC-BarringConfig             OPTIONAL     - - Need
OP
    ]],
    [[    ac-BarringForCSFB-r10                 AC-BarringConfig             OPTIONAL     - - Need OP
    ]],
    [[    ac-BarringSkipForMMTELVoice-r12       ENUMERATED {true}            OPTIONAL,    - - Need OP
          ac-BarringSkipForMMTELVideo-r12       ENUMERATED {true}            OPTIONAL,    - - Need OP
          ac-BarringSkipForSMS-r12              ENUMERATED {true}            OPTIONAL,    - - Need OP
          ac-BarringPerPLMN-List-r12            AC-BarringPerPLMN-List-r12   OPTIONAL     - - Need OP
    ]],
    [[    voiceServiceCauseIndication-r12       ENUMERATED {true}            OPTIONAL     - - Need OP
    ]],
    [[    acdc-BarringForCommon-r13             ACDC-BarringForCommon-r13    OPTIONAL,    - - Need
OP
          acdc-BarringPerPLMN-List-r13          ACDC-BarringPerPLMN-List-r13 OPTIONAL,    - - Need
OP
    ]],
    [[
          udt-RestrictingForCommon-r13          UDT-Restricting-r13          OPTIONAL,    - - Need
OR
          udt-RestrictingPerPLMN-List-r13       UDT-RestrictingPerPLMN-List-r13 OPTIONAL, - - Need
OR
          cIoT-EPS-OptimisationInfo-r13         CIOT-EPS-OptimisationInfo-r13 OPTIONAL,   - - Need
OP
          useFullResumeID-r13                   ENUMERATED {true}            OPTIONAL,    - - Need
OP
    ]],
    [[    unicastFreqHoppingIND-r13             ENUMERATED {true}            OPTIONAL,    - - Need
OP
    ]],
    [[    mbsfn-SubframeConfigList-v1430        MBSFN-SubframeConfigList-v1430 OPTIONAL,  - - Need
OP
          videoServiceCauseIndication-r14       ENUMERATED {true}            OPTIONAL,    - - Need
OP
    ]],
    [[    plmn-InfoList-r15                     PLMN-InfoList-r15            OPTIONAL,    - - Need
OP
    ]],
```

-continued

| SystemInformationBlockType2 information element | | | |
|---|---|---|---|
| [[    cp-EDT-r15 | ENUMERATED {true} | OPTIONAL, | - - Need |
| OR | | | |
|        up-EDT-r15 | ENUMERATED {true} | OPTIONAL, | - - Need |
| OR | | | |
|        idleModeMeasurements-r15 | ENUMERATED {true} | OPTIONAL, | - - Need |
| OR | | | |
|        reducedCP-LatencyEnabled-r15 | ENUMERATED {true} | OPTIONAL, | - - Need |
| OR | | | |
| ]], | | | |
| [[    mbms-ROM-ServiceIndication-r15 | ENUMERATED {true} | OPTIONAL, | - - Need OR |
| ]], | | | |
| [[ | | | |
| cIoT-5GS-OptimisationInfo-r16 | CIOT-5GS-OptimisationInfo-r16 | OPTIONAL, | - - Need OP |
| cp-EDT-5GS-r15 | ENUMERATED {true} | OPTIONAL, | - - Need |
| OR | | | |
| up-EDT-5GS-r15 | ENUMERATED {true} | OPTIONAL, | - - Need |
| OR | | | |
| ]] | | | |
| } | | | |
| CIOT-5GS-OptimisationInfo-r16 : : = SEQUENCE (SIZE (1..maxPLMN-r11)) OF CIOT-OptimisationPLMN-r16 | | | |
| CIOT-OptimisationPLMN-r16 : : = SEQUENCE { | | | |
|        up-CIoT-5GS-Optimisation-r16 | ENUMERATED {true} | OPTIONAL, | - - Need OP |
|        cp-CIoT-5GS-Optimisation-r16 | ENUMERATED {true} | OPTIONAL, | - - Need OP |
|        attachWithoutPDN-Connectivity-r13 | ENUMERATED {true} | OPTIONAL | - - Need OP |
| } | | | |

For NB-IoT, new cell access related information for connectivity to 5GCN and whether or not the cell is barred for connectivity to 5GCN may be broadcast in SIB1-NB.

| SystemInformationBlockType1-NB message | | | |
|---|---|---|---|
| - - ASN1START | | | |
| SystemInformationBlockType1-NB : : = | SEQUENCE { | | |
|    hyperSfn-MSB-r13 | BIT STRING (SIZE (8)), | | |
|    cellAccessRelatedInfo-r13 | SEQUENCE { | | |
|        plmn-IdentityList-r13 | PLMN-IdentityList-NB-r13, | | |
|        trackingAreaCode-r13 | TrackingAreaCode, | | |
|        cellIdentity-r13 | CellIdentity | | |
|        cellBarred-r13 | ENUMERATED {barred, notBarred}, | | |
|        intraFreqReselection-r13 | ENUMERATED {allowed, notAllowed} | | |
|    }, | | | |
|    cellSelectionInfo-r13 | SEQUENCE { | | |
|        q-RxLevMin-r13 | Q-RxLevMin, | | |
|        q-QualMin-r13 | Q-QualMin-r9 | | |
|    }, | | | |
|    p-Max-r13 | P-Max | OPTIONAL, | - - Need OP |
|    freqBandIndicator-r13 | FreqBandIndicator-NB-r13, | | |
|    freqBandInfo-r13 | NS-PmaxList-NB-r13 | OPTIONAL, | - - Need OR |
|    multiBandInfoList-r13 | MultiBandInfoList-NB-r13 | OPTIONAL, | - - Need OR |
|    downlinkBitmap-r13 | DL-Bitmap-NB-r13 | OPTIONAL, | - - Cond SIB1 |
|    eutraControlRegionSize-r13 | ENUMERATED    {n1, n2, n3} | OPTIONAL, | - - Cond inband |
|    nrs-CRS-PowerOffset-r13 | ENUMERATED    {dB-6, | dB-4dot77, | dB-3, |
|  |  | dB-1dot77, dB0, | dB1, |
|  |  | dB1dot23, dB2, | dB3, |
|  |  | dB4, | dB4dot23, | dB5, |
|  |  | dB6, | dB7, | dB8, |
|  |  | dB9}    OPTIONAL, | - - Cond inband-SamePCI |
|    schedulingInfoList-r13 | SchedulingInfoList-NB-r13, | | |
|    si-WindowLength-r13 | ENUMERATED    {ms160, ms320, ms480, ms640, | | |
|  |                        ms960, ms1280, ms1600, spare1} | | |
|    si-RadioFrameOffset-r13 | INTEGER (1..15)            OPTIONAL,    - - Need OP | | |
|    systemInfoValueTagList-r13 | SytemInfoValueTagList-NB-r13 | OPTIONAL, | - - Need OR |
|    lateNonCriticalExtension | OCTET STRING | OPTIONAL, | |
|    nonCriticalExtension | SytstemInformationBlockType1-NB-v1350 | OPTIONAL | |
| } | | | |
| SystemInformationBlockType1-NB-v1350 : : = | SEQUENCE { | | |
|    cellSelectionInfo-v1350 | CellSelectionInfo-NB-v1350 | OPTIONAL, | - - Cond Qrxlevmin |
|    nonCriticalExtension | SystemInformationBlockType1-NB-v1430 | OPTIONAL | |
| } | | | |

-continued

| SystemInformationBlockType1-NB message | | | |
|---|---|---|---|
| SystemInformationBlockType1-NB-v1430 : : = | SEQUENCE { | | |
| cellSelectionInfo-v1350 | CellSelectionInfo-NB-v1430 | | OPTIONAL, - - Need OR |
| nonCriticalExtension | SystemInformationBlockType1-NB-v1450 | | |
| OPTIONAL | | | |
| } | | | |
| SystemInformationBlockType1-NB-1450 : : = | SEQUENCE { | | |
| nrs-CRS-PowerOffset-v1450 | ENUMERATED | {dB-6      dB-4dot77, | dB-3, |
|  |  | dB-1dot77,   dB0, | dB1, |
|  |  | dB1dot23,   dB2, | dB3, |
|  |  | dB4,      dB4dot23, | dB5, |
|  |  | dB6,      dB7, | dB8, |
|  |  | dB9}      OPTIONAL, | - - Cond inband- |
| SamePCI-ExceptAnchor | | | |
| nonCriticalExtension | SystemInformationBlockType1-NB-v1530 | | |
| OPTIONAL | | | |
| } | | | |
| SystemInformationBlockType1-NB-v1530 : : = SEQUENCE { | | | |
| tdd-Parameters-r15 | SEQUENCE { | | |
| tdd-Config-r15 | TDD-Config-NB-r15, | | |
| tdd-SI-CarrierInfo-r15 | ENUMERATED {anchor, non-anchor}, | | |
| tdd-SI-SubframesBitmap-r15 | DL-Bitmap-NB-r13 | | OPTIONAL - - Cond TDD- |
| SI-NonAnchor | | | |
| } OPTIONAL,    - - Cond TDD | | | |
| schedulingInfoList-v1530 | SchedulingInfoList -NB-v1530 | | OPTIONAL, - - Need OR |
| nonCriticalExtension | SystemInformationBlockType1-NB-v16xy | | |
| OPTIONAL | | | |
| } | | | |
| SystemInformationBlockType1-NB-v16xy : : = | SEQUENCE { | | |
| cellAccessRelatedInfo-5GC-r16 | SEQUENCE { | | |
| cellBarred-5GC-r16 | ENUMERATED {barred, notBarred}, | | |
| cellAccessRelatedInfoList-5GC-r16 | SEQUENCE (SIZE (1..maxPLMN-r11)) OF | | |
|  | CellAccessRelatedInfo-5GC-NB-r16 | | |
| } OPTIONAL,    - - Need OP | | | |
| nonCriticalExtension | SEQUENCE { } | | OPTIONAL |
| } | | | |
| CellAccessRelatedInfo-5GC-NB-r16 : : = | SEQUENCE { | | |
| plmn-IdentityList-r16 | PLMN-IdentityList-NB-r16, | | |
| ran-AreaCode-r16 | RAN-AreaCode-r15 OPTIONAL,   - - Need OR | | |
| trackingAreaCode-5GC-r16 | TrackingAreaCode-5GC-r15, | | |
| cellIdentity-5GC-r16 | CellIdentity-5GC-r15 | | |
| } | | | |
| PLMN-IdentityList-NB-r16 : : = | SEQUENCE (SIZE (1..maxPLMN-r11)) OF PLMN-IdentityInfo-NB-r16 | | |
| PLMN- IdentityInfo-NB-r16 : : = | SEQUENCE { | | |
| plmn-Identity-5GC-r16 | CHOICE{ | | |
| plmn-Identity-r16 | PLMN-Identity, | | |
| plmn-Index-r16 | INTEGER (1..maxPLMN-r11) | | |
| }, | | | |
| cellReservedForOperatorUse-r15 | ENUMERATED {reserved, notReserved}, | | |
| attachWithoutPDN-Connectivity-r13 | ENUMERATED {true}    OPTIONAL | | - - Need OP |
| } | | | |
| PLMN-IdentityList-NB-r13 : : = | SEQUENCE (SIZE (1..maxPLMN-r11)) OF PLMN-IdentityInfo-NB-r13 | | |
| PLMN-IdentityInfo-NB-r13 : : = | SEQUENCE { | | |
| plmn-Identity-r13 | PLMN-Identity, | | |
| cellReservedForOperatorUse-r13 | ENUMERATED {reserved, notReserved}, | | |
| attachWithoutPDN-Connectivity-r13 | ENUMERATED {true}    OPTIONAL | | - - Need OP |
| } | | | |
| - - ASN1STOP | | | |

Exemplary Embodiment #3 EDT Procedure when Using IoT 5GS Optimization

When using EDT in UP IoT 5GS optimization or in RRC INACTIVE state, eMTC UE or NB IoT UE may reuse the same RRC connection resume request message for connecting 5GCN in CCCH that multiplexes UL data in DTCH in Msg3. UE may reuse the same PRACH resource configured for EDT to receive larger UL grant for Msg3. Similarly, RRC connection release message may be reused in Msg4. RRC/MAC Modeling for Integrity Protection of EDT Data However, additionally the UL data may be integrity protected when using EDT. For this purpose, the calculation of shortResumeMAC-I may be delayed until hash code of UL EDT data is available. For example, during the con-struction of RRCConnectionResumeRequest message, RRC first instructs lower layer to resume integrity protection and ciphering algorithm and build SDU at PDCP layer or RLC layer or MAC layer and request to provide the HASH code of the UL SDU. If the HASH code is calculated from MAC SDU of the UL EDT data, then RLC layer provides the RLC SDU to MAC layer without performing logical channel prioritization by MAC. Then only taking into account the HASH code of the UL PDU, RRC calculates the shortResumeMAC-I and delivers the RRCConnectionResumeRequest message to lower layer.

In another option, the newly calculated shortResume-MAC-I from the MAC SDU of the UL data is provided to MAC layer and it is added in front of the MAC SDU and transmitted while the RRCConnectionResumeRequest message still includes the shortResumeMAC-I calculated in legacy way. When RAN receives the UL data, after de-multiplexing, the first two bytes or four bytes (16 or 32 bits) of the SDU in DTCH should correspond to the newly calculated shortResumeMAC-I.

This RRC/MAC modeling for calculating the new shortResumeMAC-I for EDT is also applicable when UE is connected to EPC or when UE is in RRC INACTIVE state.

For both eMTC and NB-IoT when using EDT in CP IoT 5GS optimization, a new UL-CCCH message class extension for the new RRCEarlyDataRequest message may be defined or critical extension for the existing RRCEarlyDataRequest may be defined or a new non-critical extension of RRCEarlyDataRequest may be defined.

Example of UL-CCCH message class extension is shown below.

```
UL-CCCH-MessageType : : = CHOICE {
    c1                          CHOICE {
        rrcConnectionReestablishmentRequest        RRCConnectionReestablishmentRequest,
        rrcConnectionRequest                       RRCConnectionRequest
    },
    messageClassExtension       CHOICE {
        c2                          CHOICE {
        rrcConnectionResumeRequest-r13             RRCConnectionResumeRequest-r13
        },
        messageClassExtensionFuture-r13    CHOICE {
            c3                          CHOICE {
            rrcEarlyDataRequest-r15             RRCEarlyDataRequest-r15,
            rrcEarlyDataRequest-r16             RRCEarlyDataRequest-r16,
            spare2  NULL,   spare1    NULL
            },
            messageClassExtensionFuture-r15        SEQUENCE { }
        }
    }
}
- - ASN1STOP
```

```
                        RRCEarlyDataRequest message

- - ASN1START
RRCEarlyDataRequest-r16 : : =          SEQUENCE {
    criticalExtensions                    CHOICE {
rrcEarlyDataRequest-r16                    RRCEarlyDataRequest-5GC-r16-IEs,
criticalExtensionsFuture                  SEQUENCE { }
    }
}
RRCEarlyDataRequest-5GC-r16-IEs : : =   SEQUENCE {
    ng-5G-S-TMSI-r16                      BIT STRING (SIZE (48)) ,
    establishmentCause-r16               ENUMERATED {    mo-Data-r15, delayTolerantAccess-r15},
    dedicatedInfoNAS-r16                 DedicatedInfoNAS,
    nonCriticalExtension                 SEQUENCE { } OPTIONAL
}
- - ASN1STOP
```

An example of critical extension of RRCEarlyDataRequest message is shown below.

```
                        RRCEarlyDataRequest message

- - ASN1START
RRCEarlyDataRequest-r15 : : =          SEQUENCE {
    criticalExtensions                    CHOICE {
        rrcEarlyDataRequest-r15                RRCEarlyDataRequest-r15-IEs,
        rrcEarlyDataRequest-r16               RRCEarlyDataRequest-5GC-r16-IEs
    }
}
OR
- - ASN1START
RRCEarlyDataRequest-r15 : : =          SEQUENCE {
    criticalExtensions                    CHOICE {
        rrcEarlyDataRequest-r15                RRCEarlyDataRequest-r15-IEs,
        later                                  CHOICE {
            rrcEarlyDataRequest-r16                RRCEarlyDataRequest-5GC-r16-IEs
            criticalExtensionsFuture              SEQUENCE {
        }
    }
}
```

-continued

| RRCEarlyDataRequest message |
| --- |

```
RRCEarlyDataRequest-r15-IEs : : = SEQUENCE {
    s-TMSI-r15                    S-TMSI,
    establishmentCause-r15        ENUMERATED {   mo-Data-r15, delayTolerantAccess-r15},
    dedicatedInfoNAS-r15             DedicatedInfoNAS,
    nonCriticalExtension          SEQUENCE { }    OPTIONAL
}
RRCEarlyDataRequest-r15-IEs: : =   SEQUENCE {
    ng-5G-S-TMSI-r16                 BIT STRING (SIZE (48)),
    establishmentCause-r16        ENUMERATED {   mo-Data-r15, delayTolerantAccess-r15},
    dedicatedInfoNAS-r16             DedicatedInfoNAS,
    nonCriticalExtension          SEQUENCE { }    OPTIONAL
}
-- ASN1STOP
```

Example of Non-Critical Extension

```
RRCEarlyDataRequest-r15-IEs : : = SEQUENCE {
    s-TMSI-r15                    S-TMSI,
    establishmentCause-r15        ENUMERATED {    mo-Data-r15, delayTolerantAccess-r15},
    dedicatedInfoNAS-r15            DedicatedInfoNAS,
    nonCriticalExtension            RRCEarlyDataRequest-r16-IEs               OPTIONAL
}
RRCEarlyDataRequest-r16-IEs : : = SEQUENCE {
    ng-5G-S-TMSI-Part2-v16xy       BIT STRING (SIZE (8) ), OPTIONAL
    nonCriticalExtension          SEQUENCE { } OPTIONAL
}
```

| RRCEarlyDataRequest field descriptions |
| --- | establishmentCause
Provides the establishment cause for the RRC Early Data Request as provided by the upper
layers. W.r.t. the cause value names: 'mo' stands for 'Mobile Originating'. eNB is not expected to
reject a RRCEarlyDataRequest due to unknown cause value being used by the UE.
    ng-5G-S-TMSI-Part2
The leftmost 8 bits of 5G-S-TMSI. If this field is present, the s-TMSI field represents the
rightmost 40 bits of 5G-S-TMSI.

Similarly, when EDT is complete, RAN may send the RRCEarlyDataComplete message in Msg4. In one option, DL-CCCH message class extension may be used to introduce new rrcEarlyDataComplete-r16 or existing RRCEarlyDataComplete message may extended to include further information regarding 5GCN, for example shorter wait timer value and carrier redirection information. In another option, extendedWaitTime-r15 (without new wait time) is reused but it is clarified that maximum value that may be configured with extendedWaitTime-r15 is 16 when connected to 5GCN.

Example

| RRCEarlyDataComplete message | | | |
| --- | --- | --- | --- |
| - - ASN1START | | | |
| RRCEarlyDataComplete-r15 : : = | SEQUENCE { | | |
| criticalExtensions | CHOICE { | | |
| rrcEarlyDataCompete-r15 | RRCEarlyDataComplete-r15-IEs, | | |
| } | | | |
| } | | | |
| RRCEarlyDataComplete-r15-IEs : : = | SEQUENCE { | | |
| dedicatedInfoNAS-r15 | DedicatedInfoNAS | OPTIONAL, | - - Need |
| ON | | | |
| extendedWaitTime-r15 | INTEGER (1..1800) | OPTIONAL, | - - Need |
| ON | | | |
| idleModeMobilityControlInfo-r15 | IdleModeMobilityControlInfo | OPTIONAL, | - - Need |

-continued

---

RRCEarlyDataComplete message

---

```
OP
    idleModeMobilityControlInfoExt-r15        IdleModeMobilityControlInfo-v9e0        OPTIONAL,        - -
Cond IdleInfoEUTRA
    redirectedCarrierInfo-r15                 RedirectedCarrierInfo-r15-IEs           OPTIONAL,        - - Need
ON
    nonCriticalExtension                      RRCEarlyDataComplete-r16-IEs
        OPTIONAL
}
RRCEarlyDataComplete-r16-IEs : : =         SEQUENCE {
    WaitTime-r16                              INTEGER (1..16)        OPTIONAL,        - - Need ON
    redirectedCarrierInfo-r16                 RedirectedCarrierInfo-r16-IEs           OPTIONAL,        - - Need
ON
    nonCriticalExtension                      SEQUENCE { }                            OPTIONAL
}
RedirectedCarrierInfo-r15-IEs : : =            CHOICE {
    eutra-r15                                 ARFCN-ValueEUTRA-r9,
    geran-r15                                 CarrierFreqsGERAN,
    utra-FDD-r15                              ARFCN-ValueUTRA,
    cdma2000-HRPD-r15                         CarrierFreqCDMA2000,
    cdma2000-1xRTT-r15                        CarrierFreqCDMA2000,
    utra-TDD-r15                              CarrierFreqListUTRA-TDD-r10
}
RedirectedCarrierInfo-r16-IEs : : =            CHOICE {
    nr-r16                                    CarrierInfoNR-r15,
 . . .
}
- - ASN1STOP
```

---

Exemplary Embodiment #4 Paging Monitoring when in RRC_IDLE or RRC_INACTIVE

When UE is released from 5GCN but N1 signaling is not disabled (i.e., S1 signaling is not enabled), in one option, UE determines the paging narrowband (for NB-IoT non-anchor carrier), paging frame and paging occasion using UE_ID that is calculated from the IMSI and monitors only S-TMSI or IMSI (I-RNTI in RRC INACTIVE) in the paging message. This is done either 5GCN (AMF) having mapping function from NG-5G-S-TMSI to IMSI to calculate UE ID for paging or 5GCN asking MME to page the UE.

In another option, UE monitors all UE IDs, S-TMSI, IMSI and NG-5G-S-TMSI (or I-RNTI) in the paging message, however the paging narrowband (for NB-IoT non-anchor carrier), paging frame and paging occasion are determined by UE ID calculated from IMSI.

In another option, UE monitors all UE IDs, S-TMSI, IMSI and NG-5G-S-TMSI (or I-RNTI) in the paging message, or in another option UE monitors only NG-5G-S-TMSI (or I-RNTI, if in RRC INACTIVE state) or both NG-5G-S-TMSI and I-RNTI in RRC INACTIVE state in the paging message, however the paging narrowband (for NB-IoT non-anchor carrier), paging frame and paging occasion are determined by UE ID calculated from NG-5G-S-TMSI as shown below in color font. For eMTC or NB-IoT UE, NG-5G-S-TMSI may also be used as decimal number similar to IMSI in legacy UE ID calculation.

Example in TS 36.304, Section 7.1

UE_ID:

If the UE supports E-UTRA connected to 5GC and NAS indicated to use 5GC for the selected cell:

5G-S-TMSI mod 1024, if P-RNTI is monitored on PDCCH.

5G-S-TMSI mod 4096, if P-RNTI is monitored on NPDCCH.

5G-S-TMSI mod 16384, if P-RNTI is monitored on MPDCCH or if P-RNTI is monitored on NPDCCH and the UE supports paging on a non-anchor carrier, and if paging configuration for non-anchor carrier is provided in system information.

else

IMSI mod 1024, if P-RNTI is monitored on PDCCH.

IMSI mod 4096, if P-RNTI is monitored on NPDCCH.

IMSI mod 16384, if P-RNTI is monitored on MPDCCH or if P-RNTI is monitored on NPDCCH and the UE supports paging on a non-anchor carrier, and if paging configuration for non-anchor carrier is provided in system information.

In another option, to redistribute the paging load between UEs connected to EPC and 5GCN, different weight factors may be defined for NB-IoT UEs connected to 5GCN as W(i): Weight for NB-IoT paging carrier i.

W: Total weight of all NB-IoT paging carriers, i.e. $W=W(0)+W(1)+ . . . +W(Nn-1)$.

W5G(i): Weight for NB-IoT paging carrier I when connected to 5GCN.

W5G: Total weight of all NB-IoT paging carriers, i.e.

$$W5G=W5G(0)+W5G(1)+ \ldots +W5G(Nn-1).$$

Similarly for eMTC UEs, weight factor or probability factor may be defined to select the PNB when connected to 5GCN.

To avoid waking up the not intended UEs connected to EPC when paging the UEs connected to 5GCN, a new DCI format to monitor P-RNTI on MPDCCH or NPDCCH may be defined to monitor only NG-5G-S-TMSI or I-RNTI in the paging message.

In another option, a new P-RNTI (e.g., P-RNTI-5G) may be defined such that UEs connected to 5GCN does not monitor legacy P-RNTI on the MPDCCH or NPDCCH.

To reduce the size of paging message for eMTC and NB-IoT, only rightmost 40 bits of NG-5G-S-TMSI may be included in the paging message or selective length of NG-5G-S-TMSI may be included in paging message. Example of UE Identity in Paging Message.

```
PagingUE-Identity : : =      CHOICE {
   s-TMSI                        S-TMSI,
   imsi                          IMSI,
   . . . ,
   ng-5G-S-TMSI-r15              NG-5G-S-TMSI-r15,
   fullI-RNTI-r15                I-RNTI-r15,
   ng-5G-S-TMSI-Part1-r16        BIT STRING (SIZE (40))
}
IMSI : : =                   SEQUENCE (SIZE (6..21)) OF IMSI-Digit
IMSI-Digit : : =             INTEGER (0..9)
```

Or NG-5G-S-TMSI may be included as decimal.

```
PagingUE-Identity : : =      CHOICE {
   s-TMSI                        S-TMSI,
   imsi                          IMSI,
   . . . ,
   ng-5G-S-TMSI-r15              NG-5G-S-TMSI-r15,
   fullI-RNTI-r15                I-RNTI-r15,
   ng-5G-S-TMSI-r16              NG-5G-S-TMSI-Integer
}
IMSI : :=                    SEQUENCE (SIZE (6..21)) OF IMSI-Digit
IMSI-Digit : : =             INTEGER (0..9)
NG-5G-S-TMSI-Integer : : =        SEQUENCE (SIZE (6..15))
                                  OF IMSI-Digit
```

In another option, to reduce the power consumption due to mobility, eMTC/NB-IoT UEs are allowed to camp in a cell which does not support connectivity to 5GCN, in case UE does not find any cells that support connectivity to 5GCN. NAS allows UE to camp in those cells without de-registration and registration process. When there is any MO or MT paging, UE may proceed registration process to EPC.

In this case, UE may keep monitoring the NG-5G-S-TMSI or IMSI and calculate PO using NG-5G-S-TMSI. In this case, AMF also provides the paging assistance information to RAN which does not support connectivity via S1 signaling by coordinating with MME (i.e., to determine PO and page the UE with NG-5g-S-TMSI or IMSI).

In another option, UE switches to legacy paging (monitoring P-RNTI in MPDCCH/NPDCCH and monitoring IMSI or previous S-TMSI or NG-5G-S-STMI in paging message). PO is determined using UE ID based on IMSI. In this case, AMF also provides the paging assistance information to RAN which does not support connectivity via S1 signaling by coordinating with MME (i.e., RAN may determine correct PO with provided UE ID and page the UE with NG-5g-S-TMSI or IMSI or previous S-TMSI) or AMF also requests MME to page the UE in those cells or if AMF does not receive any paging response from the UE.

Exemplary Embodiment #5 Support of RRC_INACTIVE State

For eMTC, RRC INACTIVE configuration (rrc-Inactive-Config-r15) and steering CN type (cn-Type-r15) and carrier redirection information nr-r15 in RRCConnectionRelease message may be reused. The steering CN type (cn-Type-r15)/carrier redirection information nr-r15 in RRCConnectionRelease message are also applicable when UE does not support RRC INACTIVE or RRC INACTIVE configuration is not provided. For eDRX, larger value of DRX cycles (ran-PagingCycle-r15 of rf512 or rf1024) may defined by extending the RRCConnectionRelease message. Also parameter nB and number of paging narrowbands may be defined for RRC INACTIVE state or only additional values of nB (T/512 and T/1024) may be defined as nB-v16xy.

```
RRC-InactiveConfig-r15 : : =   SEQUENCE {
   fullI-RNTI-r15                 I-RNTI-r15,
   shortI-RNTI-r15               ShortI-RNTI-r15,
   ran-PagingCycle-r15           ENUMERATED { rf32, rf64, rf128, rf256}   OPTIONAL,      - -
Need OR
   ran-NotificationAreaInfo-r15   RAN-NotificationAreaInfo-r15      OPTIONAL,    - -Need ON
   periodic-RNAU-timer-r15       ENUMERATED {min5, min10, min20, min30, min60,
                                    min120, min360, min720}   OPTIONAL,      - -Need OR
   nextHopChainingCount-r15      NextHopChainingCount   OPTIONAL,    - - Cond INACTIVE
   nonCriticalExtension          RRC-InactiveConfig-r16      OPTIONAL
}
RRC-InactiveConfig-r16 : : =   SEQUENCE {
   paging-narrowBands-r16         INTEGER (1..maxAvailNarrowBands-r13)   OPTIONAL,    - -Need OR
   ran-PagingCycle-r15           ENUMERATED {rf512, rf1024}   OPTIONAL,    - -Need OR
   nB-v16xy                           ENUMERATED {one512thT, one1024thT } OPTIONAL,        -
                                 -Need ON
   nonCriticalExtension          SEQUENCE{ }   OPTIONAL
}
```

In another option, the number of paging narrow bands and new version nB-v16xy may be defined in system information as radio resource common configuration.

| RadioResourceConfigCommon information element | | | | |
|---|---|---|---|---|
| - - ASN1START | | | | |
| RadioResourceConfigCommonSIB : : = | SEQUENCE { | | | |
| rach-ConfigCommon | RACH-ConfigCommon, | | | |
| bcch-Config | BCCH-Config, | | | |
| pcch-Config | PCCH-Config, | | | |
| prach-Config | PRACH-ConfigSIB, | | | |
| pdsch-ConfigCommon | PDSCH-ConfigCommon, | | | |
| pusch-ConfigCommon | PUSCH-ConfigCommon, | | | |
| pucch-ConfigCommon | PUCCH-ConfigCommon, | | | |
| soundingsRS-UL-ConfigCommon | SoundingRS-UL-ConfigCommon, | | | |
| uplinkPowerControlCommon | UplinkPowerControlCommon, | | | |
| ul-CyclicPrefixLength | UL-CyclicPrefixLength, | | | |
| . . . , | | | | |
| [[ uplinkPowerControlCommon-v1020 | UplinkPowerControlCommon-v1020 | OPTIONAL | - - Need OR | |
| ]], | | | | |
| [[ rach-ConfigCommon-v1250 | RACH-ConfigCommon-v1250 | OPTIONAL | - - Need OR | |
| ]], | PUSCH-ConfigCommon-v1270 | OPTIONAL | - - Need | |
| [[ pusch-ConfigCommon-v1270 | | | OR | |
| ]], | | | | |
| [[ bcch-Config-v1310 | BCCH-Config-v1310 | OPTIONAL, | - - Need OR | |
| pcch-Config-v1310 | PCCH-Config-v1310 | OPTIONAL, | - - Need OR | |
| freqHoppingParameters-r13 | FreqHoppingParameters-r13 | OPTIONAL, | - - Need OR | |
| pdsch-ConfigCommon-v1310 | PDSCH-ConfigCommon-v1310 | OPTIONAL, | - - Need OR | |
| pusch-ConfigCommon-v1310 | PUSCH-ConfigCommon-v1310 | OPTIONAL, | - - Need OR | |
| prach-ConfigCommon-v1310 | PRACH-ConfigSIB-v1310 | OPTIONAL, | - - Need OR | |
| pucch-ConfigCommon-v1310 | PUCCH-ConfigCommon-v1310 | OPTIONAL | - - Need OR | |
| ]], | | | | |
| [[ highSpeedConfig-r14 | HighSpeedConfig-r14 | OPTIONAL, | - - Need OR | |
| prach-Config-v1430 | PRACH-Config-v1430 | OPTIONAL, | - - Need OR | |
| pucch-ConfigCommon-v1430 | PUCCH-ConfigCommon-v1430 | OPTIONAL | - - Need OR | |
| ]], | | | | |
| [[ prach-Config-v1530 | PRACH-ConfigSIB-v1530 | OPTIONAL, | - - Cond EDT | |
| ce-RSS-Config-r15 | RSS-Config-r15 | OPTIONAL, | - - Need OR | |
| wus-Config-r15 | WUS-Config-r15 | OPTIONAL, | - - Need OR | |
| highSpeedConfig-v1530 | HighSpeedConfig-v1530 | OPTIONAL | - - Need OR | |
| ]], | | | | |
| [[ uplinkPowerControlCommon-v15xy | UplinkPowerControlCommon-v1530 | OPTIONAL | -- Need OR | |
| pcch-Config-v16xy | PCCH-Config-v16xy | OPTIONAL, | - - Need OR | |
| ]] | | | | |
| } | | | | |
| PCCH- Config-v16xy : : = | SEQUENCE { | | | |
| paging-narrowBands-r16 | INTEGER (1..maxAvailNarrowBands-r13) | OPTIONAL, | - -Need OR | |
| nB-v16xy | ENUMERATED {one512thT, one1024thT} | | | |
| | | OPTIONAL | - - Need ON | |
| } | | | | |

For NB-IoT, these information may be added in RRCConnectionRelease-NB message.

| RRCConnectionRelease-NB message |
|---|

```
- - ASN1START
RRCConnectionRelease-NB : : =        SEQUENCE {
    rrc-TransactionIdentifier              RRC-TransactionIdentifier,
    criticalExtensions                     CHOICE {
        c1                                     CHOICE {
            rrcConnectionRelease-r13               RRCConnectionRelease-NB-r13-IEs,
            spare1 NULL
        },
        criticalExtensionsFuture           SEQUENCE { }
    }
}
RRCConnectionRelease-NB-r13-IEs : : =   SEQUENCE {
    releaseCause-r13                       ReleaseCause-NB-r13,
    resumeIdentity-r13                     ResumeIdentity-r13            OPTIONAL,      - - Need OR
    extendedWaitTime-r13                   INTEGER (1..1800)            OPTIONAL,      - - Need ON
    redirectedCarrierInfo-r13              RedirectedCarrierInfo-NB-r13  OPTIONAL,      - - Need ON
    lateNonCriticalExtension               OCTET STRING                OPTIONAL,
    nonCriticalExtension                   RRCConnectionRelease-NB-v1430-IEs  OPTIONAL
}
RRCConnectionRelease-NB-v1430-IEs : : =   SEQUENCE {
    redirectedCarrierInfo-v1430            RedirectedCarrierInfo-NB-v1430    OPTIONAL,      - - cond
Redirection
    extendedWaitTime-CPdata-r14    INTEGER (1..1800)   OPTIONAL,   - - Cond NoExtendedWaitTime
    nonCriticalExtension                   RRCConnectionRelease-NB-v1530-IEs            OPTIONAL
}
RRCConnectionRelease-NB-v1530-IEs : : =   SEQUENCE {
    drb-ContinueROHC-r15                   ENUMERATED {true}            OPTIONAL,      - - Cond UP-
EDT
    nextHopChainingCount-r15               NextHopChainingCount          OPTIONAL,      - - Cond UP-
EDT
    nonCriticalExtension                   RRCConnectionRelease-NB-v16xy-IEs
    OPTIONAL
}
RRCConnectionRelease-NB-v16xy-IEs : : =   SEQUENCE {
    rrc-InactiveConfig-r16                 RRC-InactiveConfig-NB-r16     OPTIONAL,      - - Need OR
    cn-Type-r16                            ENUMERATED {epc, fivegc}   OPTIONAL,      - - Need OR
    redirectedCarrierInfo-r16              RedirectedCarrierInfo-NB-r16  OPTIONAL,      - - Need OR
    waitTime                               INTEGER (1..16),      - - OPTIONAL,           - - Need ON
    nonCriticalExtension                   SEQUENCE { }              OPTIONAL
}
RRC-InactiveConfig-NB-r16 : : =         SEQUENCE {
    fullI-RNTI-r16                         I-RNTI-r15,
    shortI-RNTI-r16                        ShortI-RNTI-r15,
    ran-PagingCycle-r16                    ENUMERATED { rf128, rf256, rf512, rf1024}        OPTIONAL,           - -
Need OR
    ran-NotificationAreaInfo-r16           RAN-NotificationAreaInfo-r15          OPTIONAL,      - -Need ON
    periodic-RNAU-timer-r16                ENUMERATED {min10, min10, min20, min30, min60,
                                               min120, min360, min720}        OPTIONAL,      - -Need OR
    nextHopChainingCount-r16               NextHopChainingCount      OPTIONAL,           - -Need ON
    nonCriticalExtension                   SEQUENCE{ }        OPTIONAL
}
ReleaseCause-NB-r13 : : =                   ENUMERATED {loadBalancingTAUrequired, other,
                                                       rrc-Suspend, spare1}

RedirectedCarrierInfo-NB-r13 : : =          CarrierFreq-NB-r13
RedirectedCarrierInfo-NB-r16 : : =          CarrierInfoNR-r15
RedirectedCarrierInfo-NB-v1430 : : =        SEQUENCE {
    redirectedCarrierOffsetDedicated-r14       ENUMERATED{
                                               dB1, dB2, dB3, dB4, dB5, dB6, dB8, dB10,
                                               dB12, dB14, dB16, dB18, dB20, dB22, dB24, dB26},
    t322-r14                                   ENUMERATED{
                                               min5, min10, min20, min30, min60, min120, min180,
                                               spare1}

}
- - ASN1STOP
```

For NB-IoT in RRC INACTIVE state, additionally new configuration for Paging Weight for anchor and non-anchor carriers, NPRACH probability to select NPRACH resource in anchor carrier in each repetition level, and mixed operation mode configuration may also be defined in RRCConnectionRelease-NB-v16xy-IEs or in SIB22-NB. Example in RRCConnectionRelease-NB-v16xy-IEs:

```
RRC-InactiveConfig-NB-r16 ::=    SEQUENCE {
   fullI-RNTI-r16                 I-RNTI-r15,
   shortI-RNTI -r16              ShortI-RNTI-r15,
   ran-PagingCycle-r16          ENUMERATED { rf128, rf256, rf512, rf1024}        OPTIONAL, --
Need OR
   ran-NotificationAreaInfo-r16  RAN-NotificationAreaInfo-r15         OPTIONAL,      -- Need ON
   periodic-RNAU-timer-r16      ENUMERATED {min10, min20, min30, min60,
                                        min120, min360, min720, min10}        OPTIONAL, --
Need OR
   nextHopChainingCount-r16      NextHopChainingCount      OPTIONAL,      -- Need ON
      pagingWeightAnchor-r16        PagingWeight-NB-r14                OPTIONAL,      -- Cond pcch-
config
      pagingWeightNonAnchor-r16                  PagingWeight-NB-r14 DEFAULT w1
   nonCriticalExtension          SEQUENCE { }   OPTIONAL
}
```

In another option, the RRC INACTIVE configuration may be provided using dedicated RRC signaling before releasing the UE (i.e., not in RRCConnectionRelease message).

In another option, when eMTC or NB-IoT UE supports RRC INACTIVE, NG RAN uses the same UE specific or default paging DRX cycle, shortest of them, notification area information used by the 5GCN so UE monitors the I-RNTI in the paging message and PO is determined using the same calculation as if UE is IDLE state when connected to 5GCN. UE may still monitor NG-5G-S-TMSI to know it is the CN paging.

In another option, RAN does not configure ran-Paging-Cycle and ran-NotificationAreaInfo as shown in below. NG RAN receives the assistance information from 5GCN (AMF) regarding UE specific DRX cycle, if any, and notification area information or suggested RAN notification area information so that it may send the RAN paging to necessary cells. Even though UE is in RRC INACTIVE state, UE does not need to require new RNA or RNA update timer or new RAN-based paging DRX cycle.

An Example for NB-IoT

```
RRC-InactiveConfig-NB-r16 ::=    SEQUENCE {
   fullI-RNTI-r16                 I-RNTI-r15,
   shortI-RNTI-r16              ShortI-RNTI-r15,
   nextHopChainingCount-r16      NextHopChainingCount          OPTIONAL, -- Need ON
   nonCriticalExtension          SEQUENCE { }      OPTIONAL
}
```

When in RRC INACTIVE, eMTC UE may re-use the same RRCConnectionResumeRequest-5GC-r15-IEs for resume request.

For NB-IoT UE, one spare bit in RRCConnectionResumeRequest-NB-r13-IEs may be used (i.e., when connectTo5GC-Inactive-r16 set to "1") to indicate that the resumeID-r13 corresponds to I-RNTI-r15 and one spare bit may be used to add an establishment cause rna-Update in EstablishmentCause-NB-r13. In this case, delayTolerantAccess-v1330 is not used.

RRCConnectionResumeRequest-NB message

```
-- ASN1START
RRCConnectionResumeRequest-NB ::=   SEQUENCE {
      criticalExtensions                         CHOICE {
         rrcConnectionResumeRequest-r13              RRCConnectionResumeRequest-NB-r13-IEs,
         criticalExtensionsFuture                    SEQUENCE { }
      }
}
RRCConnectionResumeRequest-NB-r13-IEs ::=        SEQUENCE {
      resumeID-r13                               ResumeIdentity-r13,
      shortResumeMAC-I-r13                       ShortMAC-I,
      resumeCause-r13                            EstablishmentCause-NB-r13,
      earlyContentionResolution-r14             BOOLEAN,
      cqi -NPDCCH-r14                           CQI-NPDCCH-NB-r14,
```

-continued

| RRCConnectionResumeRequest-NB message |
|---|

```
connectTo5GC-UP-r16                        ENUMERATED {true}           OPTIONAL,
connectTo5GC-Inactive-r16                  ENUMERATED {true}           OPTIONAL,
spare                                      BIT STRING (SIZE (4 2))
}
-- ASN1STOP
-- ASN1START
EstablishmentCause-NB-r13 ::=              ENUMERATED {
                                               mt-Access, mo-Signalling, mo-Data, mo-ExceptionData,
                                               delayTolerantAccess-v1330, spare3 rna-Update, spare2,
spare1}
-- ASN1STOP
```

In another option, a new critical extension of the RRC-ConnectionResumeRequest-NB or a new UL CCCH message class extension may be defined for RRC connection 20 resume request message with UE ID provided for RRC_INACTIVE (I-RNTI).

| RRCConnection ResumeRequest-NB message |
|---|

```
-- ASN1START
RRCConnectionResumeRequest-NB ::=  SEQUENCE {
    criticalExtensions                         CHOICE {
        rrcConnectionResumeRequest-r13             RRCConnectionResumeRequest-NB-r13-IEs,
        criticalExtensionsFuture                   SEQUENCE {} RRCConnectionResumeRequest-5GC-NB-
r16-IEs
    }
}
OR
RRCConnectionResumeRequest-NB ::=  SEQUENCE {
    criticalExtensions                         CHOICE {
        rrcConnectionResumeRequest-r13             RRCConnectionResumeRequest-NB-r13-IEs,
        criticalExtensionsFuture       SEQUENCE {}
        later                                      CHOICE {
            rrcConnectionResumeRequest-r16                 RRCConnectionResumeRequest-5GC-NB-r16-
IEs,
            criticalExtensionsFuture               SEQUENCE { }
        }
    }
}
RRCConnectionResumeRequest-NB-r13-IEs ::=      SEQUENCE {
    resumeID-r13                                   ResumeIdentity-r13,
    shortResumeMAC-I-r13                           ShortMAC-I,
    resumeCause-r13                                EstablishmentCause-NB-r13,
    earlyContentionResolution-r14                  BOOLEAN,
    cqi-NPDCCH-r14                                 CQI-NPDCCH-NB-r14,
    spare                                          BIT STRING (SIZE (4))
}
RRCConnectionResumeRequest- 5GC-NB-r16-IEs          SEQUENCE {
    resumeID-r16                                   I-RNTI-r15,
    shortResumeMAC-I-r16                               BIT STRING (SIZE (16)) ,
    resumeCause-r16                                   EstablishmentCause-NB-r16,
    earlyContentionResolution-r16                  BOOLEAN,
    cqi -NPDCCH-r16                                CQI-NPDCCH-NB-r14,
    spare                                              BIT STRING (SIZE (4))
}
EstablishmentCause-NB-r16 ::=              ENUMERATED {
                                               mt-Access, mo-Signalling, mo-Data, mo-ExceptionData,
                                               rna-Update, spare3, spare2, spare1}
-- ASN1STOP
```

Similarly, when eMTC/NB-IoT UEs (including normal LTE UEs that operates in reduced BW or CE mode) support RRC INACTIVE when connected to 5GCN, same behavior as in RRC_INACTIVE may be used when establishing the RRC connection. In another option, following options may be considered.

1. When T300 expires or when cell reselection happens while T300 or T302 running, UE discards the newly derived AS security keys and goes back to RRC INAC-TIVE state (i.e., UE goes to the original state where it was before initiating the resumption from RRC INAC-TIVE state.

2. Up on integrity protection failure for RRC message in Msg4, UE goes back to IDLE (without suspend) without triggering NAS recovery.

3. The RRC Connection release message or RRC con-nection reject in response to resume request from RRC INACTIVE may also move the UE to RRC IDLE with suspend indication (i.e., to use UP IoT 5GS optimiza-tion) or pure RRC IDLE (without suspend).

4. The RRC Connection release message or RRC con-nection reject in response to resume request from RRC INACTIVE may also move the UE to pure RRC IDLE (without suspend).

5. Similarly, the RRC Connection release message or RRC connection reject in response to resume request from RRC IDLE when using UP CIoT 5GS optimiza-tion may also move the UE to RRC INACTIVE or RRC IDLE (with or without suspend). In this case, UE activates the AS security before sending Msg3 when using UP CIoT 5GS optimization.

6. The RRC connection reject in response to resume request from RRC INACTIVE may also move the UE to RRC IDLE with suspend indication (i.e., to use UP IoT 5GS optimization) with using same NCC as used before sending Msg1, using I-RNTI as Resume ID and using the stored UE Inactive AS context without (or discarding) rrc-InactiveConfig (i.e., not using the ran-PagingCycle, periodic-RNAU-timer but keeping NCC).
   a. In this case, RAN disconnects the N1 signaling. When RRCConnectionResumeRequest is sent in the next resume procedure, eNB blindly detects whether the Resume ID is related to I-RNTI that determines the UE Inactive AS context.
   b. In another option, UE re-uses rrcConnectionResum-eRequest-r15 that is used when in RRC INACTIVE.

7. The RRC connection reject in response to resume request from RRC INACTIVE may also move the UE to RRC IDLE with suspend indication (i.e., to use UP IoT 5GS optimization) with UE following the same procedure to resume as the connection resume proce-dure from RRC_INACTIVE.
   a. The only difference is the UE does not apply the rrc-InactiveConfig (i.e., does not use the ran-Paging-Cycle, periodic-RNAU-timer but keeps using NCC) and does not monitor RAN paging.

8. The RRC connection reject message in response to resume request from RRC IDLE when using UP CIoT 5GS optimization may move the UE to RRC INAC-TIVE state if the stored UE context still has previously configured rrc-InactiveConfig (i.e., I-RNTI, ran-Pag-ingCycle, ran-NotificationAreaInfo, periodic-RNAU-timer and nextHopChainingCount) that is valid. For this purpose, RRCConnectionReject message may be extended to use a new indication rrc-InactiveIndica-tion-r16.
   a. This may happen if UE is being moved back to its previous RRC INACTIVE state.
   b. This may happen if the releaseCause received in the RRCConnectionRelease message indicated rrc-Sus-pend (or similar suspend indication when using UP CIoT 5GS optimization) but rrc-InactiveConfig was also received in the previous connection. In this case, fullI-RNTI, shortI-RNTI, nextHopChainingCount, ran-NotificationAreaInfo, periodic-RNAU-timer and ran-PagingCycle provided in rrc-InactiveConfig are stored in the UE context but are not used.
   c. rrc-InactiveIndication-r16 is received in RRCCon-nectionReject message but UE has no stored fullI-RNTI, shortI-RNTI, nextHopChainingCount, ran-NotificationAreaInfo, periodic-RNAU-timer and ran-PagingCycle, UE follows the procedure of leav-ing RRC_CONNECTED with release cause "other" or "RRC Resume failure".

| RRCConnectionReject message |
|---|
| ```
-- ASN1START
RRCConnectionReject ::=              SEQUENCE {
    criticalExtensions                   CHOICE {
        c1                                   CHOICE {
            rrcConnectionReject-r8 RRCConnectionReject-r8-IEs,
            spare3 NULL, spare2 NULL, spare1 NULL
        },
        criticalExtensionsFuture             SEQUENCE { }
    }
}
RRCConnectionReject-r8-IEs ::=       SEQUENCE {
    waitTime                             INTEGER (1..16),
    nonCriticalExtension                 RRCConnectionReject-v8a0-IEs    OPTIONAL
}
RRCConnectionReject -v8a0-IEs ::= SEQUENCE {
    lateNonCriticalExtension             OCTET STRING                    OPTIONAL,
    nonCriticalExtension                 RRCConnectionReject-v1020-IEs   OPTIONAL
}
RRCConnectionReject -v1020-IEs ::= SEQUENCE {
    extendedWaitTime-r10                 INTEGER (1..1800)               OPTIONAL, -- Need
ON
    nonCriticalExtension                 RRCConnectionReject-v1130-IEs   OPTIONAL
}
RRCConnectionReject-v1130-IEs ::=   SEQUENCE {
``` |

-continued

| RRCConnectionReject message | |
|---|---|
| deprioritisationReq-r11 | SEQUENCE { |
| deprioritisationType-r11 | ENUMERATED { frequency, e-utra}, |
| deprioritisationTimer-r11 | ENUMERATED {min5, min10, min15, min30} |
| | OPTIONAL, -- Need |
| } | |
| ON | |
| nonCriticalExtension | RRCConnectionReject-v1320-IEs |
| OPTIONAL | |
| } | |
| RRCConnectionReject-v1320-IEs ::= SEQUENCE { | |
| rrc-SuspendIndication-r13 | ENUMERATED true} OPTIONAL, -- Need |
| ON | |
| nonCriticalExtension | ~~SEQUENCE { }~~ RRCConnectionReject-v16xy-IEs |
| OPTIONAL | |
| } | |
| RRCConnectionReject-v16xy-IEs ::= SEQUENCE { | |
| rrc-InacitveIndication-r16 | ENUMERATED {true} OPTIONAL, -- Need |
| ON | |
| nonCriticalExtension | SEQUENCE { } OPTIONAL |
| } | |
| -- ASN1STOP | |

In RRC INACTIVE state, in one option, UE is not allowed to use wake-up signal (WUS) feature. This reduces paging response delay and DL resources. In another option, WUS is supported and same WUS configuration provided in system information is used. In another option, new WUS configuration is provided in RRC connection release message.

In RRC INACTIVE state, long extended DRX may be supported and all the configurations for eDRX including the new paging time window (PTW) and new eDRX cycle are controlled by RAN and configured by RAN via RRC connection release message. The eDRX in RRC INACTIVE is supported only if UE indicate capability to support it or network supports in RRC IDLE state or network configures it in RRC IDLE state. RAN also indicates to AMF about the use of eDRX in RRC INACTIVE.

The existing calculation of paging hyperframe (PH), PTW start (PTW_start) and PTW end (PTW_end) may be re-used in RRC INACTIVE. The UE ID to calculate PH, PTW_start and PTW_end may be same as the NG-5G-S-TMSI based UE ID used to calculate paging frame and paging occasion for both cases in RRC INACTIVE state and RRC IDLE state or may be same as UE_ID_H used in idle mode eDRX but CN paging response delay if the UE is using the eDRX. When UE is using long eDRX with PTW and cell reselection occurs, UE may release the eDRX configuration for RRC INACTIVE and inform the network (perform NAS recovery). In another option, UE may still keep using the eDRX as long as it is within RAN notification area or CN tracking area. Existing systemInfoModification-eDRX may be re-used for updating system information.

In another option, if RAN configures long eDRX to UE, it also provides the CN paging assistance information to AMF via N2 signalling. The RAN may include the PH, PTW_start and PTW_end parameters.

In another option, if network has configured UE eDRX for RRC IDLE state, the network (or AMF) provides the same eDRX parameters to RAN as part of assistance information to RRC INACTIVE. So the eDRX parameters configured are same in RRC IDLE state and RRC INACTIVE state. If RAN configures eDRX in RRC INACTIVE, it also indicates to AMF in case AMF needs to send CN paging. In this case, RAN just needs to enable the use of eDRX in RRC INAC-TIVE state via RRC Connection Release message.

Example in RRCConnectionRelease-NB-v16xy-IEs

| RRC-InactiveConfig-NB-r16 ::= | SEQUENCE { | | |
|---|---|---|---|
| fullI-RNTI-r16 | I-RNTI-r15, | | |
| shortI-RNTI-r16 | ShortI-RNTI-r15, | | |
| ran-PagingCycle-r16 | ENUMERATED { rf128, rf256, rf512, rf1024} | | OPTIONAL, -- |
| Need OR | | | |
| ran-NotificationAreaInfo-r16 | RAN-NotificationAreaInfo-r15 | | OPTIONAL, -- Need ON |
| periodic-RNAU-timer-r16 | ENUMERATED {min10, min20, min30, min60, | | |
| | min120, min360, min720, min10} | | OPTIONAL, -- |
| Need OR | | | |
| nextHopChainingCount-r16 | NextHopChainingCount | OPTIONAL, | -- Need ON |
| pagingWeightAnchor-r16 | PagingWeight-NB-r14 | OPTIONAL, | -- Cond pcch- |
| config | | | |
| pagingWeightNonAnchor-r16 | | PagingWeight-NB-r14 DEFAULT w1 | |
| extended-DRX-Enabled-r16 | ENUMERATED {true} | OPTIONAL, | -- Need ON |
| nonCriticalExtension | SEQUENCE { } | OPTIONAL | |
| } | | | | based on bits b31, b30 . . . , b0 of NG-5G-S-TMSI for both cases in RRC INACTIVE state and RRC IDLE state.

Since anchor RAN buffers the DL data, the RAN informs the AMF on the delay to deliver the DL data to UE if the UE is using the long eDRX cycle. It also informs the AMF on In another option, when eDRX is used in RRC INAC-TIVE state (or in RRC IDLE state) PTW always starts in subframe x (e.g., =0) and it always ends in subframe y (e.g., =1023) or PTW length is always L seconds (e.g., =10.24 sec). The value of x, y and L may be hardcoded or configured. The paging hyperframe (PH) may be determined using the following formula. The UE ID may be based on HASH ID or same UE ID used to calculate PF and PO and Z may be hardcoded or configured (e.g., z=2).

$$\text{H-SFN mod } z = \text{UE\_ID mod } z$$

Or PH may be determined using the legacy formula.

In another option, RAN only indicates paging hyperframe (PH) to UE in the RRC INACTIVE configuration. This indicates UE monitors the PO only in that PH. RAN may also provide the list of paging hyperframes (PH) where the UE may monitor the PO. Or RAN may also indicate starting PH and length in number of H-SFNs (or in radio frame) where UE may monitor PO. The PO calculation is same as one used for monitoring paging in RRC INACTIVE.

In another option, RAN may configure UE eDRX offset in number of H-SFN from the H-SFM=x (or =0) and length of eDRX cycle in number of H-SFN in RRC INACTIVE configuration. The PTW may be fixed length or may be configured to L radio frame or H-SFN.

In another option, the eDRX cycle length, paging hyperframe (PH), PTW length and PTW offset from SFN=x (=0) are provided in the RRC INACTIVE configuration to avoid any calculation.

In another option, RAN may configure the long eDRX cycle (i.e., =1 H-SFN, 2 H-SN, so on) and paging hyperframe (PH) is provided in the configuration. PTW length may be equal to the default DRX or UE specific DRX or shorter of them so that there is one PO in a long eDRX cycle. Additionally a paging frame (PF) offset from SFN=x (=0) or from the calculated PF may be provided to distribute the paging load.

All of the above option may be applicable when network configures eDRX to UE to be used in RRC IDLE state.

Exemplary Embodiment #6 Use of AS RAI

UE may use access stratum (AS) release Assistance Indicator (RAI) by setting the BSR=0 as RAI when RAI is activated.

AS RAI may be supported in NR (i.e., to move UE to RRC INACTIVE state immediately). When NG RAN determines that UE has no further uplink (UL) data to transmit and RAN does not have any pending downlink (DL) data for the UE, RAN may release the UE to RRC_INACTIVE or RRC IDLE with suspend indication (when AS security is activated) or RRC IDLE without suspend (e.g., when AS security is not activated or when UE is using CP IoT 5GS optimization) immediately upon receiving AS RAI.

In another option, RAN waits for a certain duration of time (or using a new release timer) or asks 5GCN (context release request or N2 RAI) to send indication if there is any DL data. Once RAN confirms that the there is no further DL data for the UE, RAN may send the RRCConectionRelease message and move the UE to RRC INACTIVE or RRC IDLE (with or without suspend indication).

Also, if RAN determines that there is just one pending DL data or 5GCN indicates only one DL data, the data is sent with RRC Connection Release message (DL data in DTCH multiplexed with RRC release message in DCCH). If DL data is CP data, it may be included in the RRC release message which may be extended to include NAS PDU or a new RRC release message or RRCEarlyDataComplete (i.e., move to UE in RRC IDLE without suspend) message may be used. This indicates that when UE is not using CP IoT 5GS optimization and RAI is activated, RRCEarlyData-Complete message may be sent in place of RRC Connection release message without suspend indication or RRC INAC-TIVE configuration and CP DL data.

When UE is using EDT, AS RAI is already implicitly understood by the RAN from Msg3. If upper layers (i.e., NAS) indicates AS to trigger AS RAI, UE MAC generates BSR MAC CE with BSR=0 and sent in MAC PDU. Also, if UE is moving to RRC connected, the MAC PDU may contain RRCConnectionSetupComplete message or RRC-ConnectionResumeComplete message or ULInformation-Transfer message including NAS PDU (i.e., DedicatedInfo-NAS). However, if RAN does not activate the AS RAI in Msg4, this cannot be used.

New AS RAI Indication Via RRC Message

For both eMTC and NB-IoT, a new AS RAI (distinguished from existing AS RAI) may be considered as a new indication to tell RAN that UE does not expect any further UL data as well as DL data (e.g., it does not want to receive any DL data). This AS RAI may be triggered upon indication of RAI received from upper layers. Up on receiving this new AS RAI, UE could be released early without waiting response from 5GCN.

When EDT is used and upper layers (e.g., NAS) indicate AS (or RRC) to trigger AS RAI, the RRCEarlyDataRequest or RRCConnectionResumeRequest for EDT message may be extended to include the AS RAI indication as shown below (for both eMTC and NB-IoT). RAN does not need to activate to use this AS RAI.

When EDT is used in CP CIoT EPS optimization, the RRCEarlyDataRequest message may be critically or non-critically extended or a new UL CCCH message class may be used to include the new AS RAI.

Example of New UL CCCH Message Class Extension.

| RRCEarly DataRequest message |
|---|
| -- ASN1START<br>RRCEarlyDataRequest-r16 ::=    SEQUENCE {<br>    criticalExtensions              CHOICE {<br>        rrcEarlyDataRequest-r16           RRCEarlyDataRequest-5GC-r16-IEs,<br>        criticalExtensionsFuture        SEQUENCE { }<br>    }<br>}<br>RRCEarlyDataRequest-5GC-r16-IEs ::=    SEQUENCE {<br>    ng-5G-S-TMSI-r16           BIT STRING (SIZE (48)),<br>    as-RAI-r16               ENUMERATED {true}      OPTIONAL,<br>    establishmentCause-r16      ENUMERATED {    mo-Data-r15, delayTolerantAccess-r15},<br>    dedicatedInfoNAS-r16        DedicatedInfoNAS,<br>    nonCriticalExtension         SEQUENCE { }          OPTIONAL<br>}<br>-- ASN1STOP |

-continued

| RRCEarly DataRequest message |
| --- |
| Example of non-critical extension. |

```
RRCEarlyDataRequest-r15-IEs ::=    SEQUENCE {
    s-TMSI-r15                          S-TMSI,
    establishmentCause-r15              ENUMERATED {      mo-Data-r15, delayTolerantAccess-r15},
    dedicatedInfoNAS-r15                  DedicatedInfoNAS,
    nonCriticalExtension                  SEQUENCE {}RRCEarlyDataRequest-r16-IEs OPTIONAL
}
RRCEarlyDataRequest-r16-IEs ::=    SEQUENCE {
    ng-5G-S-TMSI-Part2-v16xy                              BIT STRING (SIZE (8))    OPTIONAL,
    as-RAI-r16                          ENUMERATED {true}           OPTIONAL,
    nonCriticalExtension                  SEQUENCE { }                OPTIONAL
}
```

20

When using EDT in UP CIoT 5GS optimization or RRC INACTIVE, a spare bit may be used for AS RAI indication or a spare bit may be used to define a new resumption cause (e.g., "mo-Data-AS-Rai" for one UL data together with AS RAI) in RRC connection resume request message as indication of the AS RAI. Additionally new UL CCCH message class extension of RRCConnectionResumeRequest may be used to include the new AS RAI.

Example of Extension of RRCConnectionResumeRequest for NB-IoT

| RRCConnectionResumeRequest-NB message |
| --- |

```
-- ASN1START
RRCConnectionResumeRequest-NB ::=  SEQUENCE {
    criticalExtensions                                CHOICE {
        rrcConnectionResumeRequest-r13                    RRCConnectionResumeRequest-NB-r13-IEs,
        criticalExtensionsFuture                          SEQUENCE { }
    }
}
RRCConnectionResumeRequest-NB-r13-IEs ::=         SEQUENCE {
    resumeID-r13                                      ResumeIdentity-r13,
    shortResumeMAC-I-r13                              ShortMAC-I,
    resumeCause-r13                                  EstablishmentCause-NB-r13,
    earlyContentionResolution-r14                    BOOLEAN,
    cqi-NPDCCH-r14                                    CQI-NPDCCH-NB-r14,
    connectTo5GC-r16                                 ENUMERATED {true}              OPTIONAL,
    as-RAI-r16                                       ENUMERATED {true}      OPTIONAL,
    spare                                            BIT STRING (SIZE (4)(3 2)
}
-- ASN1STOP
-- ASN1START
EstablishmentCause-NB-r13 ::=                 ENUMERATED {
                                                  mt-Access, mo-Signalling, mo-Data, mo-ExceptionData,
                                                  delayTolerantAccess-v1330, spare3 rna-Update, spare2,
spare1}
-- ASN1STOP
```

Example of Extension of Establishment Cause in RRCConnectionResumeRequest for NB-IoT

```
EstablishmentCause-NB-r13 ::=            ENUMERATED {
                                             mt-Access, mo-Signalling, mo-Data, mo-ExceptionData,
                                             delayTolerantAccess-v1330, spare3 rna-Update, spare2
mo-Data-AS-RAI,        mo-ExceptionData-AS-RAI }
```

Example of extension of establishment cause in RRCConnectionResumeRequest for eMTC. Here a spare bit (resumeFromSuspend) is used to indicate the I-RNTI corresponds to resume ID belonging to 5GCN and a spare bit in resume cause is used to indicate AS RAI. When UE is in RRC_INACTIVE, resumeFromSuspend is not required.

| RRCConnectionResumerequest message |
| --- |

```
-- ASN1START
RRCConnectionResumeRequest-r13 ::=  SEQUENCE {
    criticalExtensions                          CHOICE {
        rrcConnectionResumeRequest-r13                  RRCConnectionResumeRequest-r13-IEs,
        rrcConnectionResumeRequest-r15                  RRCConnectionResumeRequest-RGC-r15-IEs,
    }
}
RRCConnectionResumeRequest-r13-IEs ::=      SEQUENCE {
    resumeIdentity-r13                              CHOICE {
        resumeID-r13                                        ResumeIdentity-r13,
        truncatedResumeID-r13                               BIT STRING (SIZE (24))
    },
    shortResumeMAC-I-r13                                BIT STRING (SIZE (16)) ,
    resumeCause-r13                                    ResumeCause,
    spare                                              BIT STRING (SIZE (1))
}
RRCConnectionResumeRequest-5GC-r15-IEs ::=      SEQUENCE {
    resumeIdentity-r15                              CHOICE {
        fullI-RNTI-r15                                     I-RNTI-r15,
        shortI-RNTI-r15                                    ShortI-RNTI-r15
    },
    shortResumeMAC-I-r15                                BIT STRING (SIZE (16)),
    resumeCause-r15                                    ResumeCause-r15,
    resumeFromSuspend-r16                              ENUMERATED {true}           OPTIONAL,
    spare                                             BIT STRING (SIZE (1))
}
ResumeCause ::=                     ENUMERATED {
                                        emergency, highPriorityAccess, mt-Access, mo-Signalling,
                                        mo-Data, delayTolerantAccess-v1020, mo-VoiceCall-v1280,
spare1}
ResumeCause-r15 ::=             ENUMERATED {
                                        emergency, highPriorityAccess, mt-Access, mo-Signalling,
                                        mo-Data, rna-Update, mo-VoiceCall, spare1 mo-Data-AS-RAI
}
-- ASN1STOP
```

Example of New UL CCCH Message Class Extension (Similarly Spare Bit in RRCConnectionResumeRequest-r13-IEs May be Used).

```
RRCConnectionResumeRequest-r16-IEs ::=   SEQUENCE {
    resumeIdentity-r16                              CHOICE {
        resumeID-r16                                        ResumeIdentity-r13,
        truncatedResumeID-r16                               BIT STRING (SIZE (24))
    },
    shortResumeMAC-I-r16                                BIT STRING (SIZE (16)) ,
    resumeCause-r16                                    ResumeCause-r16,
    as-RAI-r16                                         ENUMERATED {true}        OPTIONAL
    spare                                             BIT STRING (SIZE (1))
}
```

When EDT is not used and upper layers (e.g., NAS) indicate AS (or RRC) to trigger AS RAI, RRCConnectionSetupComplete message or RRCConnectionResumeComplete message or ULInformationTransfer message may be extended to include the AS RAI indication as shown below (for both eMTC and NB-IoT). RAN does not need to activate to use this AS RAI.

5

---

RRCConnectionSetupComplete message

```
RRCConnectionSetupComplete-v1530-IEs ::=        SEQUENCE {
    logMeasAvailableBT-r15                  ENUMERATED {true}                       OPTIONAL,
    logMeasAvailableWLAN-r15                ENUMERATED {true}                       OPTIONAL,
    idleMeasAvailable-r15                   ENUMERATED {true}                       OPTIONAL,
    flightPathInfoAvailable-r15             ENUMERATED {true}                       OPTIONAL,
    connectTo5GC-r15                                    ENUMERATED {true}               OPTIONAL,
    registeredAMF-r15                                   RegisteredAMF-r15               OPTIONAL,
    s-NSSAI-list-r15                        SEQUENCE (SIZE (1..maxNrofS-NSSAI-r15)) OF S-NSSAI-r15
OPTIONAL,
    ng-5G-S-TMSI-Bits-r15                               CHOICE {
        ng-5G-S-TMSI-r15                                    NG-5G-S-TMSI-r15,
        ng-5G-S-TMSI-Part2-r15                              BIT STRING (SIZE (8))
    } OPTIONAL,
    nonCriticalExtension                    RRCConnectionSetupComplete-v15x0-IEs OPTIONAL
}
RRCConnectionSetupComplete-v15x0-IEs ::=        SEQUENCE {
    gummei-Type-v15xy                       ENUMERATED {mappedFrom5G}               OPTIONAL,
    guami-Type-r15                          ENUMERATED {native, mapped}         OPTIONAL,
    nonCriticalExtension                    SEQUENCE {}RRCConnectionSetupComplete-v16xy- IEs
        OPTIONAL
}
RRCConnectionSetupComplete-v16xy-IEs ::= SEQUENCE {
    as-RAI -r16                             ENUMERATED {true}           OPTIONAL,
    nonCriticalExtension                            SEQUENCE { }                    OPTIONAL
}
```

---

RRCConnection ResumeComplete message

```
RRCConnectionResumeComplete-v1530-IEs ::= SEQUENCE {
    logMeasAvailableBT-r15                  ENUMERATED {true}           OPTIONAL,
    logMeasAvailableWLAN-r15                ENUMERATED {true}           OPTIONAL,
    idleMeasAvailable-r15                   ENUMERATED {true}                   OPTIONAL,
    flightPathInfoAvailable-r15             ENUMERATED {true}           OPTIONAL,
    nonCriticalExtension                    SEQUENCE {}RRCConnectionResumeComplete-v16xy- IEs
        OPTIONAL
}
RRCConnectionResumeComplete-v16xy-IEs ::= SEQUENCE {
    as-RAI-r16                              ENUMERATED {true}       OPTIONAL,
    nonCriticalExtension                    SEQUENCE { }                OPTIONAL
}
```

---

ULInformationTransfer message

```
-- ASN1START
ULInformationTransfer ::=        SEQUENCE {
    criticalExtensions                  CHOICE {
        c1                                      CHOICE {
            ulInformationTransfer-r8                    ULInformationTransfer-r8-IEs,
            spare3 NULL, spare2 NULL, spare1 NULL
        },
        criticalExtensionsFuture                SEQUENCE { }
    }
}
ULInformationTransfer-r8-IEs::=         SEQUENCE {
    dedicatedInfoType           CHOICE {
        dedicatedInfoNAS                        DedicatedInfoNAS,
        dedicatedInfoCDMA2000-1XRTT             DedicatedInfoCDMA2000,
        dedicatedInfoCDMA2000-HRPD              DedicatedInfoCDMA2000
    },
```

-continued

| ULInformationTransfer message |
|---|

```
nonCriticalExtension               ULInformationTransfer-v8a0-IEs
    OPTIONAL
}
ULInformationTransfer-v8a0-IEs ::= SEQUENCE {
    lateNonCriticalExtension           OCTET STRING                          OPTIONAL,
    nonCriticalExtension               SEQUENCE { }ULInformationTransfer-v16xy-IEs
    OPTIONAL
}
ULInformationTransfer-v16xy- IEs ::= SEQUENCE {
    as-RAI-r16                 ENUMERATED {true}          OPTIONAL,
    nonCriticalExtension             SEQUENCE { }                          OPTIONAL
}
-- ASN1STOP
```

New AS RAI Indication Via L2 Signaling

In another option, the new AS RAI also uses the BSR MAC CE with BSR=0 but it is distinguished from the existing AS RAI using a reserved bit in the MAC CE subheader. In another option, a new LCID for UL-SCH, for example as illustrated in FIG. 1, may be used to indicate new AS RAI. FIG. 1 depicts an example of a MAC control element (CE) 100 including a subheader logical channel ID (LCID), in accordance with some embodiments. Short BSR with BSR=0 may be used using new LCID code point. Also fixed size of zero bit MAC CE (only subheader is present) may be used for this purpose.

Figure 2:
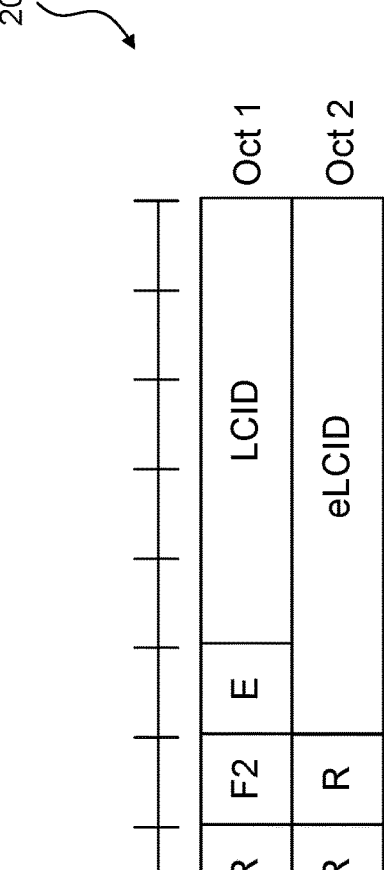
FIG. 2 depicts an example of a MAC control element (CE) including an extended subheader logical channel ID (e-LCID), in accordance with some embodiments.

Also a new codepoint of extended LCID (eLCID), for example as illustrated in FIG. 2, with fixed size of zero bit MAC CE may be used. FIG. 2 depicts an example of a MAC control element (CE) 200 including an extended subheader logical channel ID (e-LCID), in accordance with some embodiments.

TABLE 1

| Values of eLCID for UL-SCH | | |
|---|---|---|
| Codepoint | Index | eLCID values |
| 000000-000110 | 32-38 | Identity of the logical channel |
| 000111-11111 10 | 39-94 54 | Reserved |
| 111111 | 95 | AS RAI |

Systems and Implementations

Figure 3:
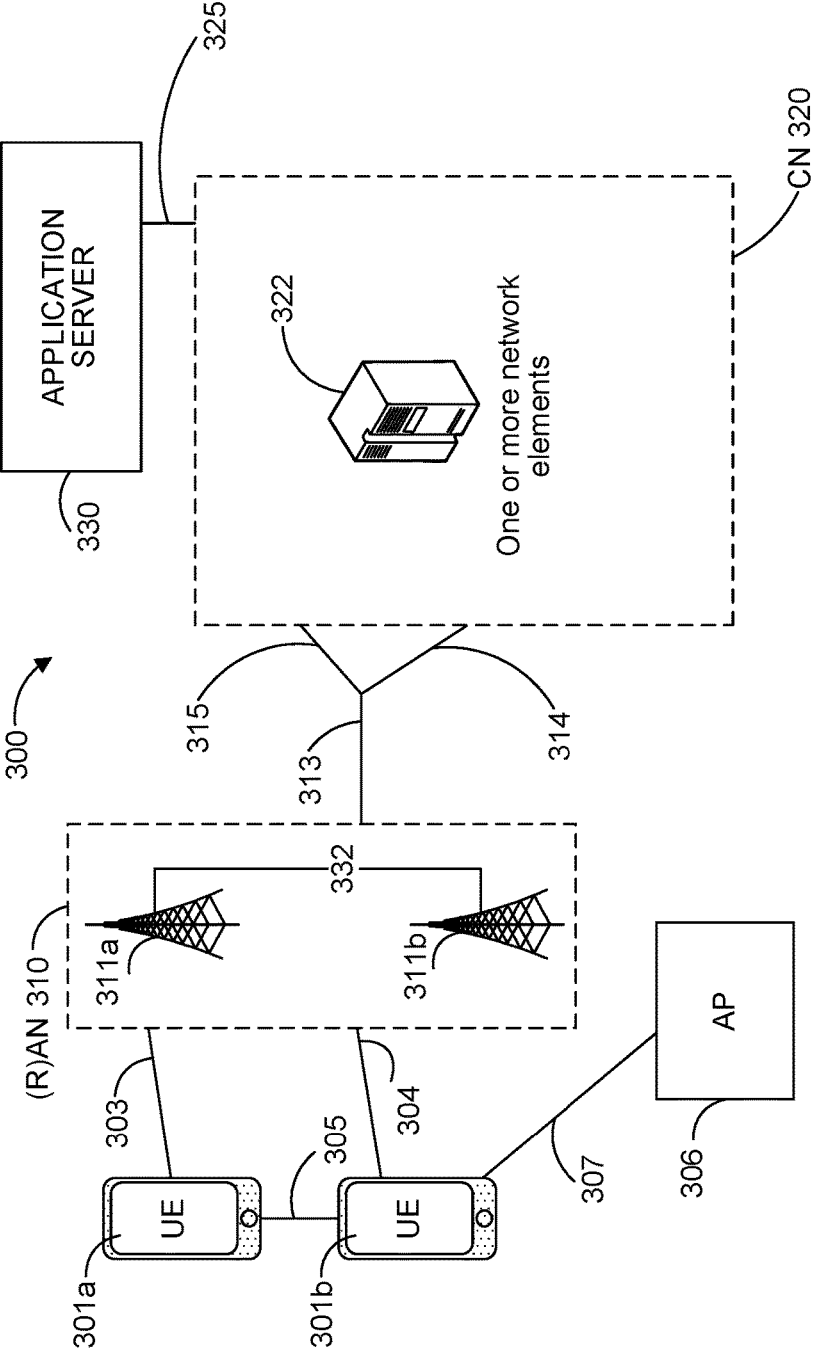
FIG. 3 depicts an architecture of a system of a network, in accordance with some embodiments.

FIG. 3 illustrates an example architecture of a system 300 of a network, in accordance with various embodiments. The following description is provided for an example system 300 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 3, the system 300 includes UE 301a and UE 301b (collectively referred to as "UEs 301" or "UE 301"). In this example, UEs 301 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 301 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 301 may be configured to connect, for example, communicatively couple, with an or RAN 310. In embodiments, the RAN 310 may be an NG RAN or a 5G RAN, an E-UTRAN, or a legacy RAN, such as a UTRAN or GERAN. As used herein, the term "NG RAN" or the like may refer to a RAN 310 that operates in an NR or 5G system 300, and the term "E-UTRAN" or the like may refer to a RAN 310 that operates in an LTE or 4G system 300. The UEs 301 utilize connections (or channels) 303 and 304, respectively, each of which comprises a physical communications interface or layer (discussed in further detail below).

In this example, the connections 303 and 304 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 301 may directly exchange communication data via a ProSe interface 305. The ProSe interface 305 may alternatively be referred to as a SL interface 305 and may comprise one or more logical channels, including but not limited to a PSCCH, a PSSCH, a PSDCH, and a PSBCH.

The UE 301b is shown to be configured to access an AP 306 (also referred to as "WLAN node 306," "WLAN 306,"

"WLAN Termination 306," "WT 306" or the like) via connection 307. The connection 307 can comprise a local wireless connection, such as a connection consistent with any IEEE 802.11 protocol, wherein the AP 306 would comprise a wireless fidelity (Wi-Fi®) router. In this example, the AP 306 is shown to be connected to the Internet without connecting to the core network of the wireless system (described in further detail below). In various embodiments, the UE 301b, RAN 310, and AP 306 may be configured to utilize LWA operation and/or LWIP operation. The LWA operation may involve the UE 301b in RRC_CO-NNECTED being configured by a RAN node 311a-b to utilize radio resources of LTE and WLAN. LWIP operation may involve the UE 301b using WLAN radio resources (e.g., connection 307) via IPsec protocol tunneling to authenticate and encrypt packets (e.g., IP packets) sent over the connection 307. IPsec tunneling may include encapsulating the entirety of original IP packets and adding a new packet header, thereby protecting the original header of the IP packets.

The RAN 310 can include one or more AN nodes or RAN nodes 311a and 311b (collectively referred to as "RAN nodes 311" or "RAN node 311") that enable the connections 303 and 304. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 311 that operates in an NR or 5G system 300 (for example, a gNB), and the term "E-UTRAN node" or the like may refer to a RAN node 311 that operates in an LTE or 4G system 300 (e.g., an eNB). According to various embodiments, the RAN nodes 311 may be implemented as one or more of a dedicated physical device such as a macrocell base station, and/or a low power (LP) base station for providing femto-cells, picocells or other like cells having smaller coverage areas, smaller user capacity, or higher bandwidth compared to macrocells.

In some embodiments, all or parts of the RAN nodes 311 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 311; a MAC/PHY split wherein RRC, PDCP, RLC, and MAC layers are operated by the CRAN/vBBUP and the PHY layer is operated by individual RAN nodes 311; or a "lower PHY" split wherein RRC, PDCP, RLC, MAC layers and upper portions of the PHY layer are operated by the CRAN/vBBUP and lower portions of the PHY layer are operated by individual RAN nodes 311. This virtualized framework allows the freed-up processor cores of the RAN nodes 311 to perform other virtualized applications. In some implementations, an individual RAN node 311 may represent individual gNB-DUs that are connected to a gNB-CU via individual F1 interfaces (not shown by FIG. 3). In these implementations, the gNB-DUs may include one or more remote radio heads or RFEMs (see, e.g., FIG. 6), and the gNB-CU may be operated by a server that is located in the RAN 310 (not shown) or by a server pool in a similar manner as the CRAN/vBBUP. Additionally or alternatively, one or more of the RAN nodes 311 may be next generation eNBs (ng-eNBs), which are RAN nodes that provide E-UTRA user plane and control plane protocol terminations toward the UEs 301, and are connected to a 5GC (e.g., CN 520 of FIG. 5) via an NG interface (discussed infra).

In V2X scenarios one or more of the RAN nodes 311 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 301 (vUEs 301). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 311 can terminate the air interface protocol and can be the first point of contact for the UEs 301. In some embodiments, any of the RAN nodes 311 can fulfill various logical functions for the RAN 310 including, but not limited to, radio network controller (RNC) functions such as radio bearer management, uplink and downlink dynamic radio resource management and data packet scheduling, and mobility management.

In embodiments, the UEs 301 can be configured to communicate using OFDM communication signals with each other or with any of the RAN nodes 311 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 311 to the UEs 301, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 301, 302 and the RAN nodes 311, 312 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 301, 302 and the RAN nodes 311, 312 may operate using LAA, eLAA, and/or feLAA mechanisms. In these implementations, the UEs 301, 302 and the RAN nodes 311, 312 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 301, 302, RAN nodes 311, 312, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 301 or 302, AP 306, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 301, 302 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 301. The PDCCH carries information about the transport format and resource allocations related to the PDSCH channel, among other things. It may also inform the UEs 301 about the transport format, resource allocation, and HARQ information related to the uplink shared channel. Typically, downlink scheduling (assigning control and shared channel resource blocks to the UE 301b within a cell) may be performed at any of the RAN nodes 311 based on channel quality information fed back from any of the UEs 301. The downlink resource assignment information may be sent on the PDCCH used for (e.g., assigned to) each of the UEs 301.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs.

Similar to above, each ECCE may correspond to nine sets of four physical resource elements known as an EREGs. An ECCE may have other numbers of EREGs in some situations.

The RAN nodes 311 may be configured to communicate with one another via interface 312. In embodiments where the system 300 is an LTE system (e.g., when CN 320 is an EPC 420 as in FIG. 4), the interface 312 may be an X2 interface 312. The X2 interface may be defined between two or more RAN nodes 311 (e.g., two or more eNBs and the like) that connect to EPC 320, and/or between two eNBs connecting to EPC 320. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 301 from an SeNB for user data; information of PDCP PDUs that were not delivered to a UE 301; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 300 is a 5G or NR system (e.g., when CN 320 is an 5GC 520 as in FIG. 5), the interface 312 may be an Xn interface 312. The Xn interface is defined between two or more RAN nodes 311 (e.g., two or more gNBs and the like) that connect to 5GC 320, between a RAN node 311 (e.g., a gNB) connecting to 5GC 320 and an eNB, and/or between two eNBs connecting to 5GC 320. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 301 in a connected mode (e.g., CM-CONNECTED) including functionality to manage the UE mobility for connected mode between one or more RAN nodes 311. The mobility support may include context transfer from an old (source) serving RAN node 311 to new (target) serving RAN node 311; and control of user plane tunnels between old (source) serving RAN node 311 to new (target) serving RAN node 311. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 310 is shown to be communicatively coupled to a core network—in this embodiment, core network (CN) 320. The CN 320 may comprise a plurality of network elements 322, which are configured to offer various data and telecommunications services to customers/subscribers (e.g., users of UEs 301) who are connected to the CN 320 via the RAN 310. The components of the CN 320 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 320 may be referred to as a network slice, and a logical instantiation of a portion of the CN 320 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 330 may be an element offering applications that use IP bearer resources with the core network (e.g., UMTS PS domain, LTE PS data services, etc.). The application server 330 can also be configured to support one or more communication services (e.g., VoIP sessions, PTT sessions, group communication sessions, social networking services, etc.) for the UEs 301 via the EPC 320.

In embodiments, the CN 320 may be a 5GC (referred to as "5GC 320" or the like), and the RAN 310 may be connected with the CN 320 via an NG interface 313. In embodiments, the NG interface 313 may be split into two parts, an NG user plane (NG-U) interface 314, which carries traffic data between the RAN nodes 311 and a UPF, and the S1 control plane (NG-C) interface 315, which is a signaling interface between the RAN nodes 311 and AMFs. Embodiments where the CN 320 is a 5GC 320 are discussed in more detail with regard to FIG. 5.

In embodiments, the CN 320 may be a 5G CN (referred to as "5GC 320" or the like), while in other embodiments, the CN 320 may be an EPC). Where CN 320 is an EPC (referred to as "EPC 320" or the like), the RAN 310 may be connected with the CN 320 via an S1 interface 313. In embodiments, the S1 interface 313 may be split into two parts, an S1 user plane (S1-U) interface 314, which carries traffic data between the RAN nodes 311 and the S-GW, and the S1-MME interface 315, which is a signaling interface between the RAN nodes 311 and MMEs. An example architecture wherein the CN 320 is an EPC 320 is shown by FIG. 4.

Figure 4:
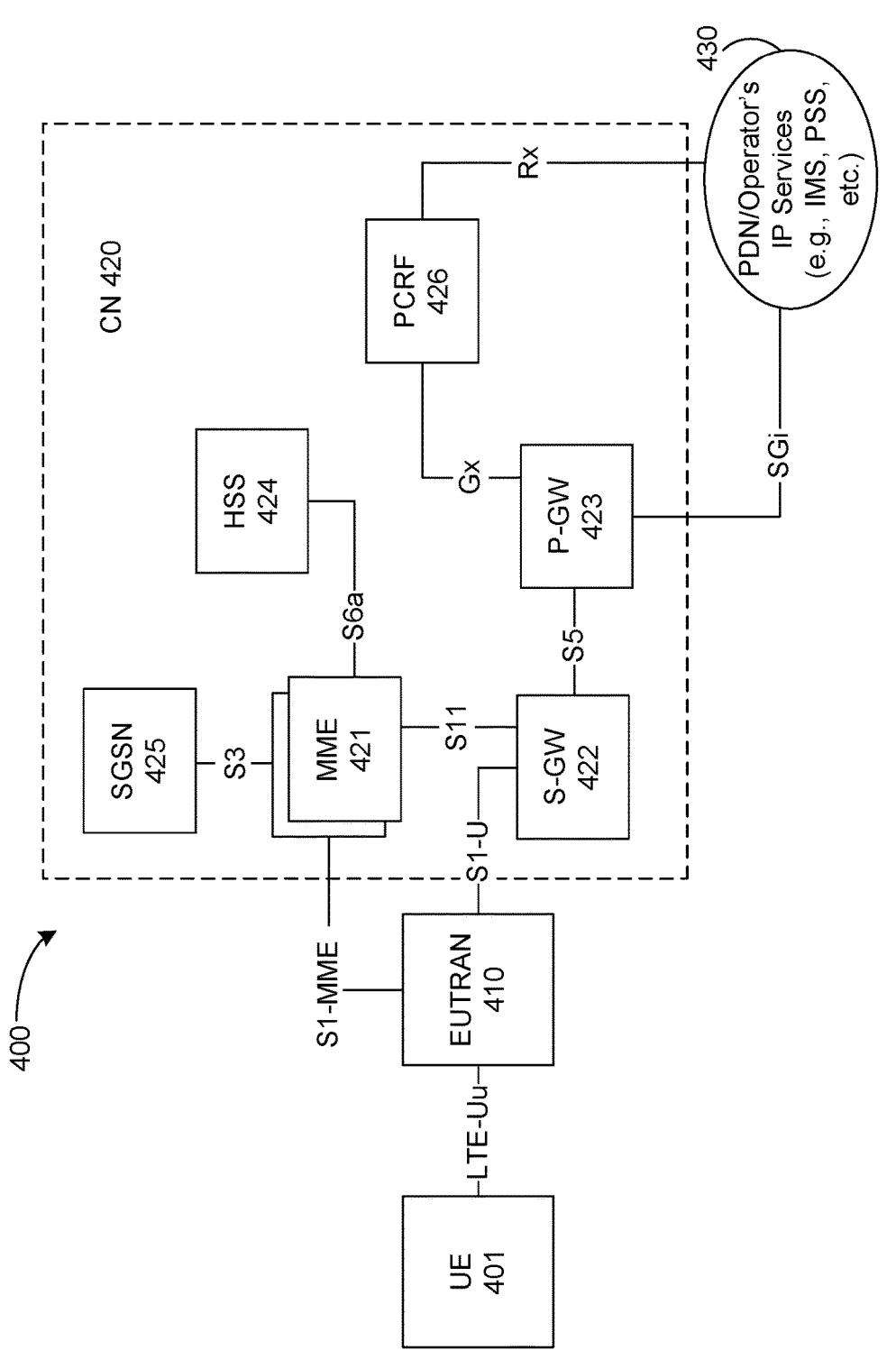
FIG. 4 depicts an architecture of a system including a first core network, in accordance with some embodiments.

FIG. 4 illustrates an example architecture of a system 400 including a first CN 420, in accordance with various embodiments. In this example, system 400 may implement the LTE standard wherein the CN 420 is an EPC 420 that corresponds with CN 320 of FIG. 3. Additionally, the UE 401 may be the same or similar as the UEs 301 of FIG. 3, and the E-UTRAN 410 may be a RAN that is the same or similar to the RAN 310 of FIG. 3, and which may include RAN nodes 311 discussed previously. The CN 420 may comprise MMEs 421, an S-GW 422, a P-GW 423, a HSS 424, and a SGSN 425.

The MMEs 421 may be similar in function to the control plane of legacy SGSN, and may implement MM functions to keep track of the current location of a UE 401. The MMEs 421 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 401, provide user identity confidentiality, and/or perform other like services to users/subscribers. Each UE 401 and the MME 421 may include an MM or EMM sublayer, and an MM context may be established in the UE 401 and the MME 421 when an attach procedure is successfully completed. The MM context may be a data structure or database object that stores MM-related information of the ULE 401. The MMEs 421 may be coupled with the HSS 424 via an S6a reference point, coupled with the SGSN 425 via an S3 reference point, and coupled with the S-GW 422 via an S11 reference point.

The SGSN 425 may be a node that serves the UE 401 by tracking the location of an individual UE 401 and performing security functions. In addition, the SGSN 425 may perform Inter-EPC node signaling for mobility between 2G/3G and E-UTRAN 3GPP access networks; PDN and S-GW selection as specified by the MMEs 421; handling of UE 401 time zone functions as specified by the MMEs 421; and MME selection for handovers to E-UTRAN 3GPP access network. The S3 reference point between the MMEs 421 and the SGSN 425 may enable user and bearer information exchange for inter-3GPP access network mobility in idle and/or active states.

The HSS 424 may comprise a database for network users, including subscription-related information to support the network entities' handling of communication sessions. The EPC 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc. An S6a reference point between the HSS 424 and the MMEs 421 may enable transfer of subscription and authentication data for authenticating/authorizing user access to the EPC 420 between HSS 424 and the MMEs 421.

The S-GW 422 may terminate the S1 interface 313 ("S1-U" in FIG. 4) toward the RAN 410, and routes data packets between the RAN 410 and the EPC 420. In addition, the S-GW 422 may be a local mobility anchor point for inter-RAN node handovers and also may provide an anchor for inter-3GPP mobility. Other responsibilities may include lawful intercept, charging, and some policy enforcement. The S11 reference point between the S-GW 422 and the MMEs 421 may provide a control plane between the MMEs 421 and the S-GW 422. The S-GW 422 may be coupled with the P-GW 423 via an S5 reference point.

The P-GW 423 may terminate an SGi interface toward a PDN 430. The P-GW 423 may route data packets between the EPC 420 and external networks such as a network including the application server 330 (alternatively referred to as an "AF") via an IP interface 325 (see e.g., FIG. 3). In embodiments, the P-GW 423 may be communicatively coupled to an application server (application server 330 of FIG. 3 or PDN 430 in FIG. 4) via an IP communications interface 325 (see, e.g., FIG. 3). The S5 reference point between the P-GW 423 and the S-GW 422 may provide user plane tunneling and tunnel management between the P-GW 423 and the S-GW 422. The S5 reference point may also be used for S-GW 422 relocation due to UE 401 mobility and if the S-GW 422 needs to connect to a non-collocated P-GW 423 for the required PDN connectivity. The P-GW 423 may further include a node for policy enforcement and charging data collection (e.g., PCEF (not shown)). Additionally, the SGi reference point between the P-GW 423 and the packet data network (PDN) 430 may be an operator external public, a private PDN, or an intra operator packet data network, for example, for provision of IMS services. The P-GW 423 may be coupled with a PCRF 426 via a Gx reference point.

PCRF 426 is the policy and charging control element of the EPC 420. In a non-roaming scenario, there may be a single PCRF 426 in the Home Public Land Mobile Network (HPLMN) associated with a UE 401's Internet Protocol Connectivity Access Network (IP-CAN) session. In a roaming scenario with local breakout of traffic, there may be two PCRFs associated with a UE 401's IP-CAN session, a Home PCRF (H-PCRF) within an HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate QoS and charging parameters. The PCRF 426 may provision this rule into a PCEF (not shown) with the appropriate TFT and QCI, which commences the QoS and charging as specified by the application server 430. The Gx reference point between the PCRF 426 and the P-GW 423 may allow for the transfer of QoS policy and charging rules from the PCRF 426 to PCEF in the P-GW 423. An Rx reference point may reside between the PDN 430 (or "AF 430") and the PCRF 426.

Figure 5:
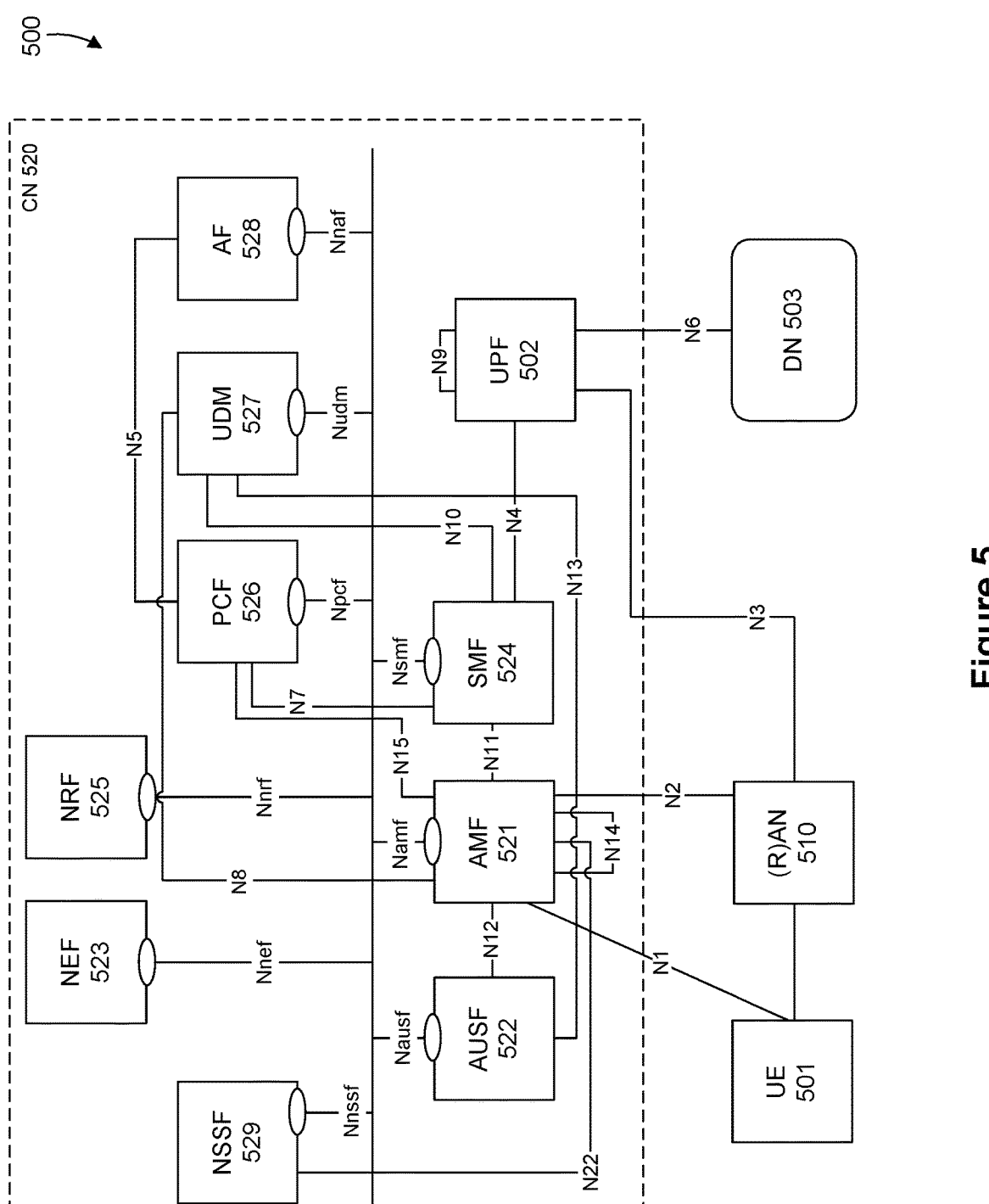
FIG. 5 depicts an architecture of a system including a second core network in accordance with some embodiments.

FIG. 5 illustrates an architecture of a system 500 including a second CN 520 in accordance with various embodiments. The system 500 is shown to include a UE 501, which may be the same or similar to the UEs 301 and UE 401 discussed previously; a (R)AN 510, which may be the same or similar to the RAN 310 and RAN 410 discussed previously, and which may include RAN nodes 311 discussed previously; and a DN 503, which may be, for example, operator services, Internet access or 3rd party services; and a 5GC 520. The 5GC 520 may include an AUSF 522; an AMF 521; a SMF 524; a NEF 523; a PCF 526; a NRF 525; a UDM 527; an AF 528; a UPF 502; and a NSSF 529.

The UPF 502 may act as an anchor point for intra-RAT and inter-RAT mobility, an external PDU session point of interconnect to DN 503, and a branching point to support multi-homed PDU session. The UPF 502 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 502 may include an uplink classifier to support routing traffic flows to a data network. The DN 503 may represent various network operator services, Internet access, or third party services. DN 503 may include, or be similar to, application server 330 discussed previously. The UPF 502 may interact with the SMF 524 via an N4 reference point between the SMF 524 and the UPF 502.

The AUSF 522 may store data for authentication of UE 501 and handle authentication-related functionality. The AUSF 522 may facilitate a common authentication framework for various access types. The AUSF 522 may communicate with the AMF 521 via an N12 reference point between the AMF 521 and the AUSF 522; and may communicate with the UDM 527 via an N13 reference point between the UDM 527 and the AUSF 522. Additionally, the AUSF 522 may exhibit an Nausf service-based interface.

The AMF 521 may be responsible for registration management (e.g., for registering UE 501, etc.), connection management, reachability management, mobility management, and lawful interception of AMF-related events, and access authentication and authorization. The AMF 521 may be a termination point for the an N11 reference point between the AMF 521 and the SMF 524. The AMF 521 may provide transport for SM messages between the UE 501 and the SMF 524, and act as a transparent proxy for routing SM messages. AMF 521 may also provide transport for SMS messages between UE 501 and an SMSF (not shown by FIG. 5). AMF 521 may act as SEAF, which may include interaction with the AUSF 522 and the UE 501, receipt of an intermediate key that was established as a result of the UE 501 authentication process. Where USIM based authentication is used, the AMF 521 may retrieve the security material from the AUSF 522. AMF 521 may also include a SCM function, which receives a key from the SEA that it uses to derive access-network specific keys. Furthermore, AMF 521 may be a termination point of a RAN CP interface, which may include or be an N2 reference point between the (R)AN 510 and the AMF 521; and the AMF 521 may be a termination point of NAS (N1) signalling, and perform NAS ciphering and integrity protection.

AMF 521 may also support NAS signalling with a UE 501 over an N3 IWF interface. The N3IWF may be used to provide access to untrusted entities. N3IWF may be a termination point for the N2 interface between the (R)AN 510 and the AMF 521 for the control plane, and may be a termination point for the N3 reference point between the (R)AN 510 and the UPF 502 for the user plane. As such, the AMF 521 may handle N2 signalling from the SMF 524 and the AMF 521 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 501 and AMF 521 via an N1 reference point between the UE 501 and the AMF 521, and relay uplink and downlink user-plane packets between the UE 501 and UPF 502. The N3IWF also provides mechanisms for IPsec tunnel establishment with the UE 501. The AMF 521 may exhibit an Namf service-based interface, and may be a termination point for an N14 reference point between two AMFs 521 and an N17 reference point between the AMF 521 and a 5G-EIR (not shown by FIG. 5).

The UE 501 may need to register with the AMF 521 in order to receive network services. RM is used to register or deregister the UE 501 with the network (e.g., AMF 521), and establish a UE context in the network (e.g., AMF 521). The UE 501 may operate in an RM-REGISTERED state or an RM-DEREGISTERED state. In the RM-DEREGISTERED state, the UE 501 is not registered with the network, and the UE context in AMF 521 holds no valid location or routing information for the UE 501 so the UE 501 is not reachable by the AMF 521. In the RM-REGISTERED state, the UE 501 is registered with the network, and the UE context in AMF 521 may hold a valid location or routing information for the UE 501 so the UE 501 is reachable by the AMF 521. In the RM-REGISTERED state, the UE 501 may perform mobility Registration Update procedures, perform periodic Registration Update procedures triggered by expiration of the periodic update timer (e.g., to notify the network that the UE 501 is still active), and perform a Registration Update procedure to update UE capability information or to re-negotiate protocol parameters with the network, among others.

The AMF 521 may store one or more RM contexts for the UE 501, where each RM context is associated with a specific access to the network. The RM context may be a data structure, database object, etc. that indicates or stores, inter alia, a registration state per access type and the periodic update timer. The AMF 521 may also store a 5GC MM context that may be the same or similar to the (E)MM context discussed previously. In various embodiments, the AMF 521 may store a CE mode B Restriction parameter of the UE 501 in an associated MM context or RM context. The AMF 521 may also derive the value, when needed, from the UE's usage setting parameter already stored in the UE context (and/or MM/RM context).

CM may be used to establish and release a signaling connection between the UE 501 and the AMF 521 over the N1 interface. The signaling connection is used to enable NAS signaling exchange between the UE 501 and the CN 520, and comprises both the signaling connection between the UE and the AN (e.g., RRC connection or UE-N3IWF connection for non-3GPP access) and the N2 connection for the UE 501 between the AN (e.g., RAN 510) and the AMF 521. The UE 501 may operate in one of two CM states, CM-IDLE mode or CM-CONNECTED mode. When the UE 501 is operating in the CM-IDLE state/mode, the UE 501 may have no NAS signaling connection established with the AMF 521 over the N1 interface, and there may be (R)AN 510 signaling connection (e.g., N2 and/or N3 connections) for the UE 501. When the UE 501 is operating in the CM-CONNECTED state/mode, the UE 501 may have an established NAS signaling connection with the AMF 521 over the N1 interface, and there may be a (R)AN 510 signaling connection (e.g., N2 and/or N3 connections) for the UE 501. Establishment of an N2 connection between the (R)AN 510 and the AMF 521 may cause the UE 501 to transition from CM-IDLE mode to CM-CONNECTED mode, and the UE 501 may transition from the CM-CONNECTED mode to the CM-IDLE mode when N2 signaling between the (R)AN 510 and the AMF 521 is released.

The SMF 524 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 501 and a data network (DN) 503 identified by a Data Network Name (DNN). PDU sessions may be established upon UE 501 request, modified upon UE 501 and 5GC 520 request, and released upon UE 501 and 5GC 520 request using NAS SM signaling exchanged over the N1 reference point between the UE 501 and the SMF 524. Upon request from an application server, the 5GC 520 may trigger a specific application in the UE 501. In response to receipt of the trigger message, the UE 501 may pass the trigger message (or relevant parts/information of the trigger message) to one or more identified applications in the UE 501. The identified application(s) in the UE 501 may establish a PDU session to a specific DNN. The SMF 524 may check whether the UE 501 requests are compliant with user subscription information associated with the UE 501. In this regard, the SMF 524 may retrieve and/or request to receive update notifications on SMF 524 level subscription data from the UDM 527.

The SMF 524 may include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 524 may be included in the system 500, which may be between another SMF 524 in a visited network and the SMF 524 in the home network in roaming scenarios. Additionally, the SMF 524 may exhibit the Nsmf service-based interface.

The NEF 523 may provide means for securely exposing the services and capabilities provided by 3GPP network functions for third party, internal exposure/re-exposure, Application Functions (e.g., AF 528), edge computing or fog computing systems, etc. In such embodiments, the NEF 523 may authenticate, authorize, and/or throttle the AFs. NEF 523 may also translate information exchanged with the AF 528 and information exchanged with internal network functions. For example, the NEF 523 may translate between an AF-Service-Identifier and an internal 5GC information. NEF 523 may also receive information from other network functions (NFs) based on exposed capabilities of other network functions. This information may be stored at the NEF 523 as structured data, or at a data storage NF using standardized interfaces. The stored information can then be re-exposed by the NEF 523 to other NFs and AFs, and/or used for other purposes such as analytics. Additionally, the NEF 523 may exhibit an Nnef service-based interface.

The NRF 525 may support service discovery functions, receive NF discovery requests from NF instances, and provide the information of the discovered NF instances to the NF instances. NRF 525 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 525 may exhibit the Nnrf service-based interface.

The PCF 526 may provide policy rules to control plane function(s) to enforce them, and may also support unified policy framework to govern network behavior. The PCF 526 may also implement an FE to access subscription information relevant for policy decisions in a UDR of the UDM 527. The PCF 526 may communicate with the AMF 521 via an N15 reference point between the PCF 526 and the AMF 521, which may include a PCF 526 in a visited network and the AMF 521 in case of roaming scenarios. The PCF 526 may communicate with the AF 528 via an N5 reference point between the PCF 526 and the AF 528; and with the SMF 524 via an N7 reference point between the PCF 526 and the SMF 524. The system 500 and/or CN 520 may also include an N24 reference point between the PCF 526 (in the home network) and a PCF 526 in a visited network. Additionally, the PCF 526 may exhibit an Npcf service-based interface.

The UDM 527 may handle subscription-related information to support the network entities' handling of communication sessions, and may store subscription data of UE 501. For example, subscription data may be communicated between the UDM 527 and the AMF 521 via an N8 reference point between the UDM 527 and the AMF. The UDM 527 may include two parts, an application FE and a UDR (the FE and UDR are not shown by FIG. 5). The UDR may store subscription data and policy data for the UDM 527 and the PCF 526, and/or structured data for exposure and application data (including PFDs for application detection, application request information for multiple UEs 501) for the NEF 523. The Nudr service-based interface may be exhibited by the UDR 221 to allow the UDM 527, PCF 526, and NEF 523 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 524 via an N10 reference point between the UDM 527 and the SMF 524. UDM 527 may also support SMS management, wherein an SMS-FE implements the similar application logic as discussed previously. Additionally, the UDM 527 may exhibit the Nudm service-based interface.

The AF 528 may provide application influence on traffic routing, provide access to the NCE, and interact with the policy framework for policy control. The NCE may be a mechanism that allows the 5GC 520 and AF 528 to provide information to each other via NEF 523, which may be used for edge computing implementations. In such implementations, the network operator and third party services may be hosted close to the UE 501 access point of attachment to achieve an efficient service delivery through the reduced end-to-end latency and load on the transport network. For edge computing implementations, the 5GC may select a UPF 502 close to the UE 501 and execute traffic steering from the UPF 502 to DN 503 via the N6 interface. This may be based on the UE subscription data, UE location, and information provided by the AF 528. In this way, the AF 528 may influence UPF (re)selection and traffic routing. Based on operator deployment, when AF 528 is considered to be a trusted entity, the network operator may permit AF 528 to interact directly with relevant NFs. Additionally, the AF 528 may exhibit an Naf service-based interface.

The NSSF 529 may select a set of network slice instances serving the UE 501. The NSSF 529 may also determine allowed NSSAI and the mapping to the subscribed S-NS-SAIs, if needed. The NSSF 529 may also determine the AMF set to be used to serve the UE 501, or a list of candidate AMF(s) 521 based on a suitable configuration and possibly by querying the NRF 525. The selection of a set of network slice instances for the UE 501 may be triggered by the AMF 521 with which the UE 501 is registered by interacting with the NSSF 529, which may lead to a change of AMF 521. The NSSF 529 may interact with the AMF 521 via an N22 reference point between AMF 521 and NSSF 529; and may communicate with another NSSF 529 in a visited network via an N31 reference point (not shown by FIG. 5). Additionally, the NSSF 529 may exhibit an Nnssf service-based interface.

As discussed previously, the CN 520 may include an SMSF, which may be responsible for SMS subscription checking and verification, and relaying SM messages to/from the UE 501 to/from other entities, such as an SMS-GMSC/IWMSC/SMS-router. The SMS may also interact with AMF 521 and UDM 527 for a notification procedure that the UE 501 is available for SMS transfer (e.g., set a UE not reachable flag, and notifying UDM 527 when UE 501 is available for SMS).

The CN 120 may also include other elements that are not shown by FIG. 5, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 5). Individual NFs may share a UDSF for storing their respective unstructured data or individual NFs may each have their own UDSF located at or near the individual NFs. Additionally, the UDSF may exhibit an Nudsf service-based interface (not shown by FIG. 5). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 5 for clarity. In one example, the CN 520 may include an Nx interface, which is an inter-CN interface between the MME (e.g., MME 421) and the AMF 521 in order to enable interworking between CN 520 and CN 420. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 6:
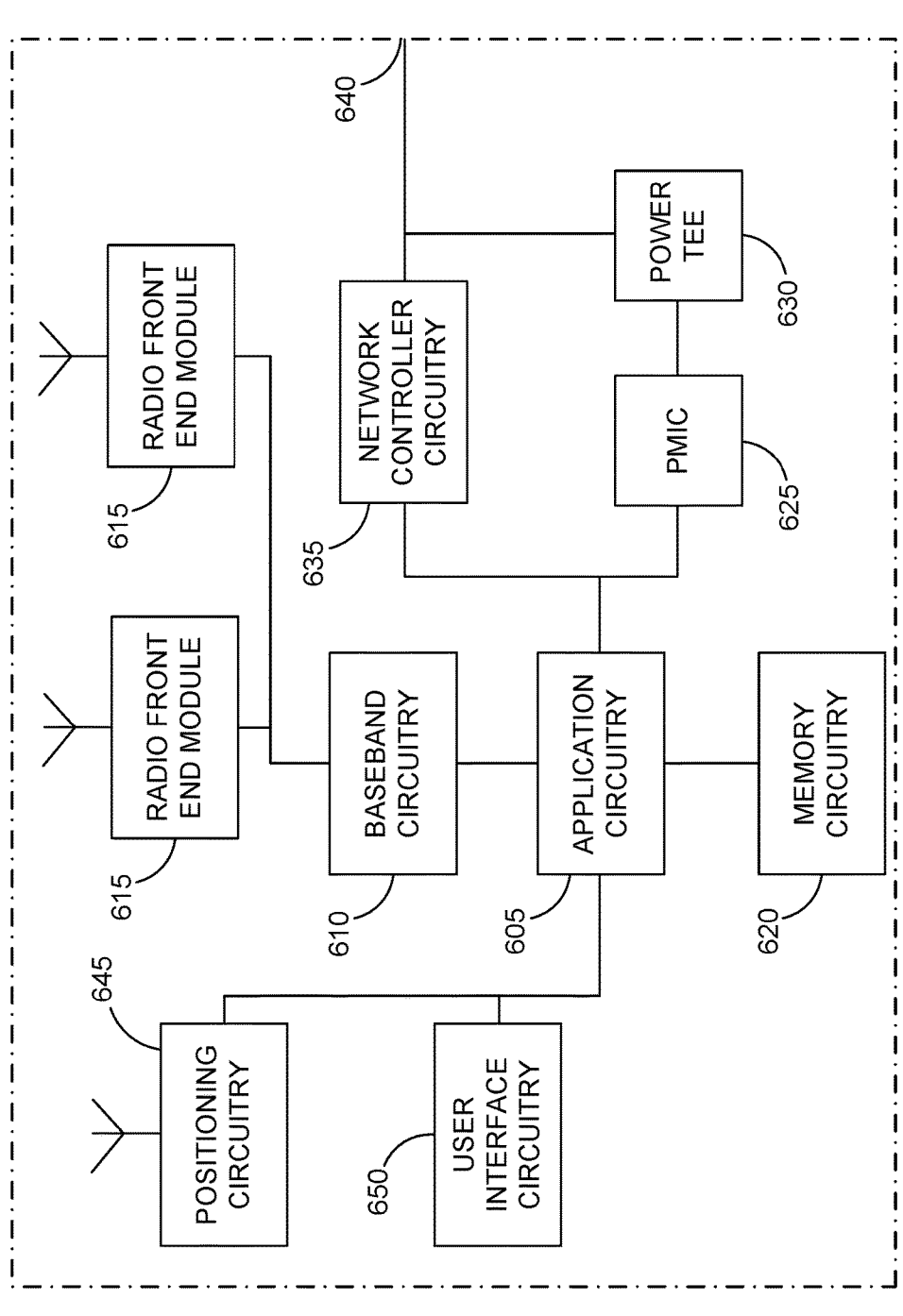
FIG. 6 depicts an example of infrastructure equipment, in accordance with various embodiments.

FIG. 6 illustrates an example of infrastructure equipment 600 in accordance with various embodiments. The infrastructure equipment 600 (or "system 600") may be implemented as a base station, radio head, RAN node such as the RAN nodes 311 and/or AP 306 shown and described previously, application server(s) 330, and/or any other element/device discussed herein. In other examples, the system 600 could be implemented in or by a UE.

The system 600 includes application circuitry 605, baseband circuitry 610, one or more radio front end modules (RFEMs) 615, memory circuitry 620, power management integrated circuitry (PMIC) 625, power tee circuitry 630, network controller circuitry 635, network interface connector 640, satellite positioning circuitry 645, and user interface 650. In some embodiments, the device 600 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 605 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 605 may be coupled with or may include memory/storage elements and may be configured to execute instructions stored in the memory/storage to enable various applications or operating systems to run on the system 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 605 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 605 may comprise, or may be, a special-purpose processor/controller to operate according to the various embodiments herein. As examples, the processor(s) of application circuitry 605 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 600 may not utilize application circuitry 605, and instead may include a special-purpose processor/controller to process IP data received from an EPC or 5GC, for example.

In some implementations, the application circuitry 605 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 610 are discussed infra with regard to FIG. 8.

User interface circuitry 650 may include one or more user interfaces designed to enable user interaction with the system 600 or peripheral component interfaces designed to enable peripheral component interaction with the system 600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 811 of FIG. 8 infra), and the RFEM may be connected to multiple antennas. In alternative implementations, both mmWave and sub-mmWave radio functions may be implemented in the same physical RFEM 615, which incorporates both mmWave antennas and sub-mmWave.

The memory circuitry 620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 620 may be implemented as one or more of solder down packaged integrated circuits, socketed memory modules and plug-in memory cards.

The PMIC 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 630 may provide for electrical power drawn from a network cable to provide both power supply and data connectivity to the infrastructure equipment 600 using a single cable.

The network controller circuitry 635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 via network interface connector 640 using a physical connection, which may be electrical (commonly referred to as a "copper interconnect"), optical, or wireless. The network controller circuitry 635 may include one or more dedicated processors and/or FPGAs to communicate using one or more of the aforementioned protocols. In some implementations, the network controller circuitry 635 may include multiple controllers to provide connectivity to other networks using the same or different protocols.

The positioning circuitry 645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 645 may include a Micro-Technology for Positioning, Navigation, and Timing (Micro-PNT) IC that uses a master timing clock to perform position tracking/estimation without GNSS assistance. The positioning circuitry 645 may also be part of, or interact with, the baseband circuitry 610 and/or RFEMs 615 to communicate with the nodes and components of the positioning network. The positioning circuitry 645 may also provide position data and/or time data to the application circuitry 605, which may use the data to synchronize operations with various infrastructure (e.g., RAN nodes 311, etc.), or the like.

The components shown by FIG. 6 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I²C interface, an SPI interface, point to point interfaces, and a power bus, among others.

Figure 7:
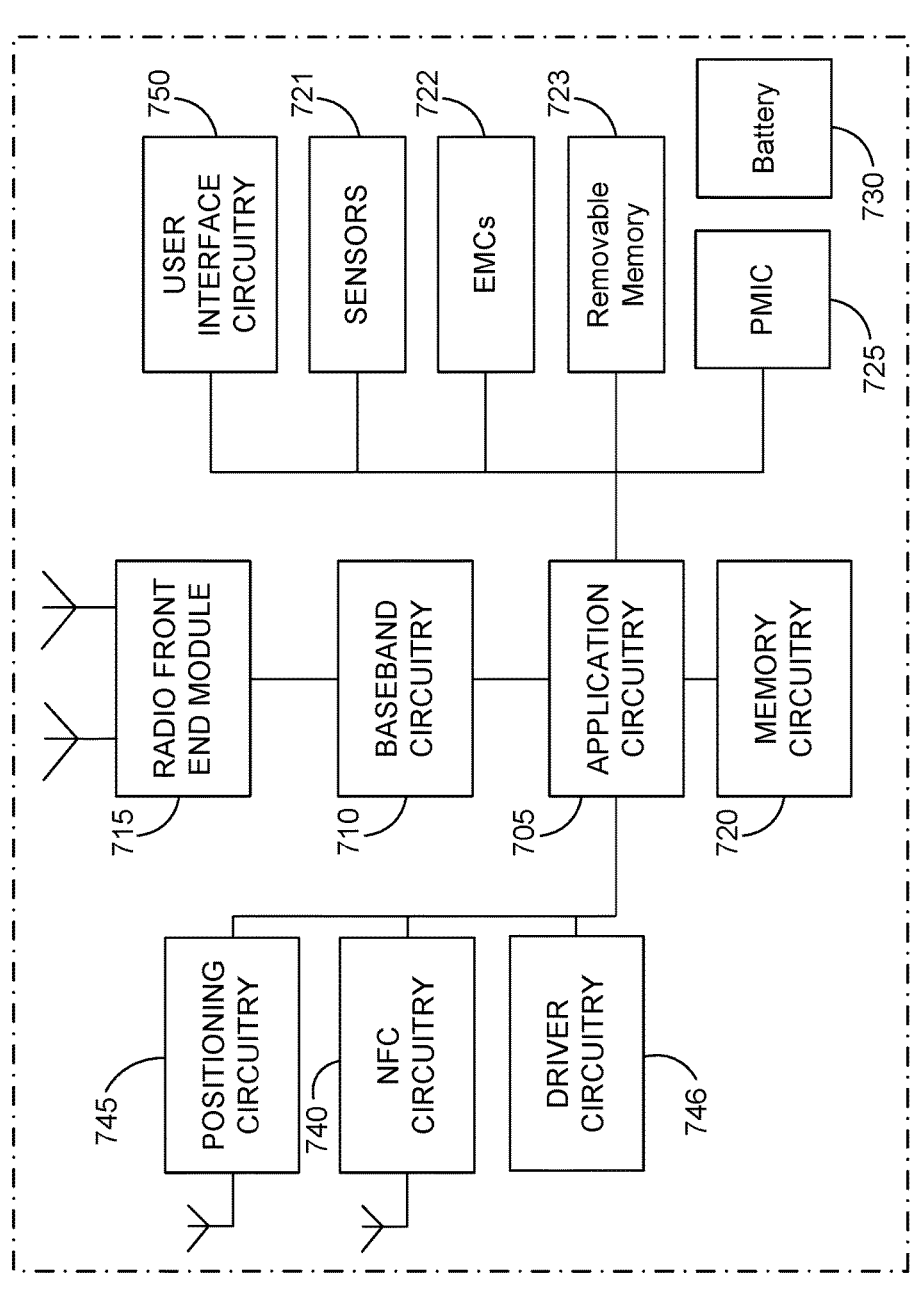
FIG. 7 depicts example components of a computer platform, in accordance with various embodiments.

FIG. 7 illustrates an example of a platform 700 (or "device 700") in accordance with various embodiments. In embodiments, the computer platform 700 may be suitable for use as UEs 301, 302, 401, application servers 330, and/or any other element/device discussed herein. The platform 700 may include any combinations of the components shown in the example. The components of platform 700 may be implemented as integrated circuits (ICs), portions thereof, discrete electronic devices, or other modules, logic, hardware, software, firmware, or a combination thereof adapted in the computer platform 700, or as components otherwise incorporated within a chassis of a larger system. The block diagram of FIG. 7 is intended to show a high level view of components of the computer platform 700. However, some of the components shown may be omitted, additional components may be present, and different arrangement of the components shown may occur in other implementations.

Application circuitry 705 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 605 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more micropro-cessors or controllers, a multithreaded processor, an ultra-low voltage processor, an embedded processor, some other known processing element, or any suitable combination thereof. In some embodiments, the application circuitry 605 may comprise, or may be, a special-purpose processor/controller to operate according to the various embodiments herein.

As examples, the processor(s) of application circuitry 705 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 705 may also be one or more of Advanced Micro Devices (AMD) Ryzen® processor(s) or Accelerated Processing Units (APUs); A5-A9 processor(s) from Apple® Inc., Snapdragon™ processor(s) from Qual-comm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 705 may be a part of a system on a chip (SoC) in which the application circuitry 705 and other components are formed into a single integrated circuit, or a single package, such as the Edison™ or Galileo™ SoC boards from Intel® Corporation.

Additionally or alternatively, application circuitry 705 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 710 may be implemented, for example, as a solder-down substrate including one or more integrated circuits, a single packaged integrated circuit sol-dered to a main circuit board or a multi-chip module containing two or more integrated circuits. The various hardware electronic elements of baseband circuitry 710 are discussed infra with regard to FIG. 8.

The RFEMs 715 may comprise a millimeter wave (mm-Wave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 811 of FIG. 8 infra), and the RFEM may be connected to multiple antennas. In alternative implementations, both mmWave and sub-mmWave radio functions may be implemented in the same physical RFEM 715, which incorporates both mmWave antennas and sub-mmWave.

The memory circuitry 720 may include any number and type of memory devices used to provide for a given amount of system memory. As examples, the memory circuitry 720 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 720 may be developed in accordance with a Joint Electron Devices Engineering Council (JEDEC) low power double data rate (LPDDR)-based design, such as LPDDR2, LPDDR3, LPDDR4, or the like. Memory circuitry 720 may be implemented as one or more of solder down packaged integrated circuits, single die package (SDP), dual die pack-age (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 720 may be on-die memory or registers associated with the application circuitry 705. To provide for persistent storage of information such as data, applications, operating systems and so forth, memory circuitry 720 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 700 may incorporate the three-dimensional (3D) cross-point (XPOINT) memories from Intel® and Micron®.

Removable memory circuitry 723 may include devices, circuitry, enclosures/housings, ports or receptacles, etc. used to couple portable data storage devices with the platform 700. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 700 may also include interface circuitry (not shown) that is used to connect external devices with the platform 700. The external devices connected to the plat-form 700 via the interface circuitry include sensor circuitry 721 and electro-mechanical components (EMCs) 722, as well as removable memory devices coupled to removable memory circuitry 723.

The sensor circuitry 721 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 722 include devices, modules, or subsystems whose purpose is to enable platform 700 to change its state, position, and/or orientation, or move or control a mechanism or (sub)system. Additionally, EMCs 722 may be configured to generate and send messages/signalling to other components of the platform 700 to indicate a current state of the EMCs 722. Examples of the EMCs 722 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 700 is configured to operate one or more EMCs 722 based on one or more captured events and/or instructions or control signals received from a service provider and/or various clients.

In some implementations, the interface circuitry may connect the platform 700 with positioning circuitry 745. The positioning circuitry 745 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-PNT IC that uses a master timing clock to perform position tracking/estimation without GNSS assistance. The positioning circuitry 745 may also be part of, or interact with, the baseband circuitry 610 and/or RFEMs 715 to communicate with the nodes and components of the positioning network. The positioning circuitry 745 may also provide position data and/or time data to the application circuitry 705, which may use the data to synchronize operations with various infrastructure (e.g., radio base stations), for turn-by-turn navigation applications, or the like In some implementations, the interface circuitry may connect the platform 700 with Near-Field Communication (NFC) circuitry 740. NFC circuitry 740 is configured to provide contactless, short-range communications based on radio frequency identification (RFID) standards, wherein magnetic field induction is used to enable communication between NFC circuitry 740 and NFC-enabled devices external to the platform 700 (e.g., an "NFC touchpoint"). NFC circuitry 740 comprises an NFC controller coupled with an antenna element and a processor coupled with the NFC controller. The NFC controller may be a chip/IC providing NFC functionalities to the NFC circuitry 740 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 740, or initiate data transfer between the NFC circuitry 740 and another active NFC device (e.g., a smartphone or an NFC-enabled POS terminal) that is proximate to the platform 700.

The driver circuitry 746 may include software and hardware elements that operate to control particular devices that are embedded in the platform 700, attached to the platform 700, or otherwise communicatively coupled with the platform 700. The driver circuitry 746 may include individual drivers allowing other components of the platform 700 to interact with or control various input/output (I/O) devices that may be present within, or connected to, the platform 700. For example, driver circuitry 746 may include a display driver to control and allow access to a display device, a touchscreen driver to control and allow access to a touchscreen interface of the platform 700, sensor drivers to obtain sensor readings of sensor circuitry 721 and control and allow access to sensor circuitry 721, EMC drivers to obtain actuator positions of the EMCs 722 and/or control and allow access to the EMCs 722, a camera driver to control and allow access to an embedded image capture device, audio drivers to control and allow access to one or more audio devices.

The power management integrated circuitry (PMIC) 725 (also referred to as "power management circuitry 725") may manage power provided to various components of the platform 700. In particular, with respect to the baseband circuitry 710, the PMIC 725 may control power-source selection, voltage scaling, battery charging, or DC-to-DC conversion. The PMIC 725 may often be included when the platform 700 is capable of being powered by a battery 730, for example, when the device is included in a UE 301, 302, 401.

In some embodiments, the PMIC 725 may control, or otherwise be part of, various power saving mechanisms of the platform 700. For example, if the platform 700 is in an RRC_Connected state, where it is still connected to the RAN node as it expects to receive traffic shortly, then it may enter a state known as Discontinuous Reception Mode (DRX) after a period of inactivity. During this state, the platform 700 may power down for brief intervals of time and thus save power. If there is no data traffic activity for an extended period of time, then the platform 700 may transition off to an RRC_Idle state, where it disconnects from the network and does not perform operations such as channel quality feedback, handover, etc. The platform 700 goes into a very low power state and it performs paging where again it periodically wakes up to listen to the network and then powers down again. The platform 700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 730 may power the platform 700, although in some examples the platform 700 may be mounted deployed in a fixed location, and may have a power supply coupled to an electrical grid. The battery 730 may be a lithium ion battery, a metal-air battery, such as a zinc-air battery, an aluminum-air battery, a lithium-air battery, and the like. In some implementations, such as in V2X applications, the battery 730 may be a typical lead-acid automotive battery.

In some implementations, the battery 730 may be a "smart battery," which includes or is coupled with a Battery Management System (BMS) or battery monitoring integrated circuitry. The BMS may be included in the platform 700 to track the state of charge (SoCh) of the battery 730. The BMS may be used to monitor other parameters of the battery 730 to provide failure predictions, such as the state of health (SoH) and the state of function (SoF) of the battery 730. The BMS may communicate the information of the battery 730 to the application circuitry 705 or other components of the platform 700. The BMS may also include an analog-to-digital (ADC) convertor that allows the application circuitry 705 to directly monitor the voltage of the battery 730 or the current flow from the battery 730. The battery parameters may be used to determine actions that the platform 700 may perform, such as transmission frequency, network operation, sensing frequency, and the like.

A power block, or other power supply coupled to an electrical grid may be coupled with the BMS to charge the battery 730. In some examples, the power block XS30 may be replaced with a wireless power receiver to obtain the power wirelessly, for example, through a loop antenna in the computer platform 700. In these examples, a wireless battery charging circuit may be included in the BMS. The specific charging circuits chosen may depend on the size of the battery 730, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 750 includes various input/output (I/O) devices present within, or connected to, the platform 700, and includes one or more user interfaces designed to enable user interaction with the platform 700 and/or peripheral component interfaces designed to enable peripheral component interaction with the platform 700. The user interface circuitry 750 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 700. The output device circuitry may also include speakers or other audio emitting devices, printer(s), and/or the like. In some embodiments, the sensor circuitry 721 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 700 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an $I^2C$ interface, an SPI interface, point-to-point interfaces, and a power bus, among others.

Figure 8:
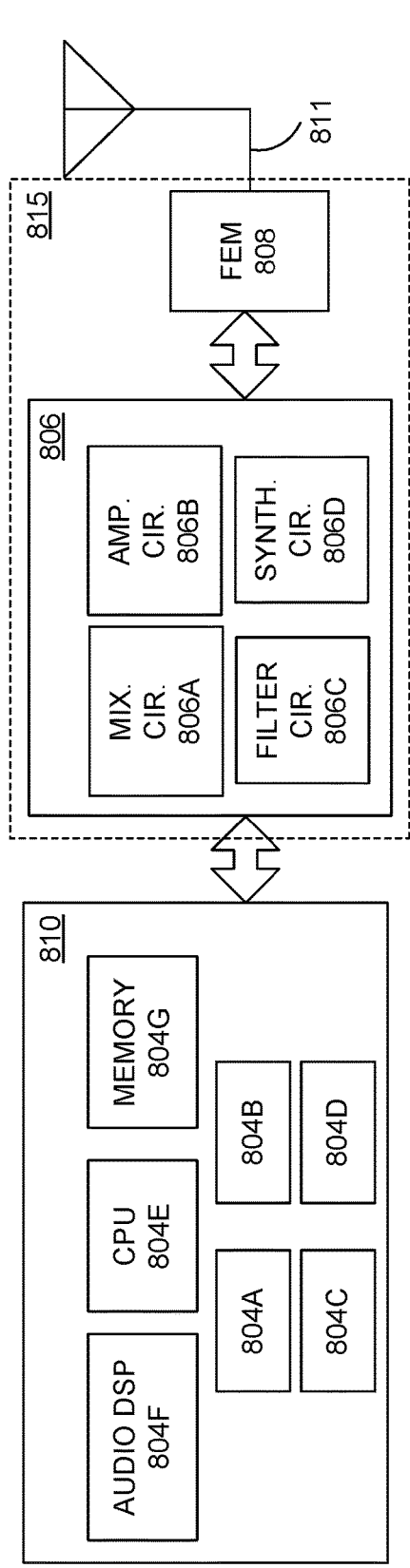
FIG. 8 depicts example components of baseband circuitry and radio frequency circuitry, in accordance with various embodiments.
Figure 8:

FIG. 8 illustrates example components of baseband circuitry 810 and radio front end modules (RFEM) 815 in accordance with various embodiments. The baseband circuitry 810 corresponds to the baseband circuitry 610 and 710 of FIGS. 6 and 7, respectively. The RFEM 815 corresponds to the RFEM 615 and 715 of FIGS. 6 and 7, respectively. As shown, the RFEMs 815 may include Radio Frequency (RF) circuitry 806, front-end module (FEM) circuitry 808, antenna array 811 coupled together at least as shown.

The baseband circuitry 810 includes circuitry and/or control logic configured to carry out various radio/network protocol and radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 810 may include Fast-Fourier Transform (FFT), precoding, or constellation mapping/demapping functionality. In some embodiments, encoding/decoding circuitry of the baseband circuitry 810 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 810 is configured to process baseband signals received from a receive signal path of the RF circuitry 806 and to generate baseband signals for a transmit signal path of the RF circuitry 806. The baseband circuitry 810 is configured to interface with application circuitry 605/705 (see FIGS. 6 and 7) for generation and processing of the baseband signals and for controlling operations of the RF circuitry 806. The baseband circuitry 810 may handle various radio control functions.

The aforementioned circuitry and/or control logic of the baseband circuitry 810 may include one or more single or multi-core processors. For example, the one or more processors may include a 3G baseband processor 804A, a 4G/LTE baseband processor 804B, a 5G/NR baseband processor 804C, or some other baseband processor(s) 804D for other existing generations, generations in development or to be developed in the future (e.g., sixth generation (6G), etc.). In other embodiments, some or all of the functionality of baseband processors 804A-D may be included in modules stored in the memory 804G and executed via a Central Processing Unit (CPU) 804E. In other embodiments, some or all of the functionality of baseband processors 804A-D may be provided as hardware accelerators (e.g., FPGAs, ASICs, etc.) loaded with the appropriate bit streams or logic blocks stored in respective memory cells. In various embodiments, the memory 804G may store program code of a real-time OS (RTOS), which when executed by the CPU 804E (or other baseband processor), is to cause the CPU 804E (or other baseband processor) to manage resources of the baseband circuitry 810, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 810 includes one or more audio digital signal processor(s) (DSP) 804F. The audio DSP(s) 804F include elements for compression/decompression and echo cancellation and may include other suitable processing elements in other embodiments.

In some embodiments, each of the processors 804A-804E include respective memory interfaces to send/receive data to/from the memory 804G. The baseband circuitry 810 may further include one or more interfaces to communicatively couple to other circuitries/devices, such as an interface to send/receive data to/from memory external to the baseband circuitry 810; an application circuitry interface to send/receive data to/from the application circuitry 605/705 of FIGS. 6-8); an RF circuitry interface to send/receive data to/from RF circuitry 806 of FIG. 8; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 725.

In alternate embodiments (which may be combined with the above described embodiments), baseband circuitry 810 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (e.g., the radio front end modules 815).

Although not shown by FIG. 8, in some embodiments, the baseband circuitry 810 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 810 and/or RF circuitry 806 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 810 and/or RF circuitry 806 are part of a Wi-Fi communication system. In the second example, the protocol processing circuitry would operate Wi-Fi MAC and logical link control (LLC) functions. The protocol processing circuitry may include one or more memory structures (e.g., 804G) to store program code and data for operating the protocol functions, as well as one or more processing cores to execute the program code and perform various operations using the data. The baseband circuitry 810 may also support radio communications for more than one wireless protocol.

The various hardware elements of the baseband circuitry 810 discussed herein may be implemented, for example, as a solder-down substrate including one or more integrated circuits (ICs), a single packaged IC soldered to a main circuit board or a multi-chip module containing two or more ICs. In one example, the components of the baseband circuitry 810 may be suitably combined in a single chip or chipset, or disposed on a same circuit board. In another example, some or all of the constituent components of the baseband circuitry 810 and RF circuitry 806 may be implemented together such as, for example, a system on a chip (SoC) or System-in-Package (SiP). In another example, some or all of the constituent components of the baseband circuitry 810 may be implemented as a separate SoC that is communicatively coupled with and RF circuitry 806 (or multiple instances of RF circuitry 806). In yet another example, some or all of the constituent components of the baseband circuitry 810 and the application circuitry 605/705 may be implemented together as individual SoCs mounted to a same circuit board (e.g., a "multi-chip package").

In some embodiments, the baseband circuitry 810 may provide for communication compatible with one or more radio technologies. For example, in some embodiments, the baseband circuitry 810 may support communication with an E-UTRAN or other WMAN, a WLAN, a WPAN. Embodiments in which the baseband circuitry 810 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path, which may include circuitry to down-convert RF signals received from the FEM circuitry 808 and provide baseband signals to the baseband circuitry 810. RF circuitry 806 may also include a transmit signal path, which may include circuitry to up-convert baseband signals provided by the baseband circuitry 810 and provide RF output signals to the FEM circuitry 808 for transmission.

In some embodiments, the receive signal path of the RF circuitry 806 may include mixer circuitry 806*a*, amplifier circuitry 806*b* and filter circuitry 806*c*. In some embodiments, the transmit signal path of the RF circuitry 806 may include filter circuitry 806*c* and mixer circuitry 806*a*. RF circuitry 806 may also include synthesizer circuitry 806*d* for synthesizing a frequency for use by the mixer circuitry 806*a* of the receive signal path and the transmit signal path. In some embodiments, the mixer circuitry 806*a* of the receive signal path may be configured to down-convert RF signals received from the FEM circuitry 808 based on the synthesized frequency provided by synthesizer circuitry 806*d*. The amplifier circuitry 806*b* may be configured to amplify the down-converted signals and the filter circuitry 806*c* may be a low-pass filter (LPF) or band-pass filter (BPF) configured to remove unwanted signals from the down-converted signals to generate output baseband signals. Output baseband signals may be provided to the baseband circuitry 810 for further processing. In some embodiments, the output baseband signals may be zero-frequency baseband signals, although this is not a requirement. In some embodiments, mixer circuitry 806*a* of the receive signal path may comprise passive mixers, although the scope of the embodiments is not limited in this respect.

In some embodiments, the mixer circuitry 806*a* of the transmit signal path may be configured to up-convert input baseband signals based on the synthesized frequency provided by the synthesizer circuitry 806*d* to generate RF output signals for the FEM circuitry 808. The baseband signals may be provided by the baseband circuitry 810 and may be filtered by filter circuitry 806*c*.

In some embodiments, the mixer circuitry 806*a* of the receive signal path and the mixer circuitry 806*a* of the transmit signal path may include two or more mixers and may be arranged for quadrature downconversion and upconversion, respectively. In some embodiments, the mixer circuitry 806*a* of the receive signal path and the mixer circuitry 806*a* of the transmit signal path may include two or more mixers and may be arranged for image rejection (e.g., Hartley image rejection). In some embodiments, the mixer circuitry 806*a* of the receive signal path and the mixer circuitry 806*a* of the transmit signal path may be arranged for direct downconversion and direct upconversion, respectively. In some embodiments, the mixer circuitry 806*a* of the receive signal path and the mixer circuitry 806*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 810 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806*d* may be a fractional-N synthesizer or a fractional N/N+1 synthesizer, although the scope of the embodiments is not limited in this respect as other types of frequency synthesizers may be suitable. For example, synthesizer circuitry 806*d* may be a delta-sigma synthesizer, a frequency multiplier, or a synthesizer comprising a phase-locked loop with a frequency divider.

The synthesizer circuitry 806*d* may be configured to synthesize an output frequency for use by the mixer circuitry 806*a* of the RF circuitry 806 based on a frequency input and a divider control input. In some embodiments, the synthesizer circuitry 806*d* may be a fractional N/N+1 synthesizer.

In some embodiments, frequency input may be provided by a voltage controlled oscillator (VCO), although that is not a requirement. Divider control input may be provided by either the baseband circuitry 810 or the application circuitry 605/705 depending on the desired output frequency. In some embodiments, a divider control input (e.g., N) may be determined from a look-up table based on a channel indicated by the application circuitry 605/705.

Synthesizer circuitry 806*d* of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path, which may include circuitry configured to operate on RF signals received from antenna array 811, amplify the received signals and provide the amplified versions of the received signals to the RF circuitry 806 for further processing. FEM circuitry 808 may also include a transmit signal path, which may include circuitry configured to amplify signals for transmission provided by the RF circuitry 806 for transmission by one or more of antenna elements of antenna array 811. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission by one or more antenna elements of the antenna array 811.

The antenna array 811 comprises one or more antenna elements, each of which is configured convert electrical signals into radio waves to travel through the air and to convert received radio waves into electrical signals. For example, digital baseband signals provided by the baseband circuitry 810 is converted into analog RF signals (e.g., modulated waveform) that will be amplified and transmitted via the antenna elements of the antenna array 811 including one or more antenna elements (not shown). The antenna elements may be omnidirectional, direction, or a combination thereof. The antenna elements may be formed in a multitude of arranges as are known and/or discussed herein. The antenna array 811 may comprise microstrip antennas or printed antennas that are fabricated on the surface of one or more printed circuit boards. The antenna array 811 may be formed in as a patch of metal foil (e.g., a patch antenna) in a variety of shapes, and may be coupled with the RF circuitry 806 and/or FEM circuitry 808 using metal transmission lines or the like.

Processors of the application circuitry 605/705 and processors of the baseband circuitry 810 may be used to execute elements of one or more instances of a protocol stack. For example, processors of the baseband circuitry 810, alone or in combination, may be used execute Layer 3, Layer 2, or Layer 1 functionality, while processors of the application circuitry 605/705 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 9:
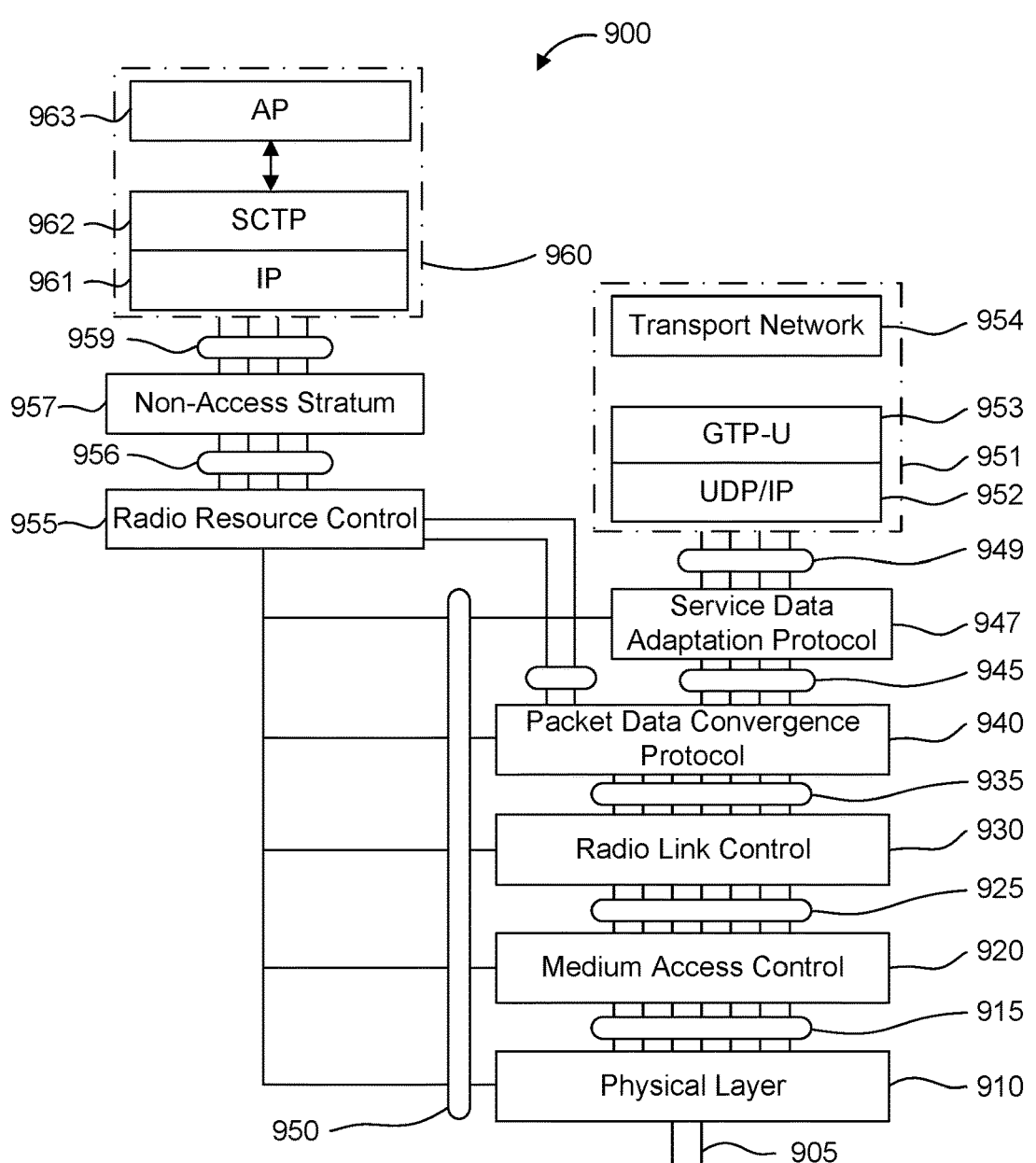
FIG. 9 is an illustration of various protocol functions that may be used for various protocol stacks, in accordance with various embodiments.

FIG. 9 illustrates various protocol functions that may be implemented in a wireless communication device according to various embodiments. In particular, FIG. 9 includes an arrangement 900 showing interconnections between various protocol layers/entities. The following description of FIG. 9 is provided for various protocol layers/entities that operate in conjunction with the 5G/NR system standards and LTE system standards, but some or all of the aspects of FIG. 9 may be applicable to other wireless communication network systems as well.

The protocol layers of arrangement 900 may include one or more of PHY 910, MAC 920, RLC 930, PDCP 940, SDAP 947, RRC 955, and NAS layer 957, in addition to other higher layer functions not illustrated. The protocol layers may include one or more service access points (e.g., items 959, 956, 950, 949, 945, 935, 925, and 915 in FIG. 9) that may provide communication between two or more protocol layers.

The PHY 910 may transmit and receive physical layer signals 905 that may be received from or transmitted to one or more other communication devices. The physical layer signals 905 may comprise one or more physical channels, such as those discussed herein. The PHY 910 may further perform link adaptation or adaptive modulation and coding (AMC), power control, cell search (e.g., for initial synchronization and handover purposes), and other measurements used by higher layers, such as the RRC 955. The PHY 910 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 910 may process requests from and provide indications to an instance of MAC 920 via one or more PHY-SAP 915. According to some embodiments, requests and indications communicated via PHY-SAP 915 may comprise one or more transport channels.

Instance(s) of MAC 920 may process requests from, and provide indications to, an instance of RLC 930 via one or more MAC-SAPs 925. These requests and indications communicated via the MAC-SAP 925 may comprise one or more logical channels. The MAC 920 may perform mapping between the logical channels and transport channels, multiplexing of MAC SDUs from one or more logical channels onto TBs to be delivered to PHY 910 via the transport channels, de-multiplexing MAC SDUs to one or more logical channels from TBs delivered from the PHY 910 via transport channels, multiplexing MAC SDUs onto TBs, scheduling information reporting, error correction through HARQ, and logical channel prioritization.

Instance(s) of RLC 930 may process requests from and provide indications to an instance of PDCP 940 via one or more radio link control service access points (RLC-SAP) 935. These requests and indications communicated via RLC-SAP 935 may comprise one or more RLC channels. The RLC 930 may operate in a plurality of modes of operation, including: Transparent Mode (TM), Unacknowledged Mode (UM), and Acknowledged Mode (AM). The RLC 930 may execute transfer of upper layer protocol data units (PDUs), error correction through automatic repeat request (ARQ) for AM data transfers, and concatenation, segmentation and reassembly of RLC SDUs for UM and AM data transfers. The RLC 930 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 940 may process requests from and provide indications to instance(s) of RRC 955 and/or instance(s) of SDAP 947 via one or more packet data convergence protocol service access points (PDCP-SAP) 945. These requests and indications communicated via PDCP-SAP 945 may comprise one or more radio bearers. The PDCP 940 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 947 may process requests from and provide indications to one or more higher layer protocol entities via one or more SDAP-SAP 949. These requests and indications communicated via SDAP-SAP 949 may comprise one or more QoS flows. The SDAP 947 may map QoS flows to DRBs, and vice versa, and may also mark QFIs in DL and UL packets. A single SDAP entity 947 may be configured for an individual PDU session. In the UL direction, the NG-RAN 310 may control the mapping of QoS Flows to DRB(s) in two different ways, reflective mapping or explicit mapping. For reflective mapping, the SDAP 947 of a UE 301 may monitor the QFIs of the DL packets for each DRB, and may apply the same mapping for packets flowing in the UL direction. For a DRB, the SDAP 947 of the UE 301 may map the UL packets belonging to the QoS flows(s) corresponding to the QoS flow ID(s) and PDU session observed in the DL packets for that DRB. To enable reflective mapping, the NG-RAN 510 may mark DL packets over the Uu interface with a QoS flow ID. The explicit mapping may involve the RRC 955 configuring the SDAP 947 with an explicit QoS flow to DRB mapping rule, which may be stored and followed by the SDAP 947. In embodiments, the SDAP 947 may only be used in NR implementations and may not be used in LTE implementations.

The RRC 955 may configure, via one or more management service access points (M-SAP), aspects of one or more protocol layers, which may include one or more instances of PHY 910, MAC 920, RLC 930, PDCP 940 and SDAP 947. In embodiments, an instance of RRC 955 may process requests from and provide indications to one or more NAS entities 957 via one or more RRC-SAPs 956. The main services and functions of the RRC 955 may include broadcast of system information (e.g., included in MIBs or SIBs related to the NAS), broadcast of system information related to the access stratum (AS), paging, establishment, maintenance and release of an RRC connection between the UE 301 and RAN 310 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 957 may form the highest stratum of the control plane between the UE 301 and the AMF 521. The NAS 957 may support the mobility of the UEs 301 and the session management procedures to establish and maintain IP connectivity between the UE 301 and a P-GW in LTE systems.

According to various embodiments, one or more protocol entities of arrangement 900 may be implemented in UEs 301, RAN nodes 311, AMF 521 in NR implementations or MME 421 in LTE implementations, UPF 502 in NR implementations or S-GW 422 and P-GW 423 in LTE implementations, or the like to be used for control plane or user plane communications protocol stack between the aforementioned devices. In such embodiments, one or more protocol entities that may be implemented in one or more of UE 301, gNB 311, AMF 521, etc. may communicate with a respective peer protocol entity that may be implemented in or on another device using the services of respective lower layer protocol entities to perform such communication. In some embodiments, a gNB-CU of the gNB 311 may host the RRC 955, SDAP 947, and PDCP 940 of the gNB that controls the operation of one or more gNB-DUs, and the gNB-DUs of the gNB 311 may each host the RLC 930, MAC 920, and PHY 910 of the gNB 311.

In a first example, a control plane protocol stack may comprise, in order from highest layer to lowest layer, NAS 957, RRC 955, PDCP 940, RLC 930, MAC 920, and PHY 910. In this example, upper layers 960 may be built on top of the NAS 957, which includes an IP layer 961, an SCTP 962, and an application layer signaling protocol (AP) 963.

In NR implementations, the AP 963 may be an NG application protocol layer (NGAP or NG-AP) 963 for the NG interface 313 defined between the NG-RAN node 311 and the AMF 521, or the AP 963 may be an Xn application protocol layer (XnAP or Xn-AP) 963 for the Xn interface 312 that is defined between two or more RAN nodes 311.

The NG-AP 963 may support the functions of the NG interface 313 and may comprise Elementary Procedures (EPs). An NG-AP EP may be a unit of interaction between the NG-RAN node 311 and the AMF 521. The NG-AP 963 services may comprise two groups: UE-associated services (e.g., services related to a UE 301, 302) and non-UE-associated services (e.g., services related to the whole NG interface instance between the NG-RAN node 311 and AMF 521). These services may include functions including, but not limited to: a paging function for the sending of paging requests to NG-RAN nodes 311 involved in a particular paging area; a UE context management function for allowing the AMF 521 to establish, modify, and/or release a UE context in the AMF 521 and the NG-RAN node 311; a mobility function for UEs 301 in ECM-CONNECTED mode for intra-system HOs to support mobility within NG-RAN and inter-system HOs to support mobility from/to EPS systems; a NAS Signaling Transport function for transporting or rerouting NAS messages between UE 301 and AMF 521; a NAS node selection function for determining an association between the AMF 521 and the UE 301; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 311 via CN 320; and/or other like functions.

The XnAP 963 may support the functions of the Xn interface 312 and may comprise XnAP basic mobility procedures and XnAP global procedures. The XnAP basic mobility procedures may comprise procedures used to handle UE mobility within the NG RAN 311 (or E-UTRAN 410), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 301, such as Xn interface setup and reset procedures, NG-RAN update procedures, cell activation procedures, and the like.

In LTE implementations, the AP 963 may be an S1 Application Protocol layer (S1-AP) 963 for the S1 interface 313 defined between an E-UTRAN node 311 and an MME, or the AP 963 may be an X2 application protocol layer (X2AP or X2-AP) 963 for the X2 interface 312 that is defined between two or more E-UTRAN nodes 311.

The S1 Application Protocol layer (S1-AP) 963 may support the functions of the S1 interface, and similar to the NG-AP discussed previously, the S1-AP may comprise S1-AP EPs. An S1-AP EP may be a unit of interaction between the E-UTRAN node 311 and an MME 421 within an LTE CN 320. The S1-AP 963 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 963 may support the functions of the X2 interface 312 and may comprise X2AP basic mobility procedures and X2AP global procedures. The X2AP basic mobility procedures may comprise procedures used to handle UE mobility within the E-UTRAN 320, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 301, such as X2 interface setup and reset procedures, load indication procedures, error indication procedures, cell activation procedures, and the like.

The SCTP layer (alternatively referred to as the SCTP/IP layer) 962 may provide guaranteed delivery of application layer messages (e.g., NGAP or XnAP messages in NR implementations, or S1-AP or X2AP messages in LTE implementations). The SCTP 962 may ensure reliable delivery of signaling messages between the RAN node 311 and the AMF 521/MME 421 based, in part, on the IP protocol, supported by the IP 961. The Internet Protocol layer (IP) 961 may be used to perform packet addressing and routing functionality. In some implementations the IP layer 961 may use point-to-point transmission to deliver and convey PDUs. In this regard, the RAN node 311 may comprise L2 and L1 layer communication links (e.g., wired or wireless) with the MME/AMF to exchange information.

In a second example, a user plane protocol stack may comprise, in order from highest layer to lowest layer, SDAP 947, PDCP 940, RLC 930, MAC 920, and PHY 910. The user plane protocol stack may be used for communication between the UE 301, the RAN node 311, and UPF 502 in NR implementations or an S-GW 422 and P-GW 423 in LTE implementations. In this example, upper layers 951 may be built on top of the SDAP 947, and may include a user datagram protocol (UDP) and IP security layer (UDP/IP) 952, a General Packet Radio Service (GPRS) Tunneling Protocol for the user plane layer (GTP-U) 953, and a User Plane PDU layer (UP PDU) 963.

The transport network layer 954 (also referred to as a "transport layer") may be built on IP transport, and the GTP-U 953 may be used on top of the UDP/IP layer 952 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 953 may be used for carrying user data within the GPRS core network and between the radio access network and the core network. The user data transported can be packets in any of IPv4, IPv6, or PPP formats, for example. The UDP/IP 952 may provide checksums for data integrity, port numbers for addressing different functions at the source and destination, and encryption and authentication on the selected data flows. The RAN node 311 and the S-GW 422 may utilize an S1-U interface to exchange user plane data via a protocol stack comprising an L1 layer (e.g., PHY 910), an L2 layer (e.g., MAC 920, RLC 930, PDCP 940, and/or SDAP 947), the UDP/IP layer 952, and the GTP-U 953. The S-GW 422 and the P-GW 423 may utilize an S5/S8a interface to exchange user plane data via a protocol stack comprising an L1 layer, an L2 layer, the UDP/IP layer 952, and the GTP-U 953. As discussed previously, NAS protocols may support the mobility of the UE 301 and the session management procedures to establish and maintain IP connectivity between the UE 301 and the P-GW 423.

Moreover, although not shown by FIG. 9, an application layer may be present above the AP 963 and/or the transport network layer 954. The application layer may be a layer in which a user of the UE 301, RAN node 311, or other network element interacts with software applications being executed, for example, by application circuitry 605 or application circuitry 705, respectively. The application layer may also provide one or more interfaces for software applications to interact with communications systems of the UE 301 or RAN node 311, such as the baseband circuitry 810. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 10:
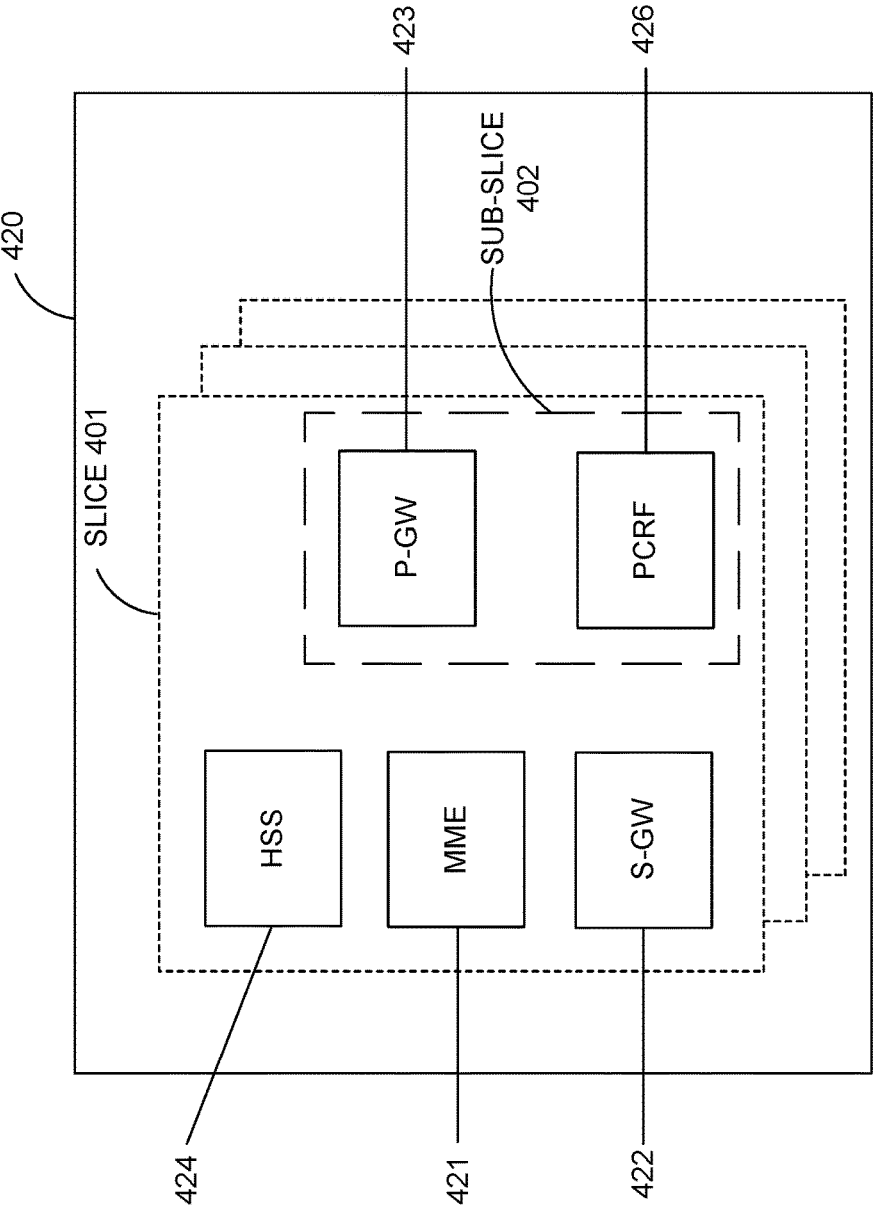
FIG. 10 illustrates components of a core network in accordance with various embodiments.

FIG. 10 illustrates components of a core network in accordance with various embodiments. The components of the CN 420 may be implemented in one physical node or separate physical nodes including components to read and execute instructions from a machine-readable or computer-readable medium (e.g., a non-transitory machine-readable storage medium). In embodiments, the components of CN 520 may be implemented in a same or similar manner as discussed herein with regard to the components of CN 420. In some embodiments, NFV is utilized to virtualize any or all of the above-described network node functions via executable instructions stored in one or more computer-readable storage mediums (described in further detail below). A logical instantiation of the CN 420 may be referred to as a network slice 1001, and individual logical instantiations of the CN 420 may provide specific network capabilities and network characteristics. A logical instantiation of a portion of the CN 420 may be referred to as a network sub-slice 1002 (e.g., the network sub-slice 1002 is shown to include the P-GW 423 and the PCRF 426).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 5), a network slice always comprises a RAN part and a CN part. The support of network slicing relies on the principle that traffic for different slices is handled by different PDU sessions. The network can realize the different network slices by scheduling and also by providing different L1/L2 configurations. The UE 501 provides assistance information for network slice selection in an appropriate RRC message, if it has been provided by NAS. While the network can support large number of slices, the UE need not support more than 8 slices simultaneously.

A network slice may include the CN 520 control plane and user plane NFs, NG-RANs 510 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 501 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 521 instance serving an individual UE 501 may belong to each of the network slice instances serving that UE.

Network Slicing in the NG-RAN 510 involves RAN slice awareness. RAN slice awareness includes differentiated handling of traffic for different network slices, which have been pre-configured. Slice awareness in the NG-RAN 510 is introduced at the PDU session level by indicating the S-NSSAI corresponding to a PDU session in all signaling that includes PDU session resource information. How the NG-RAN 510 supports the slice enabling in terms of NG-RAN functions (e.g., the set of network functions that comprise each slice) is implementation dependent. The NG-RAN 510 selects the RAN part of the network slice using assistance information provided by the UE 501 or the 5GC 520, which unambiguously identifies one or more of the pre-configured network slices in the PLMN. The NG-RAN 510 also supports resource management and policy enforcement between slices as per SLAs. A single NG-RAN node may support multiple slices, and the NG-RAN 510 may also apply an appropriate RRM policy for the SLA in place to each supported slice. The NG-RAN 510 may also support QoS differentiation within a slice.

The NG-RAN 510 may also use the UE assistance information for the selection of an AMF 521 during an initial attach, if available. The NG-RAN 510 uses the assistance information for routing the initial NAS to an AMF 521. If the NG-RAN 510 is unable to select an AMF 521 using the assistance information, or the UE 501 does not provide any such information, the NG-RAN 510 sends the NAS signaling to a default AMF 521, which may be among a pool of AMFs 521. For subsequent accesses, the UE 501 provides a temp ID, which is assigned to the UE 501 by the 5GC 520, to enable the NG-RAN 510 to route the NAS message to the appropriate AMF 521 as long as the temp ID is valid. The NG-RAN 510 is aware of, and can reach, the AMF 521 that is associated with the temp ID. Otherwise, the method for initial attach applies.

The NG-RAN 510 supports resource isolation between slices. NG-RAN 510 resource isolation may be achieved by means of RRM policies and protection mechanisms that should avoid that shortage of shared resources if one slice breaks the service level agreement for another slice. In some implementations, it is possible to fully dedicate NG-RAN 510 resources to a certain slice. How NG-RAN 510 supports resource isolation is implementation dependent.

Some slices may be available only in part of the network. Awareness in the NG-RAN 510 of the slices supported in the cells of its neighbors may be beneficial for inter-frequency mobility in connected mode. The slice availability may not change within the UE's registration area. The NG-RAN 510 and the 5GC 520 are responsible to handle a service request for a slice that may or may not be available in a given area. Admission or rejection of access to a slice may depend on factors such as support for the slice, availability of resources, support of the requested service by NG-RAN 510.

The UE 501 may be associated with multiple network slices simultaneously. In case the UE 501 is associated with multiple slices simultaneously, only one signaling connection is maintained, and for intra-frequency cell reselection, the UE 501 tries to camp on the best cell. For inter-frequency cell reselection, dedicated priorities can be used to control the frequency on which the UE 501 camps. The 5GC 520 is to validate that the UE 501 has the rights to access a network slice. Prior to receiving an Initial Context Setup Request message, the NG-RAN 510 may be allowed to apply some provisional/local policies, based on awareness of a particular slice that the UE 501 is requesting to access. During the initial context setup, the NG-RAN 510 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 11:
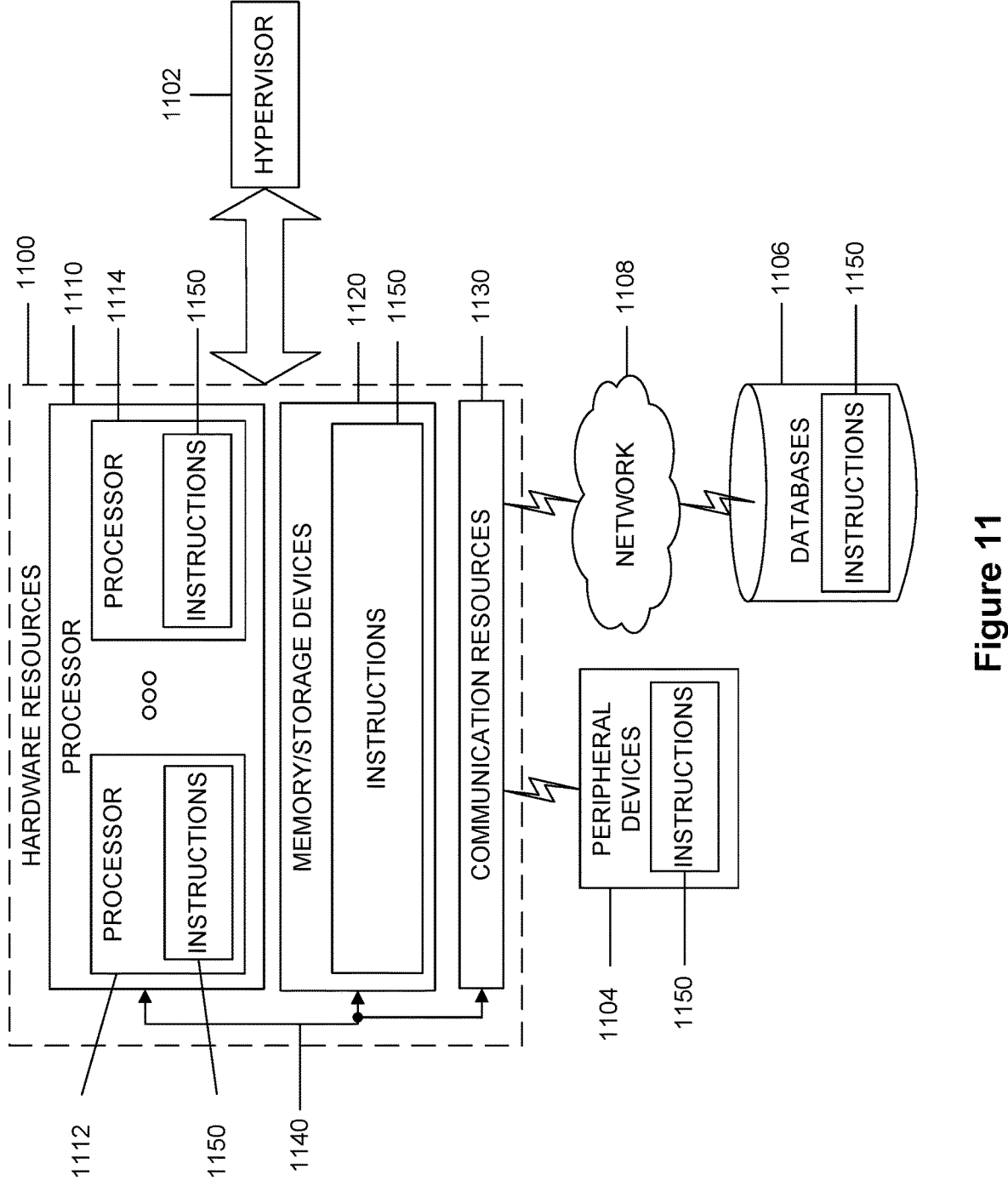
FIG. 11 depicts a block diagram illustrating components, according to some example embodiments, able to read instructions from a machine-readable or computer-readable medium (e.g., a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 may include, for example, a processor 1112 and a processor 1114. The processor(s) 1110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via USB), cellular communication components, NFC components, Bluetooth® (or Bluetooth® Low Energy) components, Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

Example Procedures

Figure 12:
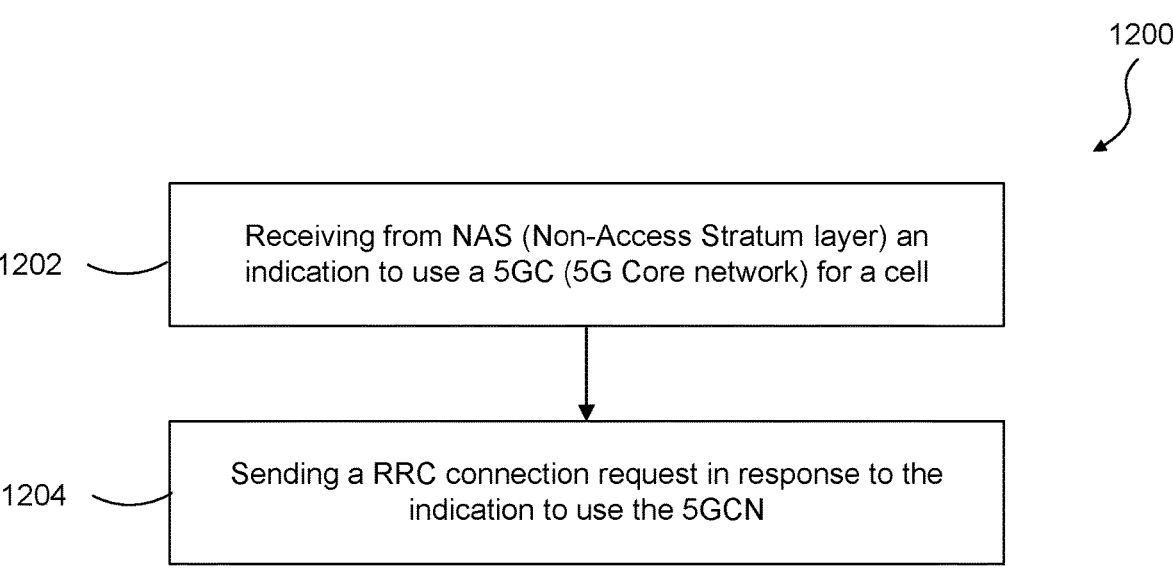
FIG. 12 depicts an example flowchart for practicing the various embodiments discussed herein, for example, for operating a UE when connected to a 5G Core Network (5GCN).

In some embodiments, the electronic device(s), network(s), system(s), chip(s) or component(s), or portions or implementations thereof, of FIGS. 3-11, or some other figure herein, may be configured to perform one or more processes, techniques, or methods as described herein, or portions thereof. One such process is depicted in FIG. 12. For example, FIG. 12 illustrates a flowchart 1200 that describes a UE, such as UE 301, 401, 501, 700, for operating a UE when connected to a 5G Core Network (5GCN), according to embodiments of the disclosure. In embodiments, the flowchart 1200 can be performed or controlled by a processor or processor circuitry described in the various embodiments herein, including the processor shown in FIG. 11, and/or application circuitry 605 or 705, and/or the baseband circuitry 605 or 710 shown FIGS. 6-7.

At 1202, an indication to use a 5G Core Network (5GCN) for the cell is received. For example, a UE can receive or cause to receive from NAS (Non-Access Stratum layer) the indication to use a 5GC (5G Core network) for a cell (or that 5GC is available for use). At 1204, a Radio Resource Control (RRC) connection request is transmitted in response to the indication to use the 5GCN. For example, the UE sends or causes to send a RRC connection request when E-UTRA connected to 5GC is supported.

According to some embodiments, sending the RRC connection request can include sending a device identity. The device identity can correspond to 5GCN when, at least one of: a spare bit is set to a "1"; a pre-defined extension of a RRC connection request message is used; or a UL CCCH message class extension for a RRC connection request message is used.

According to some embodiments, sending the RRC connection request can include sending or causing to send a RRC connection resume request. In these examples, the device identity can correspond to: resume ID if UP IoT 5GS optimization is used, or I-RNTI if the device is in a RRC inactive state.

According to some embodiments, the RRC connection request can correspond to RRCConnectionReestablishmentRequest-NB for NB-IoT when AS (Access Stratum) security has not been enabled and the device identity can correspond to 40 bits of NG-5GS-TMSI.

According to some embodiments, method 1200 can further include sending the remaining 6 bit of the device identity in a RRCConnectionReestablishmentComplete-NB message.

According to some embodiments, method 1200 can further include carrying or causing to be carried a device capability in a RRCConnectionSetupComplete message. In some examples, the device capability is forwarded to 5GCN by RAN.

According to some embodiments, the device capability can be one of: CE mode B support, attachWithoutPDN-Connectivity, up-CIoT-5GS-Optimisation, or cp-CIoT-5GS-Optimisation, According to some embodiments, method 1200 can further include indicating or causing to indicate whether or not RRC INACTIVE states are supported. Additionally, or alternatively, method 1200 can further include indicating whether or not use of RRC INACTIVE immediately is preferred, in a RRCConnectionSetupComplete message.

According to some examples, method 1200 can further include sending or causing to send a RAN broadcast informing whether or not connectivity to 5GCN is supported. Additionally, method 1200 can include sending or causing to send cell access information in SIB1-BR or SIB1-NB, and sending or causing to send whether or not CIoT 5GS optimization and EDT is supported in a BR version of SIB2 or SIB2-NB.

According to some embodiments, method 1200 can also include using or causing to use a new UL-CCCH message class extension for a new RRCEarlyDataRequest message. Additionally, or alternatively, method 1200 can include using or causing to use a critical extension of an existing RRCEarlyDataRequest, to carry full NG-5G-S-TMSI for both eMTC and NB-IoT devices when using EDT in CP IoT 5GS optimization.

According to some embodiments, method 1200 can also include extending or causing to extend a RRCEarlyData-Complete message to include wait time with smaller value and redirected carrier information for both eMTC and NB-IoT devices when using EDT in CP IoT 5GS optimization.

According to some embodiments, method 1200 can include indicating or causing to indicate a new AS RAI to indicate that both further UL and DL data are not extended using extension of RRC messages. Additionally or alternatively, method 1200 can include using or causing to use one of: a reserved bit in a MAC subheader of an existing Rel-13 AS RAI, a fixed size of zero bit MAC CE with a new LCID or eLCID code point, or existing AS RAI code point and reserved bit in the subheader.

According to some embodiments, method 1200 can include not using or causing to use a new RNA or a RNA update timer or not using or causing to use a RAN-based paging DRX cycle length when a device is in a RRC INACTIVE state.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include an apparatus, comprising:
means for receiving from NAS an indication to use 5GC for a cell; and
means for sending a RRC connection request when E-UTRA connected to 5GC is supported.

Example 2 may include the apparatus of example 1, and/or some other example herein wherein a device identity corresponds to 5GCN when at least one of:
a spare bit is set to a "1";
a pre-defined extension of a RRC connection request message is used; or
a UL CCCH message class extension for a RRC connection request message is used.

Example 3 may include the apparatus of example 2, and/or some other example herein, wherein the means for sending the RRC connection request further includes means for sending a RRC connection resume request, and wherein the device identity corresponds to: resume ID if UP IoT 5GS optimization is used, or I-RNTI if the device is in a RRC inactive state.

Example 4 may include the apparatus of example 2 and/or some other example herein, wherein the RRC connection request corresponds to RRCConnectionReestablishmentRequest-NB for NB-IoT when AS security has not been enabled and the device identity corresponds to 40 bits of NG-5GS-TMSI.

Example 5 may include the apparatus of example 4 an/or some other example herein, further comprising means for sending a remaining 6 bit of device identity is sent in RRCConnectionReestablishmentComplete-NB message.

Example 6 may include the apparatus of example 1, and/or some other example herein, further comprising:

means for carrying a device capability in a RRCConnectionSetupComplete message, wherein the device capability is forwarded to 5GCN by RAN.

Example 7 may include the apparatus of example 6, and/or some other example herein, wherein the device capability is one of: CE mode B support, attachWithout-PDN-Connectivity, up-CIoT-5GS-Optimisation, or cp-CIoT-5GS-Optimisation, Example 8 may the apparatus of example 1, and/or some other example herein, further comprising:

means for indicating whether or not RRC INACTIVE states are supported, or whether or not use of RRC INACTIVE immediately is preferred, in a RRCConnectionSetupComplete message.

Example 9 may include an apparatus, comprising:

means for sending a RAN broadcast informing whether or not connectivity to 5GCN is supported;

means for sending cell access information in SIB1-BR or SIB1-NB; and means for sending whether or not CIoT 5GS optimization and EDT is supported in a BR version of SIB2 or SIB2-NB.

Example 10 may include an apparatus, comprising:

means for using a new UL-CCCH message class extension for a new RRCEarlyDataRequest message; or means for using a critical extension of an existing RRCEarlyDataRequest, to carry full NG-5G-S-TMSI for both eMTC and NB-IoT devices when using EDT in CP IoT 5GS optimization.

Example 11 may include a apparatus, comprising:

means for extending a RRCEarlyDataComplete message to include wait time with smaller value and redirected carrier information for both eMTC and NB-IoT devices when using EDT in CP IoT 5GS optimization.

Example 12 may include an apparatus, comprising:

means for indicating a new AS RAI to indicate that both further UL and DL data are not extended using extension of RRC messages; or means for using one of:

a reserved bit in a MAC subheader of an existing Rel-13 AS RAI, a fixed size of zero bit MAC CE with a new LCID or eLCID code point, or existing AS RAI code point and reserved bit in the subheader.

Example 13 may include an apparatus, comprising:

means for:

not using a new RNA or a RNA update timer; or not using a RAN-based paging DRX cycle length, when the apparatus is in a RRC INACTIVE state.

Example 14 may include an apparatus, to:

receive from NAS an indication to use 5GC for a cell; and send a RRC connection request when E-UTRA connected to 5GC is supported.

Example 15 may include the apparatus of example 14, and/or some other example herein, wherein a device identity corresponds to 5GCN when at least one of: a spare bit is set to a "1";

a pre-defined extension of a RRC connection request message is used; or a UL CCCH message class extension for a RRC connection request message is used.

Example 16 may include the apparatus of example 15, and/or some other example herein, wherein to send the RRC connection request further includes to send a RRC connection resume request, and wherein the device identity corresponds to: resume ID if UP IoT 5GS optimization is used, or I-RNTI if the device is in a RRC inactive state.

Example 17 may include the apparatus of example 15 and/or some other example herein, wherein the RRC connection request corresponds to RRCConnectionReestablishmentRequest-NB for NB-IoT when AS security has not been enabled, and wherein the device identity corresponds to 40 bits of NG-5GS-TMSI.

Example 18 may include the apparatus of example 17 an/or some other example herein, further to send a remaining 6 bit of device identity is sent in RRCConnectionReestablishmentComplete-NB message.

Example 19 may include the apparatus of example 14, and/or some other example herein, further to:

carry a device capability in a RRCConnectionSetupComplete message, wherein the device capability is forwarded to 5GCN by RAN.

Example 20 may include the apparatus of example 19, and/or some other example herein, wherein the device capability is one of: CE mode B support, attachWithout-PDN-Connectivity, up-CIoT-5GS-Optimisation, or cp-CIoT-5GS-Optimisation, Example 21 may the apparatus of example 14, and/or some other example herein, further to:

indicate whether or not RRC INACTIVE states are supported, or whether or not use of RRC INACTIVE immediately is preferred, in a RRCConnectionSetupComplete message.

Example 22 may include an apparatus, to:

send a RAN broadcast informing whether or not connectivity to 5GCN is supported;

send cell access information in SIB1-BR or SIB1-NB; and send whether or not CIoT 5GS optimization and EDT is supported in a BR version of SIB2 or SIB2-NB.

Example 23 may include an apparatus, to:

use a new UL-CCCH message class extension for a new RRCEarlyDataRequest message; or use a critical extension of an existing RRCEarlyDataRequest, to carry full NG-5G-S-TMSI for both eMTC and NB-IoT devices when using EDT in CP IoT 5GS optimization.

Example 24 may include an apparatus, to:

extend a RRCEarlyDataComplete message to include wait time with smaller value and redirected carrier information for both eMTC and NB-IoT devices when using EDT in CP IoT 5GS optimization.

Example 25 may include an apparatus, to:

indicate a new AS RAI to indicate that both further UL and DL data are not extended using extension of RRC messages; or use one of:

a reserved bit in a MAC subheader of an existing Rel-13 AS RAI, a fixed size of zero bit MAC CE with a new LCID or eLCID code point, or existing AS RAI code point and reserved bit in the subheader.

Example 26 may include an apparatus, to:

not use a new RNA or a RNA update timer; or not use a RAN-based paging DRX cycle length, when the apparatus is in a RRC INACTIVE state.

Example 27 may include a method, comprising:

receiving or causing to receive from NAS an indication to use 5GC for a cell; and sending or causing to send a RRC connection request when E-UTRA connected to 5GC is supported.

Example 28 may include the method of example 27, and/or some other example herein wherein a device identity corresponds to 5GCN when at least one of:

a spare bit is set to a "1";

a pre-defined extension of a RRC connection request message is used; or a UL CCCH message class extension for a RRC connection request message is used.

Example 29 may include the method of example 28, and/or some other example herein, wherein sending or causing to send the RRC connection request includes sending or causing to send a RRC connection resume request, and wherein the device identity corresponds to: resume ID if UP IoT 5GS optimization is used, or I-RNTI if the device is in a RRC inactive state.

Example 30 may include the method of example 28 and/or some other example herein, wherein the RRC connection request corresponds to RRCConnectionReestablishmentRequest-NB for NB-IoT when AS security has not been enabled and the device identity corresponds to 40 bits of NG-5GS-TMSI.

Example 31 may include the method of example 30 an/or some other example herein, further comprising sending or causing to send the remaining 6 bit of device identity is sent in RRCConnectionReestablishmentComplete-NB message.

Example 32 may include the method of example 27, and/or some other example herein, further comprising:

carrying or causing to be carried a device capability in a RRCConnectionSetupComplete message, wherein the device capability is forwarded to 5GCN by RAN.

Example 33 may include the method of example 32, and/or some other example herein, wherein the device capability is one of: CE mode B support, attachWithout-PDN-Connectivity, up-CIoT-5GS-Optimisation, or cp-CIoT-5GS-Optimisation, Example 34 may the method of example 27, and/or some other example herein, further comprising:

indicating or causing to indicate whether or not RRC INACTIVE states are supported, or whether or not use of RRC INACTIVE immediately is preferred, in a RRCConnectionSetupComplete message.

Example 35 may include a method, comprising:

sending or causing to send a RAN broadcast informing whether or not connectivity to 5GCN is supported; and sending or causing to send cell access information in SIB1-BR or SIB1-NB, and sending or causing to send whether or not CIoT 5GS optimization and EDT is supported in a BR version of SIB2 or SIB2-NB.

Example 36 may include a method, comprising:

using or causing to use a new UL-CCCH message class extension for a new RRCEarlyDataRequest message, or using or causing to use a critical extension of an existing RRCEarlyDataRequest, to carry full NG-5G-S-TMSI for both eMTC and NB-IoT devices when using EDT in CP IoT 5GS optimization.

Example 37 may include a method, comprising:

extending or causing to extend a RRCEarlyDataComplete message to include wait time with smaller value and redirected carrier information for both eMTC and NB-IoT devices when using EDT in CP IoT 5GS optimization.

Example 38 may include a method, comprising:

indicating or causing to indicate a new AS RAI to indicate that both further UL and DL data are not extended using extension of RRC messages, or using or causing to use one of:

a reserved bit in a MAC subheader of an existing Rel-13 AS RAI, a fixed size of zero bit MAC CE with a new LCID or eLCID code point, or existing AS RAI code point and reserved bit in the subheader.

Example 39 may include a method, comprising: when a device is in a RRC INACTIVE state:

not using or causing to use a new RNA or a RNA update timer; or not using or causing to use a RAN-based paging DRX cycle length.

Example 40 includes the apparatus of examples 1-13 and/or some other examples herein, wherein the apparatus is implemented in or by a user equipment (UE).

Example 41 includes the apparatus of examples 14-26 and/or some other examples herein, wherein the apparatus is implemented in or by a user equipment (UE).

Example 42 includes the apparatus of examples 23-39 and/or some other examples herein, the method is performed by an apparatus that is implemented in or by a user equipment (UE).

Example 43 may include the method of sending RRC connection request when UE supports E-UTRA connected to 5GC and NAS indicated to use 5GC for the selected cell.

Example 44 may include the method of example 1 or some other example herein where the UE identity corresponds to the 5GCN when a spare bit is set to "1" or a new critical extension of the RRC connection request message or a new UL CCCH message class extension for RRC connection request message is used.

Example 45 may include the methods of examples 1 and 2 or some other example herein, where RRC connection request corresponds to RRC connection resume request and UE identity corresponds to resume ID if UP IoT 5GS optimization is used or I-RNTI if UE is in RRC INACTIVE state.

Example 46 may include the method of example 1 and 2 or some other example herein, where RRC connection request corresponds to RRCConnectionReestablishmentRequest-NB for NB-IoT when AS security has not been enabled and UE identity corresponds to 40 bits of NG-5GS-TMSI.

Example 47 may include the method of example 4 or some other example herein, where the remaining 6 bit of UE identity is sent in RRCConnectionReestablishmentComplete-NB message.

Example 48 may include the method where the UE capability (e.g., CE mode B support, attachWithoutPDN-Connectivity, up-CIoT-5GS-Optimisation, cp-CIoT-5GS-Optimisation) are carried in RRCConnectionSetupComplete message and RAN forwards them to 5GCN.

Example 49 may include the method where the UE indicates whether or not it supports RRC INACTIVE states or whether or not it prefers to use RRC INACTIVE immediately in RRCConnectionSetupComplete message.

Example 50 may include the method where RAN broadcast whether or not it supports connectivity to 5GCN and cell access information in SIB1-BR (or SIB1-NB) whereas whether or not it supports CIoT 5GS optimization and EDT in BR version of SIB2 (or SIB2-NB).

Example 51 may include the method where a new UL-CCCH message class extension for the new RRCEarlyDataRequest message is defined or critical extension for the existing RRCEarlyDataRequest is defined to carry full NG-5G-S-TMSI for both eMTC and NB-IoT UEs when using EDT in CP IoT 5GS optimization.

Example 52 may include the method where RRCEarlyDataComplete message is extended to include wait time with smaller value and redirected carrier information for both eMTC and NB-IoT UEs when using EDT in CP IoT 5GS optimization.

Example 53 may include the method of indicating new AS RAI to indicate both further UL and DL data are not extended (different from the existing Rel-13 AS RAI) using extension of RRC messages or using reserved bit in MAC subheader of existing Rel-13 AS RAI or fixed size of zero bit MAC CE with a new LCID or eLCID code point or existing AS RAI code point and reserved bit in the subheader.

Example 54 may include the method where UE in RRC INACTIVE state does not use new RNA or RNA update timer or does not use RAN-based paging DRX cycle length.

Example 55 may include an apparatus comprising means to perform one or more elements of a method described in or related to any of examples 1-39, or any other method or process described herein.

Example 56 may include one or more non-transitory computer-readable media comprising instructions to cause an electronic device, upon execution of the instructions by one or more processors of the electronic device, to perform one or more elements of a method described in or related to any of examples 1-39, or any other method or process described herein.

Example 57 may include an apparatus comprising logic, modules, or circuitry to perform one or more elements of a method described in or related to any of examples 1-39, or any other method or process described herein.

Example 58 may include a method, technique, or process as described in or related to any of examples 1-39, or portions or parts thereof.

Example 59 may include an apparatus comprising: one or more processors and one or more computer-readable media comprising instructions that, when executed by the one or more processors, cause the one or more processors to perform the method, techniques, or process as described in or related to any of examples 1-39, or portions thereof.

Example 60 may include a signal as described in or related to any of examples 1-39, or portions or parts thereof.

Example 61 may include a signal in a wireless network as shown and described herein.

Example 62 may include a method of communicating in a wireless network as shown and described herein.

Example 63 may include a system for providing wireless communication as shown and described herein.

Example 64 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein, but are not meant to be limiting.

3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation
AP Application Protocol, Antenna Port, Access Point
API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CIoT Cellular Internet of Things
CID Cell-ID (e.g., positioning method)
CIM Common Information Model
CIR Carrier to Interference Ratio CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
ECCA extended clear channel assessment, extended CCA
ECCE Enhanced Control Channel Element, Enhanced CCE
ED Energy Detection
EDT Energy-Delay Tradeoff
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager
eMBB Enhanced Mobile Broadband EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Channel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Special Mobile
GTP GPRS Tunneling Protocol
GTP-U GPRS Tunnelling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO, HO Handover
HFN HyperFrame Number
HHO Hard Handover
HLR Home Location Register
HN Home Network HO Handover HPLMN Home Public Land Mobile Network HSDPA High Speed Downlink Packet Access HSN Hopping Sequence Number HSPA High Speed Packet Access HSS Home Subscriber Server HSUPA High Speed Uplink Packet Access HTTP Hyper Text Transfer Protocol HTTPS Hyper Text Transfer Protocol Secure (https is http/1.1 over SSL, i.e. port 443)

I-Block Information Block

ICCID Integrated Circuit Card Identification

ICIC Inter-Cell Interference Coordination

ID Identity, identifier

IDFT Inverse Discrete Fourier Transform

IE Information element

IBE In-Band Emission

IEEE Institute of Electrical and Electronics Engineers

IEI Information Element Identifier

IEIDL Information Element Identifier Data Length

IETF Internet Engineering Task Force

IF Infrastructure

IM Interference Measurement, Intermodulation, IP Multimedia

IMC IMS Credentials

IMEI International Mobile Equipment Identity

IMGI International mobile group identity

IMPI IP Multimedia Private Identity

IMPU IP Multimedia PUblic identity

IMS IP Multimedia Subsystem

IMSI International Mobile Subscriber Identity

IoT Internet of Things

IP Internet Protocol

Ipsec IP Security, Internet Protocol Security

IP-CAN IP-Connectivity Access Network

IP-M IP Multicast

IPv4 Internet Protocol Version 4

IPv6 Internet Protocol Version 6

IR Infrared

IS In Sync

I-RNTI Identity Radio Network Temporary Identifier

IRP Integration Reference Point

ISDN Integrated Services Digital Network

ISIM IM Services Identity Module

ISO International Organisation for Standardisation

ISP Internet Service Provider

IWF Interworking-Function

I-WLAN Interworking WLAN

K Constraint length of the convolutional code, USIM Individual key kB Kilobyte (1000 bytes)

kbps kilo-bits per second

Kc Ciphering key

Ki Individual subscriber authentication key

KPI Key Performance Indicator

KQI Key Quality Indicator

KSI Key Set Identifier ksps kilo-symbols per second

KVM Kernel Virtual Machine

L1 Layer 1 (physical layer)

L1-RSRP Layer 1 reference signal received power

L2 Layer 2 (data link layer)

L3 Layer 3 (network layer)

LAA Licensed Assisted Access

LAN Local Area Network

LBT Listen Before Talk

LCM LifeCycle Management

LCR Low Chip Rate

LCS Location Services

LCID Logical Channel ID

LI Layer Indicator

LLC Logical Link Control, Low Layer Compatibility

LPLMN Local PLMN

LPP LTE Positioning Protocol

LSB Least Significant Bit

LTE Long Term Evolution

LWA LTE-WLAN aggregation

LWIP LTE/WLAN Radio Level Integration with IPsec Tunnel

LTE Long Term Evolution

M2M Machine-to-Machine

MAC Medium Access Control (protocol layering context)

MAC Message authentication code (security/encryption context)

MAC-A MAC used for authentication and key agreement (TSG T WG3 context)

MAC-I MAC used for data integrity of signalling messages (TSG T WG3 context)

MANO Management and Orchestration

MBMS Multimedia Broadcast and Multicast Service

MBSFN Multimedia Broadcast multicast service Single Frequency Network

MCC Mobile Country Code

MCG Master Cell Group

MCOT Maximum Channel Occupancy Time

MCS Modulation and coding scheme

MDAF Management Data Analytics Function

MDAS Management Data Analytics Service

MDT Minimization of Drive Tests

ME Mobile Equipment

MeNB master eNB

MER Message Error Ratio

MGL Measurement Gap Length

MGRP Measurement Gap Repetition Period

MIB Master Information Block, Management Information Base

MIMO Multiple Input Multiple Output

MLC Mobile Location Centre

MM Mobility Management

MME Mobility Management Entity

MN Master Node

MO Measurement Object, Mobile Originated

MPBCH MTC Physical Broadcast CHannel

MPDCCH MTC Physical Downlink Control CHannel

MPDSCH MTC Physical Downlink Shared CHannel

MPRACH MTC Physical Random Access CHannel

MPUSCH MTC Physical Uplink Shared Channel

MPLS MultiProtocol Label Switching

MS Mobile Station

MSB Most Significant Bit

MSC Mobile Switching Centre

MSI Minimum System Information, MCH Scheduling Information

MSID Mobile Station Identifier

MSIN Mobile Station Identification Number

MSISDN Mobile Subscriber ISDN Number

MT Mobile Terminated, Mobile Termination

MTC Machine-Type Communications mMTC massive MTC, massive Machine-Type Communications MU-MIMO Multi User MIMO MWUS MTC wake-up signal, MTC WUS NACK Negative Acknowledgement NAI Network Access Identifier NAS Non-Access Stratum, Non-Access Stratum layer
NCT Network Connectivity Topology
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control
    CHannel
NPDSCH Narrowband Physical Downlink Shared CHan-
    nel
NPRACH Narrowband Physical Random Access CHan-
    nel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAI 'Network Slice Selection Assistance Information
S-NNSAI Single-NSSAI
NSSF Network Slice Selection Function
NW Network
NWUS Narrowband wake-up signal, Narrowband WUS
NZP Non-Zero Power
O&M Operation and Maintenance
ODU2 Optical channel Data Unit—type 2
OFDM Orthogonal Frequency Division Multiplexing
OFDMA Orthogonal Frequency Division Multiple Access
GOB Out-of-band
OOS Out of Sync
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol, Packet Data
    Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAI Routing Area Identification
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
RIV Resource indicator value
RL Radio Link
RLC Radio Link Control, Radio Link Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel RMSI Remaining MSI, Remaining Minimum System Information
RN Relay Node
RNC Radio Network Controller
RNL Radio Network Layer
RNTI Radio Network Temporary Identifier
ROHC Robust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Service Discovery Protocol (Bluetooth related)
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastruction
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
VPLMN Visited Public Land Mobile Network
VPN Virtual Private Network
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML eXtensible Markup Language
XRES EXpected user RESponse
XOR eXclusive OR
ZC Zadoff-Chu
ZP Zero Power

Terminology

For the purposes of the present document, the following terms and definitions are applicable to the examples and embodiments discussed herein, but are not meant to be limiting.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. A user equipment (UE), comprising:
radio front end circuitry; and
processor circuitry configured to:
    receive, using the radio front end circuitry and from a Non-Access Stratum layer (NAS) of a cell, an indication to use a 5G Core Network (5GCN) for the cell;
    transmit, using the radio front end circuitry and to a Radio Access Network (RAN) of the cell, a Radio Resource Control (RRC) connection request in response to the indication to use the 5GCN, wherein the RRC connection request includes an extension indicating that the 5GCN is supported by the UE and wherein the extension comprises an uplink (UL) common control channel (CCCH) message class extension for the RRC connection request;
    transmit, using the radio front end circuitry, a RRC connection resume request comprising a resume identifier corresponding to the 5GCN and a second UL CCCH message class extension for the RRC connection resume request;
    trigger an access stratum (AS) release Assistance Indicator (RAI) upon receiving an indication of an RAI from upper layers;
    indicate the AS RAI that informs the RAN that both further uplink data and downlink data are not expected by the UE, wherein in response to an Energy-Delay Tradeoff (EDT) being used, an RRCEarlyDataRequest or an RRCConnectionResumeRequest for EDT are extended to include an AS RAI indication to indicate the AS RAI; and
    receive, from the RAN and subsequent to indicating the AS RAI, a message that releases the UE to one of a RRC inactive state, a RRC idle state with suspend indication, or a RRC idle state without suspend indication.

2. The UE of claim 1, wherein the processor circuitry is further configured to indicate that the 5GCN is supported by setting a spare bit of the RRC connection request to a value of "1".

3. The UE of claim 1, wherein the RRC connection request further comprises an Identity Radio Network Temporary Identifier (I-RNTI) corresponding to the 5GCN when the UE is in the RRC inactive state.

4. The UE of claim 1, wherein the UE comprises an internet of things (IoT) UE and the RRC connection request corresponds to a RRCConnectionReestablishmentRequestNB for the IoT when Access Stratum (AS) security is not enabled.

5. The UE of claim 1, wherein the processor circuitry is further configured to transmit a device capability in a RRCConnectionSetupComplete message.

6. The UE of claim 1, wherein the AS RAI uses a Buffer Status Report (BSR) Medium Access Control (MAC) control element (CE) with the BSR set to a value of '0' with using a reserved bit in a MAC CE subheader.

7. A method, comprising:

receiving, by a user equipment (UE) and from a Non-Access Stratum layer (NAS) of a cell, an indication to use a 5G Core Network (5GCN) for the cell;

transmitting, to a Radio Access Network (RAN) of the cell, a Radio Resource Control (RRC) connection request in response to the indication to use the 5GCN, wherein the RRC connection request includes an extension indicating that the 5GCN is supported by the UE and wherein the extension comprises an uplink (UL) common control channel (CCCH) message class extension for the RRC connection request;

transmitting a RRC connection resume request comprising a resume identifier corresponding to the 5GCN and a second UL CCCH message class extension for the RRC connection resume request;

triggering an access stratum (AS) release Assistance Indicator (RAI) upon receiving an indication of an RAI from upper layers;

indicating the AS RAI that informs the RAN that both further uplink data and downlink data are not expected by the UE, wherein in response to an Energy-Delay Tradeoff (EDT) being used, an RRCEarlyDataRequest or an RRCConnectionResumeRequest for EDT are extended to include an AS RAI indication to indicate the AS RAI; and receiving, from the RAN and subsequent to indicating the AS RAI, a message that releases the UE to one of a RRC inactive state, a RRC idle state with suspend indication, or a RRC idle state without suspend indication.

8. The method of claim 7, further comprising:

indicating that the 5GCN is supported using a device identity by setting a spare bit of the RRC connection request to a value of "1".

9. The method of claim 7, wherein transmitting the RRC connection request comprises transmitting an Identity Radio Network Temporary Identifier (I-RNTI) corresponding to the 5GCN when the UE is in the RRC inactive state.

10. The method of claim 7, wherein the UE comprises an internet of things (IoT) UE and the RRC connection request corresponds to a RRCConnectionReestablishmentRequest-NB for the IoT when AS security is not enabled.

11. The method of claim 7, further comprising transmitting a device capability in a RRCConnectionSetupComplete message.

12. The method of claim 7, wherein the AS RAI uses a Buffer Status Report (BSR) Medium Access Control (MAC) control element (CE) with the BSR set to a value of '0' with using a reserved bit in a MAC CE subheader.

13. A user equipment (UE), comprising:

a memory that stores instructions; and a processor, upon executing the instructions, configured to:

receive, from a Non-Access Stratum layer (NAS) of a cell, an indication to use a 5G Core Network (5GCN) for the cell;

cause to transmit, to a Radio Access Network (RAN) of the cell, a Radio Resource Control (RRC) connection request in response to the indication to use the 5GCN, wherein the RRC connection request includes an extension indicating that the 5GCN is supported by the UE and wherein the extension comprises an uplink (UL) common control channel (CCCH) message class extension for the RRC connection request;

cause to transmit a RRC connection resume request comprising a resume identifier corresponding to the 5GCN and a second UL CCCH message class extension for the RRC connection resume request;

trigger an access stratum (AS) release Assistance Indicator (RAI) upon receiving an indication of an RAI from upper layers;

indicate the AS RAI that informs the RAN that both further uplink data and downlink data are not expected by the UE, wherein in response to an Energy-Delay Tradeoff (EDT) being used, an RRCEarlyDataRequest or an RRCConnectionResumeRequest for EDT are extended to include an AS RAI indication to indicate the AS RAI; and receive, from the RAN and subsequent to indicating the AS RAI, a message that releases the UE to one of a RRC inactive state, a RRC idle state with suspend indication, or a RRC idle state without suspend indication.

14. The UE of claim 13, wherein the processor is further configured to indicate that the 5GCN is supported using a device identity by setting a spare bit of the RRC connection request to a value of "1".

15. The UE of claim 13, wherein to transmit the RRC connection request the processor is configured to transmit an Identity Radio Network Temporary Identifier (I-RNTI) corresponding to the 5GCN when the UE is in the RRC inactive state.

16. The UE of claim 13, wherein the processor is further configured to transmit a device capability in a RRCConnectionSetupComplete message.

* * * * *